US010805672B2

(12) United States Patent
Iwami et al.

(10) Patent No.: US 10,805,672 B2
(45) Date of Patent: Oct. 13, 2020

(54) INFORMATION PROCESSING DEVICE, INFORMATION PROCESSING SYSTEM, AND INFORMATION PROCESSING METHOD

(71) Applicant: SONY CORPORATION, Tokyo (JP)

(72) Inventors: Hideki Iwami, Saitama (JP); Osamu Yoshimura, Kanagawa (JP); Yasushi Katayama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 94 days.

(21) Appl. No.: 15/123,550

(22) PCT Filed: Dec. 2, 2014

(86) PCT No.: PCT/JP2014/081811
§ 371 (c)(1),
(2) Date: Sep. 2, 2016

(87) PCT Pub. No.: WO2015/136791
PCT Pub. Date: Sep. 17, 2015

(65) Prior Publication Data
US 2017/0078740 A1 Mar. 16, 2017

(30) Foreign Application Priority Data

Mar. 11, 2014 (JP) ................................ 2014-047070

(51) Int. Cl.
*H04N 21/4363* (2011.01)
*H04N 21/431* (2011.01)
(Continued)

(52) U.S. Cl.
CPC ..... *H04N 21/43637* (2013.01); *G06F 3/1423* (2013.01); *G06F 3/1454* (2013.01);
(Continued)

(58) Field of Classification Search
CPC ...... G09G 2370/16; G09G 5/006; G09G 5/14; G09G 2340/02; G09G 2370/10;
(Continued)

(56) References Cited

U.S. PATENT DOCUMENTS

2011/0154214 A1* 6/2011 Mahajan ................... G06F 3/14
715/738
2012/0038541 A1 2/2012 Song
(Continued)

FOREIGN PATENT DOCUMENTS

CN 102667750 A 9/2012
JP 2008-278388 A 11/2008
(Continued)

OTHER PUBLICATIONS

International Search Report dated Mar. 17, 2015 in PCT/JP2014/081811 Filed Dec. 2, 2014.
(Continued)

*Primary Examiner* — Anthony Bantamoi
(74) *Attorney, Agent, or Firm* — Xsensus LLP

(57) ABSTRACT

To cause image information to be appropriately displayed among a plurality of information processing devices. An information processing device includes a wireless communication unit and a control unit. The wireless communication unit is configured to perform real-time image transmission with another information processing device according to a wireless fidelity (Wi-Fi) Certified Miracast specification. The control unit is configured to perform control in a manner that second image information to be displayed on a non-display region included in first image information transmitted from the other information processing device is acquired, and a combined image in which the first image information is combined with the second image information is displayed on a display unit.

16 Claims, 43 Drawing Sheets

(51) Int. Cl.
*G06F 3/14* (2006.01)
*H04N 21/436* (2011.01)
*G09G 5/14* (2006.01)
*G09G 5/00* (2006.01)
*H04N 21/41* (2011.01)
*H04N 21/435* (2011.01)
*H04N 21/438* (2011.01)
*H04N 21/6587* (2011.01)
*H04W 84/12* (2009.01)

(52) U.S. Cl.
CPC ............... *G09G 5/006* (2013.01); *G09G 5/14* (2013.01); *H04N 21/4122* (2013.01); *H04N 21/435* (2013.01); *H04N 21/436* (2013.01); *H04N 21/4316* (2013.01); *H04N 21/4383* (2013.01); *H04N 21/6587* (2013.01); *G09G 2330/021* (2013.01); *G09G 2340/02* (2013.01); *G09G 2340/04* (2013.01); *G09G 2340/12* (2013.01); *G09G 2350/00* (2013.01); *G09G 2370/04* (2013.01); *G09G 2370/10* (2013.01); *G09G 2370/16* (2013.01); *G09G 2370/20* (2013.01); *H04W 84/12* (2013.01)

(58) Field of Classification Search
CPC ......... G09G 2330/021; G09G 2370/04; G09G 2340/04; G09G 2370/20; G09G 2350/00; G09G 2340/12; H04N 21/4122; H04N 21/4316; H04N 21/435; H04N 21/436; H04N 21/43637; H04N 21/4383; H04N 21/6587; H04N 21/422; H04N 21/482; H04W 84/12; G06F 3/1423; G06F 3/1454

USPC ....... 725/87, 118–119, 131, 139, 38; 710/20
See application file for complete search history.

(56) References Cited

U.S. PATENT DOCUMENTS

| | | | |
|---|---|---|---|
| 2012/0079551 A1* | 3/2012 | Isozaki | H04N 21/4104 |
| | | | 725/118 |
| 2013/0047189 A1 | 2/2013 | Raveendran et al. | |
| 2013/0179605 A1* | 7/2013 | Huang | H04L 65/4092 |
| | | | 710/20 |
| 2014/0068503 A1* | 3/2014 | Yoon | G06F 3/0488 |
| | | | 715/790 |
| 2014/0282728 A1* | 9/2014 | Matsunaga | G06F 3/0488 |
| | | | 725/38 |
| 2017/0055030 A1 | 2/2017 | Raveendran et al. | |

FOREIGN PATENT DOCUMENTS

| | | |
|---|---|---|
| JP | 2012-74771 A | 4/2012 |
| JP | 2012-074771 A | 4/2012 |
| JP | 2013-514586 A | 4/2013 |
| JP | 2014-509130 A | 4/2014 |
| WO | 2013/111239 A1 | 8/2013 |

OTHER PUBLICATIONS

Extended European Search Report dated Sep. 20, 2017 in Patent Application No. 14885214.8.
Chinese Office Action dated Nov. 5, 2018 in Chinese Patent Application No. 201480076759.6.
Japanese Office Action issued in corresponding JP Application No. 2016507269, dated Sep. 25, 2018, 8 pages.

\* cited by examiner

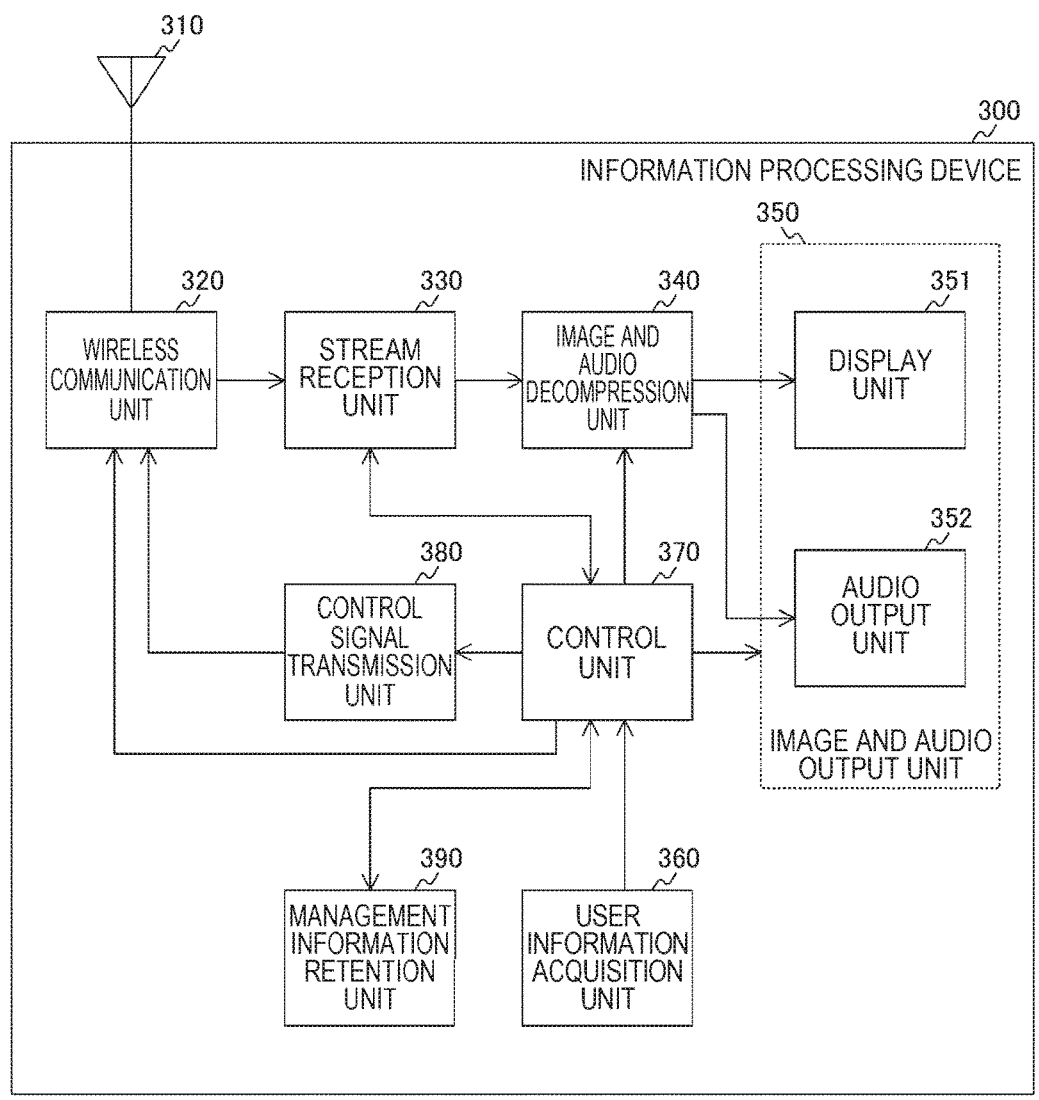

FIG. 4

MANAGEMENT INFORMATION RETENTION UNIT
390

| TERMINAL IDENTIFICATION INFORMATION | FREQUENCY CHANNEL | RADIO WAVE PROPAGATION MEASUREMENT INFORMATION | | | | | DEVICE INFORMATION | BAND USE LEVEL | DISPLAY FORM | STANDBY OR WAKE-UP | MULTI-RECEPTION DIVERSITY CORRES-PONDENCE |
|---|---|---|---|---|---|---|---|---|---|---|---|
| | | PER | BER | NUMBER OF RETRANS-MISSIONS OF PACKETS | THROUGHPUT | FRAME DROP | SIR (RSSI) | | | | | |
| 391 | 392 | 393 | | | | | | 394 | 395 | 396 | 397 | 398 |
| DSC200 | 60GHz | ... | ... | ... | ... | ... | ... | MOBILE | 20Mbps | SUB (PERIPHERAL CHANNEL) | STANDBY | NO |
| DR400 | 2.4GHz | ... | ... | ... | ... | ... | ... | STATIONARY | 20Mbps | MAIN (MIDDLE CHANNEL) | WAKE-UP | YES |

FIG. 5
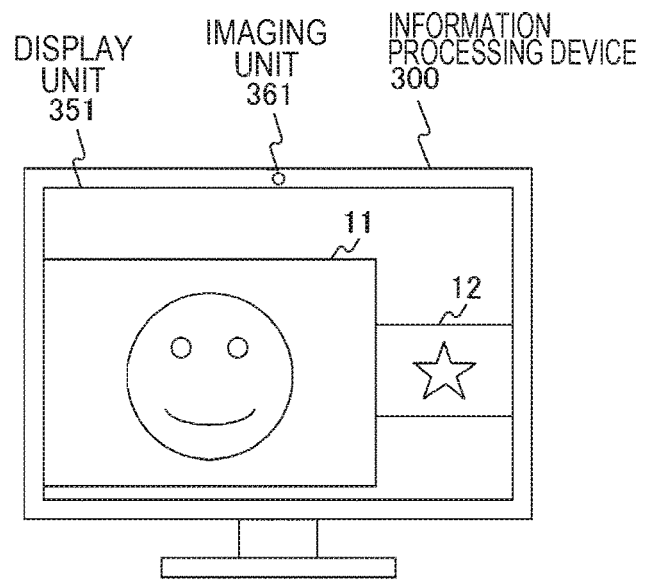
a
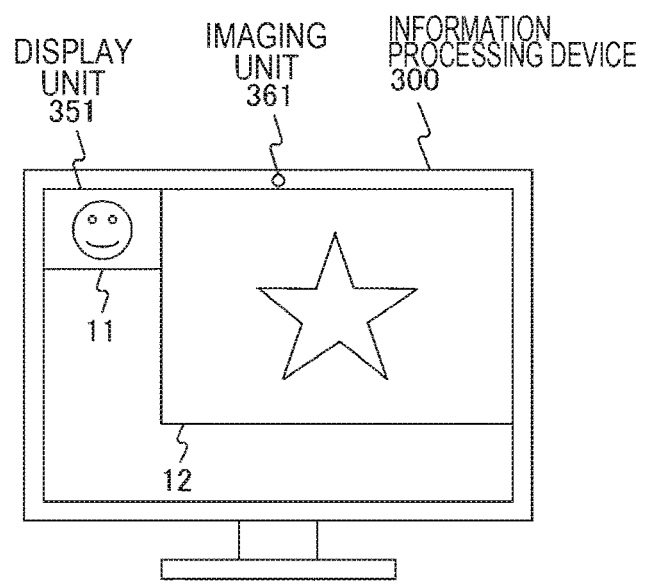
b

SETTING EXAMPLE OF MODE UNDER CONTROL OF SOURCE DEVICE

INFORMATION PROCESSING DEVICE, INFORMATION PROCESSING SYSTEM, AND INFORMATION PROCESSING METHOD

TECHNICAL FIELD

The present technology relates to an information processing device and more particularly, to an information processing device, an information processing system, and an information processing method in which various kinds of information are exchanged using wireless communication.

BACKGROUND ART

Since the past, a wireless communication technique of exchanging various kinds of data using wireless communication has been known. For example, a wireless communication technique that enables various kinds of information to be interchanged between two information processing device has been proposed (for example, see Patent Literature 1).

CITATION LIST

Patent Literature

Patent Literature 1: JP 2008-278388A

SUMMARY OF INVENTION

Technical Problem

According to the above-described technologies of the related art, various kinds of information can be interchanged between two information processing devices through wireless communication even when connection is not established by wired lines. For example, an image based on image data transmitted from a transmission side information processing device can be displayed on a display unit of a reception side information processing device.

Here, for example, various kinds of content (for example, moving image content) may also be displayed on the information processing device. Further, content displayed on the transmission side information processing device may be transmitted to the reception side information processing device and displayed on the reception side information processing device as well. However, certain restrictions are set, for example, distribution and reproduction of content (for example, digital rights management (DRM) content) managed under a copyright has limitations. For this reason, when content managed under a copyright is set as a display target, it may be difficult to cause content displayed on the transmission side information processing device to be appropriately displayed on the reception side information processing device.

The present technology was made in light of the foregoing, and it is an object of the present technology to cause image information to be appropriately displayed among a plurality of information processing devices.

Solution to Problem

The present technology has been made to solve the problem, and a first aspect thereof is an information processing device, an information processing method thereof, and a program for causing a computer to execute the information processing method, the information processing device including: a wireless communication unit configured to perform real-time image transmission with another information processing device according to a wireless fidelity (Wi-Fi) Certified Miracast specification (technical specification title: Wi-Fi Display); and a control unit configured to perform control in a manner that second image information to be displayed on a non-display region included in first image information transmitted from the other information processing device is acquired, and a combined image in which the first image information is combined with the second image information is displayed on a display unit. Thus, there is an operation in which second image information to be displayed on a non-display region included in first image information transmitted from another information processing device is acquired, and a combined image in which the first image information is combined with the second image information is displayed on a display unit.

According to the first aspect, the control unit may specify the non-display region in the first image information and the second image information based on command information related to the non-display region which is transmitted from the other information processing device. Thus, there is an operation in which the non-display region in the first image information and the second image information are specified based on command information related to the non-display region.

According to the first aspect, the control unit may specify the non-display region in the first image information based on a position and a size of the non-display region in the first image information which is included in the command information. Thus, there is an operation in which the non-display region in the first image information is specified based on a position and a size of the non-display region included in the command information.

According to the first aspect, the control unit may acquire the second image information from an external device based on address information related to the second image information which is included in the command information. Thus, there is an operation in which the second image information is acquired from an external device based on address information related to the second image information which is included in the command information.

According to the first aspect, when the command information has been received, the control unit may transmit confirmation information for accessing the second image information to the external device, receive permission information of permitting access to the second image information from the external device, and then acquire the second image information from the external device. Thus, there is an operation in which, when the command information has been received, confirmation information is transmitted to the external device, permission information is received from the external device, and then the second image information is acquired from the external device.

According to the first aspect, when the command information has been received, the control unit may transmit confirmation information for the other information processing device to access the second image information to the external device, receive permission information of permitting access of the other information processing device to the second image information from the external device, and then transmit setting information for the other information processing device to acquire the second image information from the external device to the other information processing device. Thus, there is an operation in which, when the command information has been received, confirmation information is transmitted to the external device, permission information is received from the external device, and then setting information is transmitted to another information processing device.

According to the first aspect, after transmitting the setting information to the other information processing device, the control unit may acquire the second image information from the external device, and transfer the second image information to the other information processing device. Thus, there is an operation in which, after the setting information is transmitted to another information processing device, the second image information is acquired from the external device and transferred to another information processing device.

According to the first aspect, the control unit may perform display control of the combined image based on control information related to an image displayed on the non-display region which is included in the command information. Thus, there is an operation in which display control of the combined image is performed based on control information included in the command information.

According to the first aspect, based on manipulation image information related to a manipulation image displayed on the non-display region which is included in the command information, the control unit may cause the manipulation image to be displayed to be superimposed on the combined image. Thus, there is an operation in which a manipulation image is displayed to be superimposed on the combined image based on manipulation image information included in the command information.

According to the first aspect, the non-display region may be a display region of an image managed under a copyright in the first image information displayed by the other information processing device. Thus, there is an operation in which an image managed under a copyright is acquired and used for the combined image.

According to the first aspect, the wireless communication unit may perform real-time image transmission with a plurality of the other information processing devices, and the control unit may cause a plurality of the combined images related to a plurality of pieces of first image information transmitted from the plurality of other information processing devices to be simultaneously displayed on the display unit. Thus, there is an operation in which a plurality of combined images related to a plurality of pieces of first image information transmitted from a plurality of other information processing devices are simultaneously displayed on the display unit.

A second aspect of the present technology is an information processing device, an information processing method thereof, and a program for causing a computer to execute the information processing method, the information processing device including: a wireless communication unit configured to perform real-time image transmission with another information processing device according to a wireless fidelity (Wi-Fi) Certified Miracast specification; and a control unit configured to perform control in a manner that command information related to a non-display region included in image information that is displayed on a display unit and transmitted to and displayed on the other information processing device is transmitted to the other information processing device, and image information other than the non-display region in the image information is transmitted to the other information processing device. Thus, there is an operation in which command information related to a non-display region included in image information that is displayed on a display unit and transmitted to and displayed on another information processing device is transmitted to another information processing device, and image information other than the non-display region in the image information is transmitted to another information processing device.

A third aspect of the present technology is an information processing system, an information processing method thereof, and a program for causing a computer to execute the information processing method, the information processing system including: a source device configured to perform real-time image transmission with a sink device according to a wireless fidelity (Wi-Fi) Certified Miracast specification, transmit command information related to a non-display region included in first image information that is image information displayed on a display unit and transmitted to and displayed on the sink device to the sink device, and transmit image information other than the non-display region in the first image information to the sink device; and the sink device configured to perform real-time image transmission with the source device according to the Wi-Fi Certified Miracast specification, acquire the second image information to be displayed on the non-display region included in the first image information transmitted from the source device based on the command information, and cause a combined image in which the first image information is combined with the second image information to be displayed on a display unit. Thus, there is an operation in which a source device transmits command information related to a non-display region included in first image information that is image information displayed on a display unit and transmitted to and displayed on the sink device to the sink device, and transmits image information other than the non-display region in the first image information to the sink device, and the sink device acquires second image information to be displayed on the non-display region included in the first image information transmitted from the source device based on the command information, and causes a combined image in which the first image information is combined with the second image information to be displayed on a display unit.

Advantageous Effects of Invention

According to the present technology, an excellent effect of enabling image information to be appropriately displayed among a plurality of information processing devices is obtained. It is not necessarily limited to the effect described herein, and any effect described in the present disclosure may be included.

BRIEF DESCRIPTION OF DRAWINGS

FIG. 3 is a block diagram illustrating a functional configuration example of an information processing device 300 according to the first embodiment of the present technology.

FIG. 4 is a diagram schematically illustrating a content example retained in a management information retention unit 390 according to the first embodiment of the present technology.

FIG. 5 is a diagram illustrating a transition example of images displayed on a display unit 351 of the information processing device 300 according to the first embodiment of the present technology.

DESCRIPTION OF EMBODIMENT(S)

Figure 1:
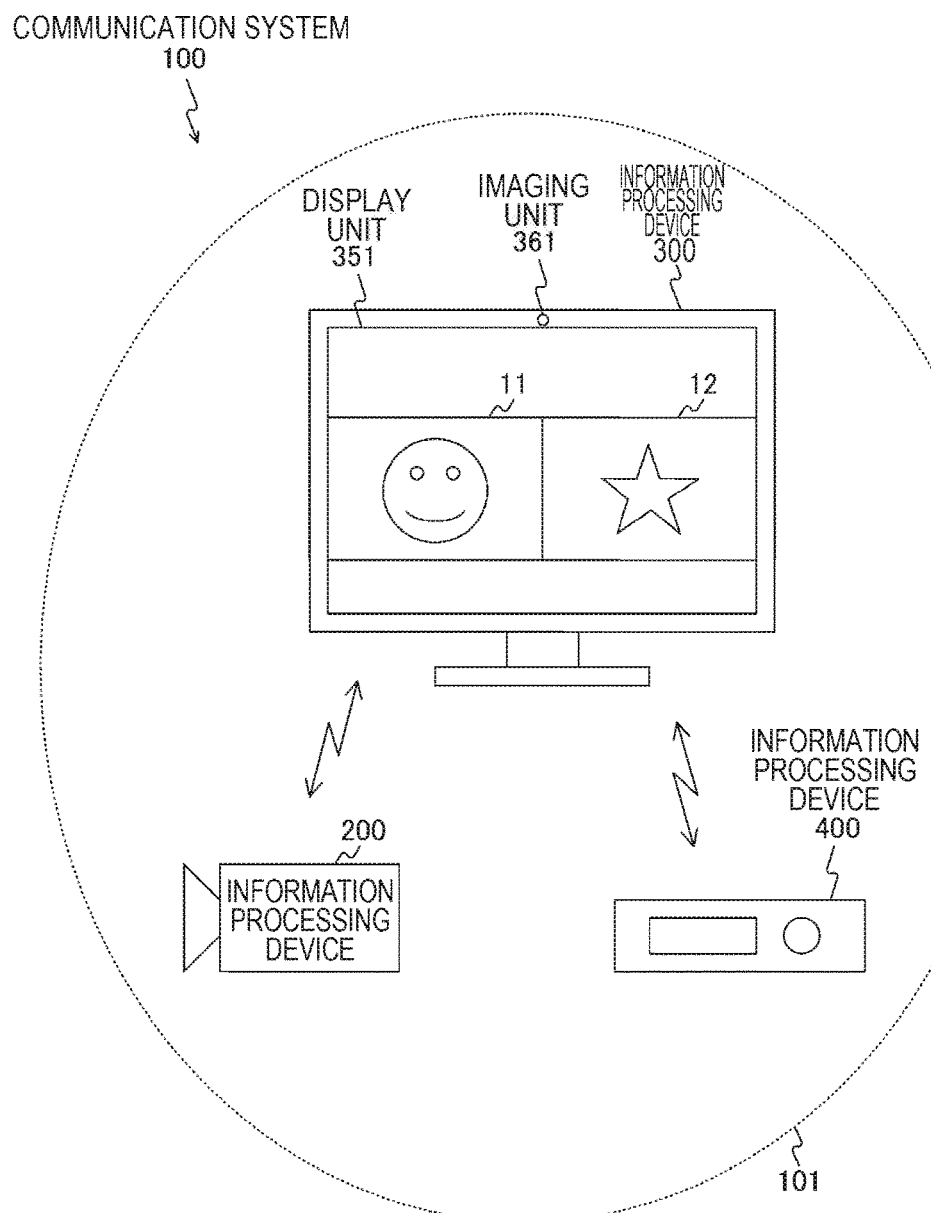
FIG. 1 is a block diagram illustrating a system configuration example of a communication system 100 according to a first embodiment of the present technology.

Hereinafter, modes (hereinafter, "embodiments") for carrying out the present technology will be described. The description will proceed in the following order:

1. First embodiment (example of controlling wireless communication based on user information or management information)
2. Second embodiment (example of setting content managed under digital copyright as display target of source device and sink device)
3. Third embodiment (example of displaying content managed under digital copyright through connection between source device and sink device via access point and direct connection between source device and sink device)
4. Fourth embodiment (example of transmitting content managed under digital copyright from source device to sink device and causing content to be displayed on sink device)
5. Application examples 1. First Embodiment Configuration Example of Communication System FIG. 1 is a block diagram illustrating a system configuration example of a communication system 100 according to a first embodiment of the present technology.

The communication system 100 includes information processing devices 200, 300, and 400. The communication system 100 is a communication system in which the information processing device 300 receives data (for example, image data or audio data) transmitted from at least one of the information processing devices 200 and 400.

The information processing devices 200, 300, and 400 are transmission and reception devices that have a wireless communication function. The information processing devices 200, 300, and 400 are, for example, display devices (for example, personal computers) or portable information processing devices (for example, smartphones or tablet terminals) that have a wireless communication function. The information processing devices 200, 300, and 400 are, for example, wireless communication devices that conform to Institute of Electrical and Electronics Engineers (IEEE) 802.11, 802.15, or 802.16, 3rd Generation Partnership Project (3GPP) specification (for example, Wideband Code Division Multiple Access (W-CDMA)), Global system for Mobile Communications (GSM: registered trademark), Worldwide Interoperability for Microwave Access (WiMAX), WiMAX2, Long Term Evolution (LTE), LTE-A (Advanced), or the like. The information processing devices 200, 300, and 400 can interchange various kinds of information using the wireless communication function.

Here, an example of a case in which wireless communication using wireless Local Area Network (LAN) is performed between the information processing devices 200 and 300 or between the information processing devices 400 and 300 will be described.

As the wireless LAN, for example, Wireless Fidelity (Wi-Fi) Direct, Tunneled Direct Link Setup (TDLS), an ad-hoc network, or a mesh network can be used. As short-range wireless audio visual (AV) transmission communication used in the communication system 100, for example, Wi-Fi Certified Miracast (technical specification title: Wi-Fi Display) can be used. Wi-Fi Certified Miracast is a mirroring technology for transmitting an audio or a display image reproduced with one terminal to another terminal using the technology of Wi-Fi Direct or TDLS and outputting the audio or image data similarly with the other terminal.

In Wi-Fi Certified Miracast, user Input Back Channel (UIBC) is realized on Transmission Control Protocol/Internet Protocol (TCP/IP). UIBC is a technology for transmitting manipulation information of an input device such as a mouse or a keyboard from one terminal to another terminal. Instead of Wi-Fi Certified Miracast, another remote desktop software (for example, Virtual Network Computing (VNC)) may be applied.

Here, in Wi-Fi Certified Miracast, for example, it is established that an image (video) is compressed and decompressed using H.264. For example, in Wi-Fi Certified Miracast, H.264 can be adjusted on a transmission side. An embodiment of the present technology is not limited to H.264, but can also correspond to various codecs such as H.265 (for example, high efficiency video coding (HEVC) and scalable video coding extensions of high efficiency video coding (SHVC)) and Moving Picture Experts Group (MPEG4), Joint 1Photographic Experts Group (JPEG) 2000. Further, it can also correspond to a line-based codec in which one or more lines are bundled and compressed or two or more lines are divided into 2×2 or more macro blocks to be compressed and decompressed. For example, by obtaining a difference with a previous code amount region of a specific code amount region (such as a picture, a bundle of a plurality of lines, or a macro block), it is possible to correspond to a codec that reduces a transmission rate without performing compression such as DCT or Wavelet. Further, an image (video) may be transmitted or received with non-compression.

In the first embodiment of the present technology, an example in which the information processing device 200 sets image data and audio data generated through an imaging operation as a transmission target will be described. In the first embodiment of the present technology, an example in which the information processing device 400 sets content (for example, content formed by image data and audio data) stored in a storage unit (for example, a hard disk) as a transmission target. An electronic device (for example, a PC, a game device, a smartphone, or a tablet terminal) on which a camera is mounted as the information processing device 200 may be used. Another electronic device (for example, an imaging device, a game device, a smartphone, or a tablet terminal) that includes a display unit as the information processing device 300 may be used. If the information processing device 400 has a tethering function, the information processing device 400 may acquire content stored in an internet services provider (IPS) via wireless or wired network and set the content as a transmission target.

For example, image data generated through an imaging operation of the information processing device 200 is transmitted to the information processing device 300 and an image 11 based on the image data is displayed on a display unit 351 of the information processing device 300. Further, content stored in a storage unit (for example, a hard disk) of the information processing device 400 is transmitted to the information processing device 300 and an image 12 based on this content is displayed on the display unit 351 of the information processing device 300.

In this way, in the first embodiment of the present technology, an example in which the information processing devices 200 and 400 serve as source side information processing devices (source devices) and the information processing device 300 serves as a sink side information processing device (sink device) will be described.

In FIG. 1, a range in which the information processing device 300 can perform direct communication via peer to peer (P2P) direct connection using wireless communication is indicated as an information conveyance range 101. The information conveyance range 101 is an information conveyance range (a service range) based on the information processing device 300.

Configuration Example of Information Processing Device (Source Device)

Figure 2:
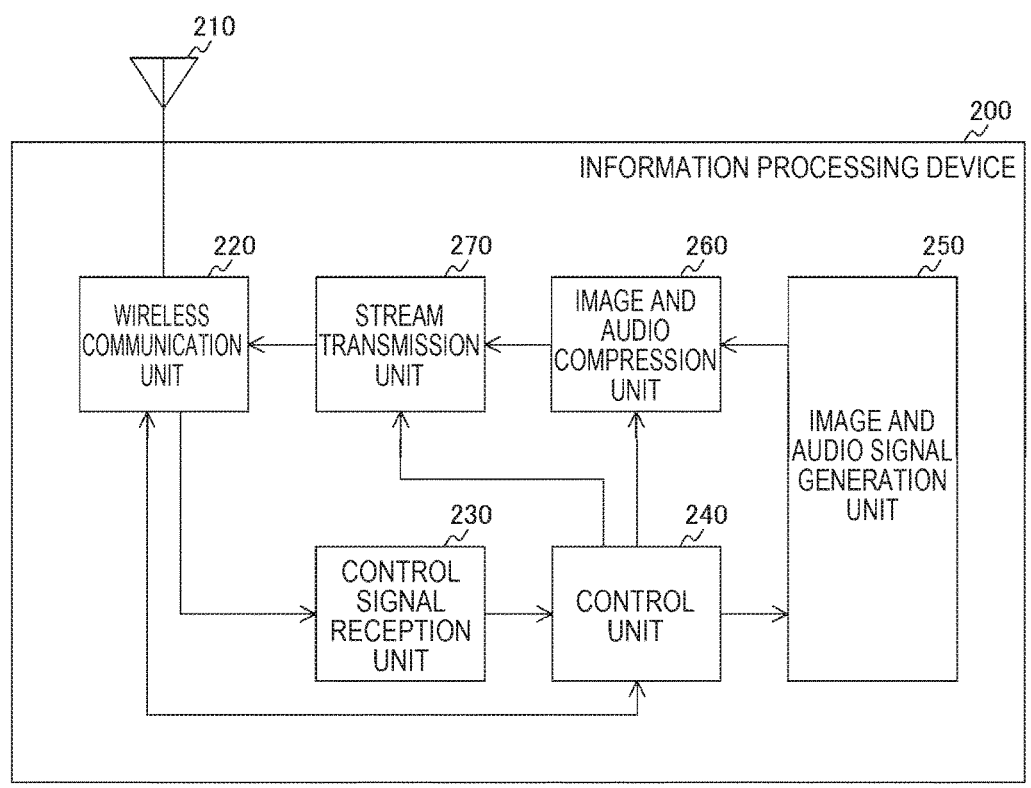
FIG. 2 is a block diagram illustrating a functional configuration example of an information processing device 200 according to the first embodiment of the present technology.

FIG. 2 is a block diagram illustrating a functional configuration example of the information processing device 200 according to the first embodiment of the present technology. The functional configuration of the information processing device 400 related to wireless communication is substantially the same as that of the information processing device 200. Therefore, in the first embodiment of the present technology, only the information processing device 200 will be described and the description of the information processing device 400 will be omitted.

The information processing device 200 includes an antenna 210, a wireless communication unit 220, a control signal reception unit 230, a control unit 240, an image and audio signal generation unit 250, an image and audio compression unit 260, and a stream transmission unit 270.

The wireless communication unit 220 transmits and receives each piece of information (for example, image data and audio data) to and from another information processing device (for example, the information processing device 300) via the antenna 210 using wireless communication under the control of the control unit 240. For example, when an image data transmission process is performed, the image data generated by the image and audio signal generation unit 250 is compressed by the image and audio compression unit 260 and the compressed image data (image stream) is transmitted from the antenna 210 via the wireless communication unit 220. For example, the wireless communication unit 220 performs real-time image transmission with another information processing device according to the Wi-Fi Certified Miracast specification.

The wireless communication unit 220 is assumed to be able to transmit and receive each piece of information to and from another information processing device (for example, the information processing device 300) using a plurality of frequency channels. In the first embodiment of the present technology, an example in which the wireless communication unit 220 has a function of transmitting and receiving three kinds of frequency channels, 2.4 GHz, 5 GHz, and 60 GHz will be described. In this way, when the source device has the function of transmitting and receiving the plurality of frequency channels, a sink device (for example, the information processing device 300) can control a frequency channel to be used by each source device.

The control signal reception unit 230 acquires a control signal (for example, information interchanged with the information processing device 300) transmitted from another information processing device (for example, the information processing device 300) among the pieces of information received by the wireless communication unit 220. Then the control signal reception unit 230 outputs the acquired control signal to the control unit 240.

The control unit 240 performs control on each piece of information to be transmitted from the information processing device 200. For example, the control unit 240 performs control on the image and audio signal generation unit 250 and the image and audio compression unit 260 based on the control signal received by the control signal reception unit 230. For example, the control unit 240 performs control such that the number of channels of audio or the resolution of image data which is a transmission target is changed or performs control such that an image region of the image data which is a transmission target is changed. That is, the control unit 240 performs transmission control of a stream (for example, data transmission speed control, scalability transmission rate control) which is a transmission target based on the control signal received by the control signal reception unit 230.

The control unit 240 may have a function of measuring a radio wave propagation situation (link radio wave propagation situation) when data is transmitted to and received from the sink device using the wireless communication and may transmit a measurement result (radio wave propagation measurement information) to the sink device.

Here, the radio wave propagation measurement information is, for example, information used to determine whether line quality with the sink device is quality with which the image data and the audio data can be transmitted and received. The radio wave propagation measurement information is used, for example, when stream transmission control (for example, the data transmission speed control, the scalability transmission rate control) is performed. The radio wave propagation measurement information will be described in detail with reference to FIG. 4. Instead of the radio wave propagation measurement information, the control unit 240 may count the number of retransmissions of the same packet and perform the stream transmission control corresponding to the counted number of retransmissions.

Here, the data transmission speed mainly means an occupancy ratio to a communication line and is assumed to include a meaning of a communication speed or a communication capacity. For example, the resolution is defined as an index of image quality configured to include a component such as an image frame (the number of vertical and horizontal pixels) of the image data, or a bit rate (compression ratio) of the image data. As the index of the quality, the throughput of a stream can be used. The number of channels of audio is assumed to include a meaning of an audio recording and reproducing method such as a monaural (1.0 ch) or a stereo (2.0 ch). The number of channels of audio is defined as an index of audio quality configured to include a component such as a bit rate (compression ratio) of audio data or the number of channels. As the index of the audio quality, the throughput of a stream can be used.

The control unit 240 performs control such that a state unstable in the data rate control is improved. For example, the control unit 240 comprehends system performance information of a sink device (for example, the information processing device 300) by interchanging information with the sink device. Here, the system performance information is, for example, performance information regarding the system of the sink device. For example, the system performance information is a usable frequency channel, a resolution, Transmission Control Protocol (TCP), and User Datagram Protocol (UDP). The system performance information is, for example, information indicating each of correspondence of an encryption method, correspondence of standard definition (SD)/high definition (HD), and correspondence of a low power consumption mode. For example, the control unit 240 can select a method for the stream transmission control (for example, the data transmission speed control and the scalability transmission rate control) to further improve the entire system stability of the communication system 100 according to whether the sink device corresponds to the lower power consumption mode.

For example, the control unit 240 is assumed to insert information regarding whether the information processing device 200 is a mobile device during interchange of information with the information processing device 300. For example, capability information regarding the information processing device 200 can include information regarding whether the information processing device 200 is a mobile device. When it is comprehended that the information processing device 200 is the mobile device, the information processing device 300 can determine that it is not necessary to operate the information processing device 200 based on association with other connected information processing devices. In this way, when it is determined that it is not necessary to operate the information processing device 200, the information processing device 200 receives a transmission stop command from the information processing device 300. When the control unit 240 comprehends the transmission stop command, the control unit 240 can be powered down the function of each of the image and audio signal generation unit 250, the image and audio compression unit 260, and the stream transmission unit 270 for a given time. The control unit 240 can transition the wireless communication unit 220 to intermittent reception (which is a mode in which the wireless communication unit 220 rises up periodically so that the wireless communication unit 220 can receive a command from the information processing device 300 and the device is powered down in other cases).

The image and audio signal generation unit 250 generates data (image data and audio data) which is an output target under the control of the control unit 240 and outputs the generated data to the image and audio compression unit 260. For example, the image and audio signal generation unit 250 includes an imaging unit (not illustrated) and an audio acquisition unit (not illustrated). The imaging unit (for example, a lens, an image sensor, or a signal processing circuit) images a subject and generates an image (image data). The audio acquisition unit (for example, a microphone) acquires a surrounding audio when the image data is generated. The data generated in this way is a transmission target to be transmitted to another information processing device (for example, the information processing device 300).

The image and audio compression unit 260 compresses (encodes) the data (the image data and the audio data) generated by the image and audio signal generation unit 250 under the control of the control unit 240. Then, the image and audio compression unit 260 outputs the compressed data (the image data and the audio data) to the stream transmission unit 270. The image and audio compression unit 260 may be realized by performing the encoding by software or may be realized by performing the encoding by hardware. The image and audio compression unit 260 is assumed to function as a codec, but is assumed to be able to handle an uncompressed image or audio. Further, the image and audio compression unit 260 can also function as a scalable codec.

Here, the scalable codec means, for example, a codec which can be applied freely according to the resolution of a reception side information processing device (sink device), a network environment, or the like.

The stream transmission unit 270 performs a transmission process of transmitting the data (the image data and the audio data) compressed by the image and audio compression unit 260 as a stream from the antenna 210 via the wireless communication unit 220 under the control of the control unit 240.

The information processing device 200 can include a display unit, an audio output unit, and a manipulation reception unit in addition to the above-described units, but these units are not illustrated in FIG. 2. The example in which the information processing device 200 generates the image data and the audio data which are the transmission targets has been described. However, the information processing device 200 may acquire image data and audio data which are transmission targets from an external device. For example, the information processing device 200 may acquire image data and audio data which are transmission targets from a web camera equipped with a microphone. The information processing device 200 may set content (for example, content formed by image data and audio data) stored in a storage device (for example, a hard disk) as a transmission target irrespective of the inside or outside of the information processing device 200. In this case, the content stored in the storage device is also assumed to be compressed content. In this case, when the compressed content is compressed in accordance with an encoding scheme defined in a standard adopted in the communication system 100, the compressed content may be transmitted without being decrypted (decoded).

A display unit (not illustrated) of the information processing device 200 is, for example, a display unit that displays an image generated by the image and audio signal generation unit 250. As the display unit, for example, a display panel such as an electro-luminescence (EL) or crystal light-emitting diode (LED) display or a liquid crystal display (LCD) can be used.

An audio output unit (not illustrated) of the information processing device 200 is, for example, an audio output unit (for example, a speaker) that outputs an audio generated by the image and audio signal generation unit 250. An image can be output from both of a transmission device and a reception device, but an audio is preferably output from only one of the transmission device and the reception device.

A manipulation reception unit (not illustrated) of the information processing device 200 is a manipulation reception unit that receives a manipulation input performed by a user and is, for example, a keyboard, a mouse, a game pad, a touch panel, a camera, or a microphone. The manipulation reception unit and the display unit can be integrally configured using a touch panel capable of performing a manipulation input when the user touches or approaches a display surface with his or her finger.

Configuration Example of Information Processing Device (Sink Side)

FIG. 3 is a block diagram illustrating a functional configuration example of the information processing device 300 according to the first embodiment of the present technology.

The information processing device 300 includes an antenna 310, a wireless communication unit 320, a stream reception unit 330, an image and audio decompression unit 340, an image and audio output unit 350, a user information acquisition unit 360, a control unit 370, a control signal transmission unit 380, and a management information retention unit 390.

The wireless communication unit 320 transmits and receives each piece of information (for example, image data and audio data) to and from another information processing device (for example, the information processing device 200) via the antenna 310 using wireless communication under the control of the control unit 370. For example, when an image data reception process is performed, the image data received by the antenna 310 is decompressed (decoded) by the image and audio decompression unit 340 via the wireless communication unit 320 and the stream reception unit 330. Then, the decompressed image data is supplied to the image and audio output unit 350 and an image according to the decompressed image data is output from the image and audio output unit 350. That is, the image according to the decompressed image data is displayed on a display unit 351. For example, the wireless communication unit 320 performs real-time image transmission with another information processing device according to the Wi-Fi Certified Miracast specification.

The wireless communication unit 320 is assumed to be able to transmit and receive each piece of information to and from another information processing device (for example, the information processing device 200) using a plurality of frequency channels. In the first embodiment of the present technology, an example in which the wireless communication unit 320 has a function of transmitting and receiving three kinds of frequency channels, 2.4 GHz, 5 GHz, and 60 GHz will be described. That is, the wireless communication unit 320 can perform communication using a first frequency band and communication using a second frequency band of a higher data transmission speed than the first frequency band. The control unit 370 controls a frequency channel to be used among a plurality of frequency channels in wireless communication with each source device.

Link between the information processing devices 200 and 300 and link between the information processing devices 400 and 300 may be established with the same frequency channel or may be established with different frequency channels.

In the first embodiment of the present technology, an example in which the wireless communication unit 320 has the function of transmitting and receiving three kinds of frequency channels, 2.4 GHz, 5 GHz, and 60 GHz will be described, but an embodiment of the present technology is not limited thereto. For example, the wireless communication unit 320 may have a function of transmitting and receiving other frequency channels, two frequency channels, four or more frequency channels.

The stream reception unit 330 receives streams (for example, an image stream and an audio stream) and interchange information with each source device among the pieces of information received by the wireless communication unit 320 under the control of the control unit 370. Then, the stream reception unit 330 outputs the received command information to the control unit 370 and outputs the received streams to the image and audio decompression unit 340 and the control unit 370.

Here, the interchange information with each source device is information transmitted from a source device (for example, the information processing device 200) and includes, for example, a request for acquiring system performance information of the information processing device 300. The system performance information is, for example, information indicating a usable frequency channel, a resolution, TCP, and UDP or each of correspondence of an encryption method, correspondence of SD/HD, and correspondence of a low power consumption mode.

The stream reception unit 330 has a function of measuring a radio wave propagation situation (link radio wave propagation situation) when data is transmitted to and received from a sink device using the wireless communication. The stream reception unit 330 outputs a measurement result (radio wave propagation measurement information) to the control unit 370. The radio wave propagation measurement information will be described in detail with reference to FIG. 4.

The image and audio decompression unit 340 decompresses (decodes) the streams (image data and the audio data) transmitted from another information processing device (for example, the information processing device 200) under the control of the control unit 370. Then, the image and audio decompression unit 340 outputs the decompressed data (the image data and the audio data) to the image and audio output unit 350. The image and audio decompression unit 340 may be realized by performing the decoding by software or may be realized by performing the decoding by hardware. The image and audio decompression unit 340 is assumed to function as a codec, but is assumed to be able to handle an uncompressed image or audio. Further, the image and audio decompression unit 340 can also function as a scalable codec.

The image and audio output unit 350 includes a display unit 351 and an audio output unit 352.

The display unit 351 is a display unit that displays each image (for example, the images 11 and 12 illustrated in FIG. 1) based on the image data decompressed by the image and audio decompression unit 340. As the display unit 351, for example, a display panel such as an organic EL panel, a crystal LED display, an LCD panel can be used. As the display unit 351, a touch panel capable of performing a manipulation input when a user touches or approaches a display surface with his or her finger may be used.

The audio output unit 352 is an audio output unit (for example, a speaker) that outputs various audios (an audio and the like related to an image displayed on the display unit 351) based on the audio data decompressed by the image and audio decompression unit 340. Here, as an audio output method, for example, a method of reproducing only an audio of a source device allocated to a middle channel (a main image) from a speaker and reproducing no audio of a source device allocated to a peripheral channel (a sub-image) can be used. As another audio output method, for example, a method of setting the volume of an audio of a source device allocated to the middle channel as a main and lowering the volume of an audio of a source device allocated to the peripheral channel and reproducing the audio can be used. Other audio output methods may be used.

The user information acquisition unit 360 acquires information regarding a user (user information) and outputs the acquired user information to the control unit 370. For example, the user information acquisition unit 360 can acquire the user information by receiving an input from a manipulation reception unit (a keyboard, a mouse, a remote controller, a game pad, or a touch panel) for which the user can directly set a display method. The manipulation reception unit is, for example, a manipulation member that designates any region in an image displayed on the display unit 351. For example, the user information acquisition unit 360 can acquire the user information by receiving an input from a device which can comprehend a user's intention, such as a camera, a microphone, or any of various sensors (for example, gyro sensors and sensors detecting human bodies).

For example, the user information acquisition unit 360 acquires the user information generated through a user motion when information based on the stream received from another information processing device (for example, the information processing device 200) using the wireless communication is output from the image and audio output unit 350. The user information is, for example, user information generated through a user motion related to an image displayed on the display unit 351. For example, the user information is information generated based on a user manipulation related to the image displayed on the display unit 351.

The control unit 370 causes the management information retention unit 390 to retain each piece of information acquired by the stream reception unit 330 and manages each source device based on management information retained the management information retention unit 390. The control unit 370 performs the stream transmission control (for example, the data transmission speed control, and the scalability transmission rate control) so that stability is improved for streams transmitted from a plurality of source devices in the entire system.

For example, the control unit 370 performs the stream transmission control (for example, the data transmission speed control and the scalability transmission rate control) based on the user information acquired by the user information acquisition unit 360 and the management information retained in the management information retention unit 390. Specifically, the control unit 370 generates a control signal for each source device to perform the stream transmission control (for example, the data transmission speed control and the scalability transmission rate control) based on the management information retained in the management information retention unit 390 and outputs the generated control signal to the control signal transmission unit 380. For example, the control unit 370 changes the resolution of an image displayed on the display unit 351 based on the user information and the management information and generates a control signal to request a transmission rate equivalent to the resolution to each source device. For example, the control unit 370 generates a control signal to change a display region of an image on the display unit 351 based on the user information and the management information. For example, the control unit 370 generates a control signal to change the size of an image on the display unit 351 based on the user information and the management information.

The control unit 370 performs control such that a frequency channel and a resolution to be used are set based on the user information and the management information. For example, the control unit 370 sets a frequency channel to be used for each source device in the plurality of frequency channels of the wireless communication unit 320. When the power consumption mode is different from each frequency channel, the control unit 370 comprehends each mode and sets the frequency channel for caring the power consumption of a mobile device. That is, the control unit 370 can separately set a first power consumption mode related to the first frequency band and a second power consumption mode related to the second frequency band of a higher data transmission speed than the first frequency band.

The control signal transmission unit 380 performs a transmission process of transmitting the control signal output from the control unit 370 to another wireless communication device via the wireless communication unit 320 and the antenna 310.

The management information retention unit 390 is a table that retains information (management information) to manage each source device connected to the information processing device 300 using the wireless communication. Content retained in the management information retention unit 390 will be described in detail with reference to FIG. 4.

Content Example Retained in Management Information Retention Unit

FIG. 4 is a diagram schematically illustrating a content example retained in the management information retention unit 390 according to the first embodiment of the present technology.

The management information retention unit 390 is a table that retains information (management information) to manage each source device connected to the information processing device 300 using the wireless communication. For example, in the management information retention unit 390, terminal identification information 391, a frequency channel 392, a radio wave propagation measurement information 393, device information 394, a band use level 395, a display form 396, standby or wake-up 397, and multi-reception diversity correspondence 398 are retained in association therewith.

In the terminal identification information 391, identification information is stored to identify the source devices connected to the information processing device 300 using the wireless communication.

In the frequency channel 392, a frequency channel actually used by the source device connected to the information processing device 300 using the wireless communication is stored.

In the radio wave propagation measurement information 393, radio wave propagation measurement information regarding the source device connected to the information processing device 300 using the wireless communication is stored. The radio wave propagation measurement information is measured by the stream reception unit 330 for each source device connected to the information processing device 300 using the wireless communication.

As the radio wave propagation measurement information 393, for example, a packet error rate (PER), a bit error rate (BER), the number of retransmissions of packets, and a throughput are stored. As the radio wave propagation measurement information 393, for example, frame drop, a signal to interference ratio (SIR), and a received signal strength indicator (RSSI) are stored. Here, instead of the SIR, a signal to interference plus noise ratio (SINR) may be used. The radio wave propagation measurement information 393 illustrated in FIG. 4 is an example. At least one piece of information among the pieces of information may be stored or another piece of radio wave propagation measurement information may be measured by the stream reception unit 330 to be stored. The radio wave propagation measurement information measured by the source device may be acquired and stored. Packet delay received by a reception side may be determined and information regarding the packet delay may be used as radio wave propagation measurement information. The packet delay serves as one index related to radio wave propagation since delay occurs in transmission to the reception side through a retransmission process in layer 2 at the time of occurrence of an error. The packet delay serves as, for example, an index indicating where link characteristics deteriorate in a wireless system in which a plurality of devices share wireless bands.

In the device information 394, classification of the source device (an attribute of the source device) connected to the information processing device 300 using the wireless communication is stored. For example, either of a mobile device and a stationary device is stored as the classification of the source device. Either of a device of which a power source is inserted and another device may be stored as the classification of the source device. Either of a battery-driven device and another device may be stored as the classification of the source device.

In the band use level 395, a band use level of the source device connected to the information processing device 300 using the wireless communication is stored. As the band use level, for example, a resolution or a throughput can be used. For example, in the band use level, a throughput during use may be stored, a pre-decided table may be prepared, and a number indicating correspondence of a range of the table may be stored and managed.

In the display form 396, a data display form (an output form) based on a stream transmitted from the source device connected to the information processing device 300 using the wireless communication is stored. For example, a display form (a main image (a middle channel) or a sub-image (a peripheral channel)) of the image data which is displayed on the display unit 351 and which is based on the stream transmitted from the source device is stored. For example, an output form (a main audio or a sub-audio) of the audio data which is output from the audio output unit 352 and which is based on the stream transmitted from the source device is stored. A format in which the peripheral channel is not displayed may be realized in accordance with the display form.

In the standby or wake-up 397, a mode (a standby mode or a wake-up mode) of the source device connected to the information processing device 300 using the wireless communication is stored. The standby mode and the wake-up mode will be described in detail with reference to FIGS. 6 to 8.

In the multi-reception diversity correspondence 398, information indicating whether the source device connected to the information processing device 300 using the wireless communication corresponds to the multi-reception diversity is stored.

In this way, the management information retained in the management information retention unit 390 is information for associating the identification information (the terminal identification information 391) used to identify the other information processing device with the capability information regarding the other information processing device for management. The management information retained in the management information retention unit 390 includes at least the information (the radio wave propagation measurement information 393) regarding the radio wave propagation measurement related to the communication with the other information processing device and the information (the standby or wake-up 397) regarding power consumption as the capability information regarding the other information processing device. The management information retained in the management information retention unit 390 includes the information (the display form 396) regarding a display form for displaying the image information as the capability information regarding the other information processing device. The information regarding the display form is, for example, information indicating that the image information is displayed as main information or sub-information.

Transition Example of Image

FIG. 5 is a diagram illustrating a transition example of images displayed on the display unit 351 of the information processing device 300 according to the first embodiment of the present technology.

FIG. 5a illustrates an example of a display form in which the images 11 and 12 are displayed on the display unit 351 of the information processing device 300 by setting the image 11 as a middle channel and setting the image 12 as a peripheral channel.

FIG. 5b illustrates an example of a display form in which the images 11 and 12 are displayed on the display unit 351 of the information processing device 300 by setting the image 11 as a peripheral channel and setting the image 12 as a middle channel.

For example, a case in which each of the information processing devices 200 and 400 transmits a stream (the image data and the audio data) with a standard resolution to the information processing device 300 is assumed. In this case, as illustrated in FIG. 1, the image 11 based on the image data from the information processing device 200 and the image 12 based on the image data from the information processing device 400 can be displayed on the display unit 351 of the information processing device 300 so that the sizes of the images 11 and 12 are the same. In this example, a given resolution and a display region are defined to be the same, but a scaler function may be added to the display unit 351 so that the images 11 and 12 are rescaled and displayed on the display unit 351. However, in the embodiments of the present technology, to facilitate the description, this function is assumed not to be used in the description.

In the display forms of the images 11 and 12, for example, the display forms set at the time of the previous communication may be retained and the images 11 and 12 may be displayed on the display unit 351 of the information processing device 300 according to the display forms.

The display forms of the images 11 and 12 may be decided based on an order of connection to the information processing device 300. For example, a case in which the information processing device 200 is first connected to the information processing device 300 and the information processing device 400 is connected to the information processing device 300 after the connection is assumed. In this case, the images 11 and 12 are displayed on the display unit 351 of the information processing device 300 by setting the image 11 as the middle channel and setting the image 12 as the peripheral channel. That is, the images may be displayed in the procedure of the middle channel and the peripheral channel based on the order of the connection to the information processing device 300.

As illustrated in FIG. 5a, when the images 11 and 12 are displayed on the display unit 351 by setting the image 11 as the middle channel and setting the image 12 as the peripheral channel, user information for setting the image 12 as the middle channel is assumed to be acquired by the user information acquisition unit 360. For example, when a viewer performs a manipulation of setting the image 12 as the middle channel using a pointer such as a remote controller or a gesture, the user information for setting the image 12 as the middle channel is acquired by the user information acquisition unit 360. In this case, as illustrated in FIG. 5b, the images 11 and 12 are displayed on the display unit 351 by setting the image 12 as the middle channel and setting the image 11 as the peripheral channel. Further, display positions of the images 11 and 12 on the display surface of the display unit 351 are decided based on user information (for example, a manual manipulation or a line of sight) acquired by the user information acquisition unit 360.

Communication Example

Figure 6:
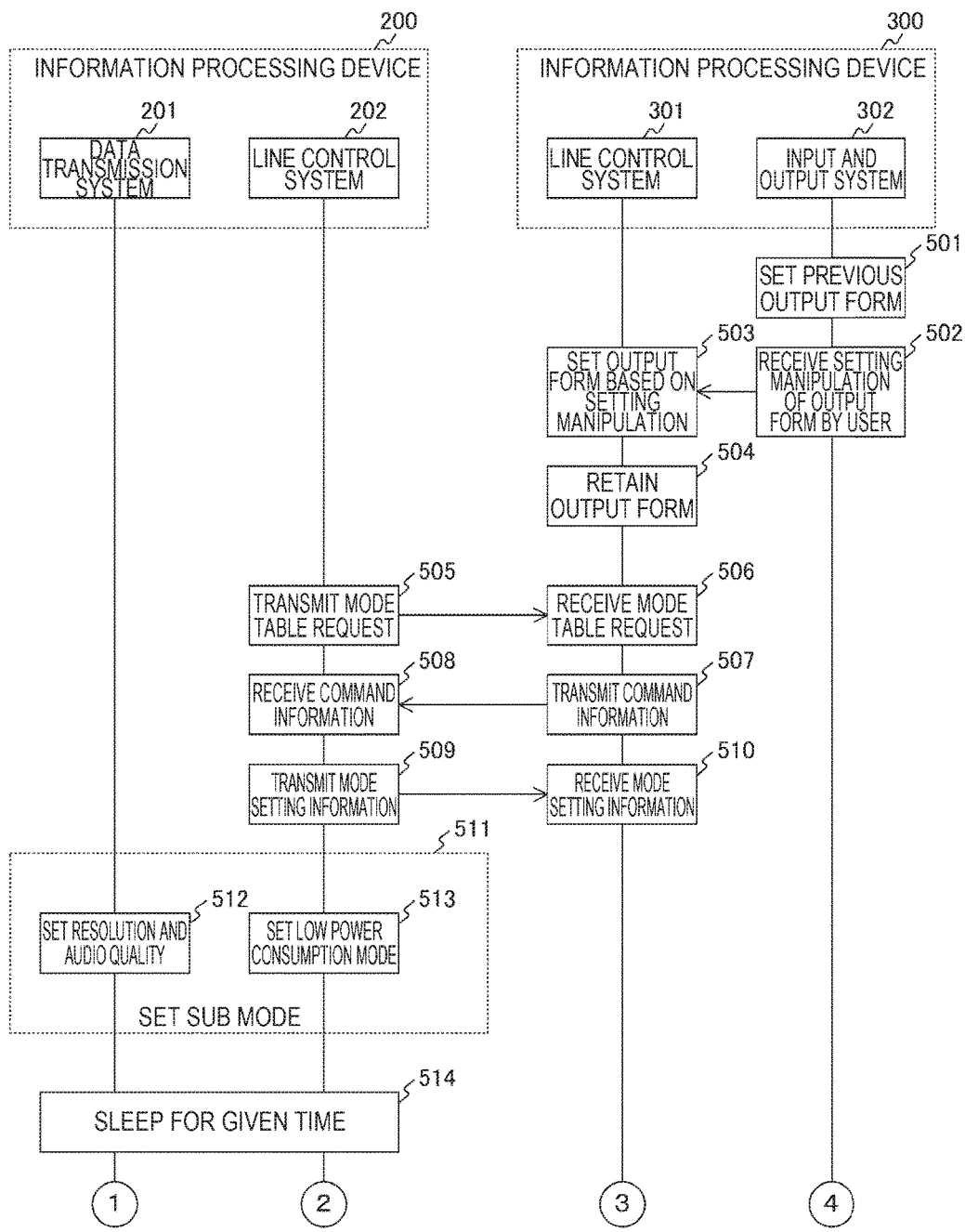
FIG. 6 is a sequence chart illustrating a communication process example between devices included in the communication system 100 according to the first embodiment of the present technology.
Figure 7:
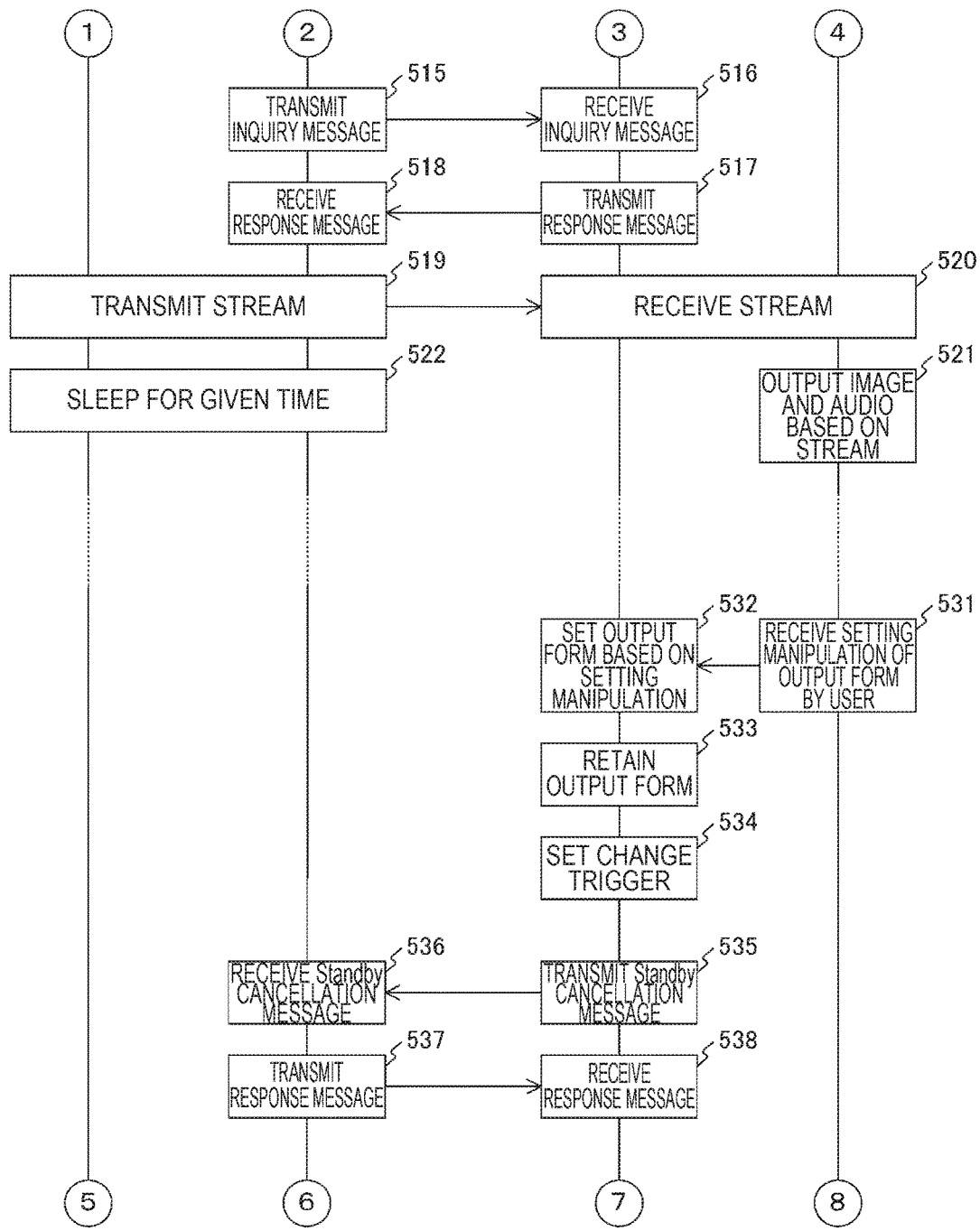
FIG. 7 is a sequence chart illustrating a communication process example between devices included in the communication system 100 according to the first embodiment of the present technology.
Figure 8:
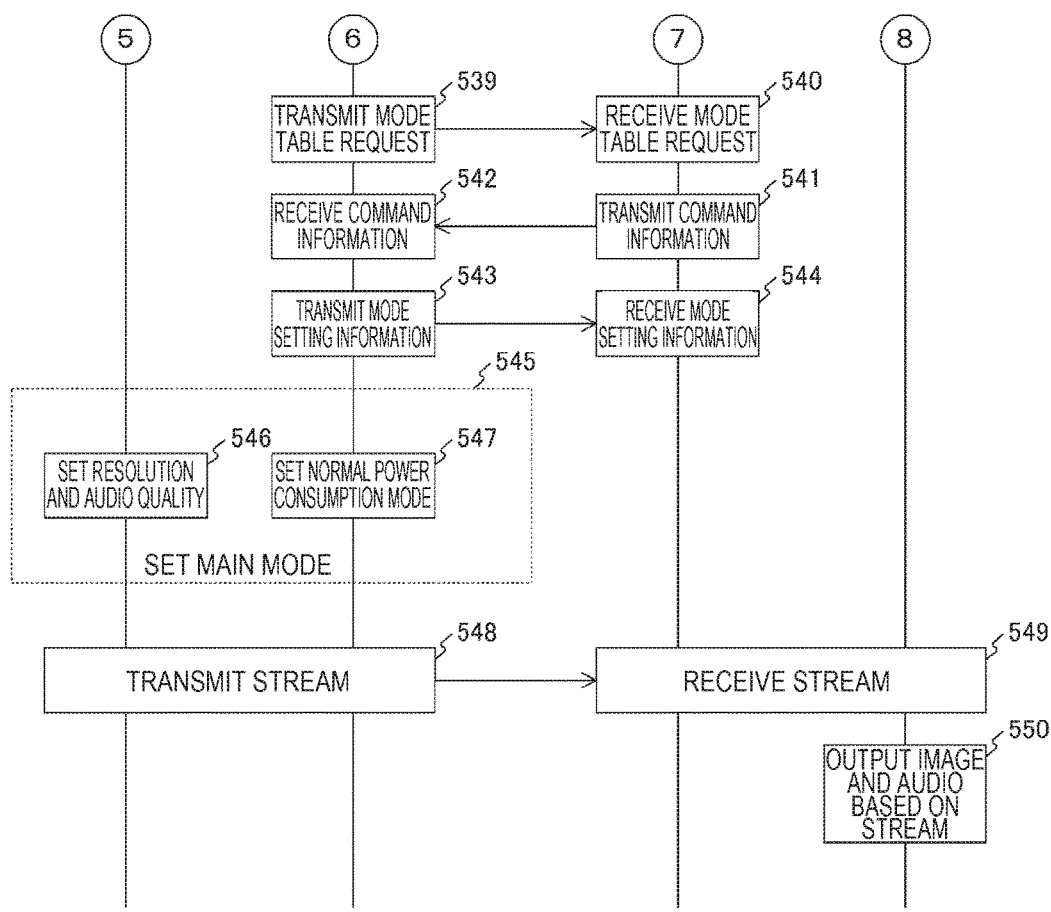
FIG. 8 is a sequence chart illustrating a communication process example between devices included in the communication system 100 according to the first embodiment of the present technology.

FIGS. 6 to 8 are sequence charts illustrating a communication process example between the devices included in the communication system 100 according to the first embodiment of the present technology. FIGS. 6 to 8 illustrate an example of a communication process between the information processing devices 200 and 300.

In FIGS. 6 to 8, the image and audio signal generation unit 250, the image and audio compression unit 260, and the stream transmission unit 270 among the units included in the information processing device 200 are illustrated as a data transmission system 201. The antenna 210, the wireless communication unit 220, the control signal reception unit 230, and the control unit 240 are illustrated as a line control system 202.

In FIGS. 6 to 8, the antenna 310, the wireless communication unit 320, the stream reception unit 330, the control unit 370, and the control signal transmission unit 380 in the configuration of the information processing device 300 are illustrated as a line control system 301. The image and audio decompression unit 340, the image and audio output unit 350, and the user information acquisition unit 360 are illustrated as an input and output system 302.

In FIGS. 6 to 8, first, an example in which an image based on the image data from the information processing device 200 is displayed as a peripheral channel on the display unit 351 of the information processing device 300 and a low power consumption mode is set in the information processing device 200 is illustrated. Subsequently, an example in which an image based on the image data from the information processing device 200 is displayed as a middle channel on the display unit 351 and a normal power consumption mode is set in the information processing device 200 is illustrated. That is, in FIGS. 6 to 8, a connection setup example of the information processing devices 200 and 300 and a transition example of the power consumption mode in the information processing device 200 are illustrated.

First, when the information processing device 300 is powered up, a previous output form (which is an output form when the information processing device 300 is powered down) is set as an output form (which is an image display form and an audio output form) of the information processing device 300 (501). The control unit 370 of the information processing device 300 causes the management information retention unit 390 to retain the management information of each source device connected to the information processing device 300 using the wireless communication (illustrated in FIG. 4). As illustrated in FIG. 5, the control unit 370 of the information processing device 300 causes the display unit 351 to display the images 11 and 12 corresponding to two streams respectively transmitted from the information processing devices 200 and 400 based on the previous output form.

Subsequently, a case in which the user performs a manipulation of setting the output form (changing manipulation) is assumed (502). In this case, a control signal related to the setting manipulation is acquired as the user information by the user information acquisition unit 360 and the user information is output to the control unit 370. Then, the control unit 370 changes the content retained in the management information retention unit 390 (illustrated in FIG. 4) based on the user information (503 and 504). For example, as illustrated in FIG. 5b, a case in which the setting manipulation (changing manipulation) is performed to set the image 11 based on the image data from the information processing device 200 as the peripheral channel is assumed. In this case, the control unit 370 changes the display form 396 (illustrated in FIG. 4) of the information processing device 200 in the management information retention unit 390 to "SUB" (503 and 504).

The information processing device 200 transmits a mode table request (an inquiry request of the resolution, the audio quality, the low power consumption mode, and the like) to the information processing device 300 periodically or aperiodically (also including only the start time) (505 and 506). The mode table request is a request for transmitting each piece of information (which is information used to communicate with the information processing device 200 with the management information regarding the information processing device 300 (for example, resolution information or the like which can be displayed by the information processing device 200)) managed in the information processing device 300.

When the information processing device 300 receives the mode table request (506), the information processing device 300 transmits command information according to the mode table request (507 and 508). The command information is information regarding the information processing device 200 used for the information processing device 300 to give a setting demand to the information processing device 200 along with the radio wave propagation environment and the display form. For example, the command information is information that includes output form information (for example, a middle channel and a peripheral channel) of the resolution and the audio quality, whether to correspond to the low power consumption mode, a maker name, and presence or absence of a multi-reception diversity function. For example, the command information is information that includes the resolution and the audio quality, the kinds of image and audio codecs, presence of absence of a 3D function, presence or absence of the content protection, the display size of a display device, topology information, a usable protocol, setting information (port information or the like) of the protocol, connection interface information (the type of connector or the like), horizontal synchronization and vertical synchronization positions, performance priority request information of a source device, a mode control table response to whether to correspond to the low power consumption mode, a maximum transmission throughput or a receivable maximum throughput of wireless transmission, central processing unit (CPU) power, a battery remaining quantity, and power supply information. Each piece of information is included in a part of capability information. Here, the output form information of the resolution and the audio quality regarding the information processing device 200 is, for example, information indicating whether the display form of the data from the information processing device 200 is a main form (a middle channel) or a sub-form (a peripheral channel). The information processing device 300 transmits the command information including a demand for the setting of the resolution and the audio quality or the low power consumption mode as a parameter from the viewpoint of the information processing device 300. Besides each piece of information regarding the information processing device 200, the information processing device 300 may transmit each piece of information regarding all the source devices as the command information. In this case, the information processing device 200 selects and uses only information dedicated for the own information processing device. When a device that conforms to Wi-Fi Certified Miracast, the device corresponds to wfd-audio-codecs, wfd-video-formats, wfd-content-protection, wfd-displayedid, wfd-coupledsink, wfd-client-rtpports, wfd-I2C, wfd-uibccapability, wfd-connectortype, wfd-sandby-resume-capability, and the like defined as RTSP Message, but message content to be transmitted is assumed not to be limited in these commands.

When the information processing device 200 receives the command information (508), the control unit 240 of the information processing device 200 specifies whether the output form of the data from the information processing device 200 is the main form or the sub-form based on the command information. Based on the command information, the control unit 240 of the information processing device 200 determines whether the information processing device 300 has a function corresponding to a power consumption operation mode. Subsequently, the control unit 240 of the information processing device 200 transmits mode setting information indicating that the specified output form is set to the information processing device 300 (509 and 510). Here, the sub-form is assumed to be specified as the output form of the data from the information processing device 200. The information processing device 300 is assumed to have a function corresponding to the low power consumption mode. Accordingly, the control unit 240 of the information processing device 200 transmits mode setting information for notifying the information processing device 300 that the specified output form (sub-form) is set and the low power consumption mode is set, to the information processing device 300 (509 and 510).

In this example, the example in which the image is specified as the middle channel or the peripheral channel and the low power consumption mode is set based on the command information has been described, but the low power consumption mode may be set without using the determination of the middle channel or the peripheral channel as a reference. For example, the low power consumption mode may be set by interchanging a permission flag indicating that the mode can transition to the low power consumption mode between the source and sink devices.

Subsequently, the control unit 240 of the information processing device 200 sets a image transmission mode (the peripheral channel) as the transmission mode (511). Accordingly, in the data transmission system 201, audio quality is set to output a resolution and sub-audio for displaying the peripheral channel (512). In the line control system 202, the low power consumption mode is set (513).

Here, when the low power consumption mode is set in this way, both of the sink and source devices are assumed to have the function. For example, a mobile device (for example, a cellular phone, a smartphone, or a tablet terminal) is driven by a battery to operate in many cases. Therefore, when the output form of the data from the own information processing device is not the main form (when the output form is the sub-form), it is desirable to reduce battery consumption of the own information processing device as much as possible. Accordingly, in the source device in which the output form in the sink device is set to the sub-form, it is desirable to set the low power consumption mode. Further, in the setting process (512), only an audio of the source device allocated to the middle channel may be set to be reproduced from a speaker and the audio of the source device allocated to the peripheral channel may be set not to be reproduced. The volume of the audio of the source device allocated to the middle channel may be set as a main and the volume of the audio of the source device allocated to the peripheral channel may be set to be lowered and reproduced.

In this way, the control unit 370 of the information processing device 300 performs control such that the low power consumption mode in the information processing device 200 is set when the output form is set as the peripheral channel (sub-display). That is, the control unit 370 of the information processing device 300 performs control such that the power consumption mode is set in the information processing device 200 based on the output form of the display unit 351 in which the image information is output based on the stream.

When the low power consumption mode is set in this way (513), the control unit 240 of the information processing device 200 starts intermittent transmission (514 to 522).

Specifically, the information processing device 200 stops the transmission process only for a given time and sleeps each unit (514). Subsequently, when the given time passes (514), the information processing device 200 wakes up each unit of the information processing device 200 to perform the transmission process and performs the transmission process to the information processing device 300 (515 to 520).

For example, the control unit 240 of the information processing device 200 transmits an inquiry message for confirming whether any change is made in the information processing device 300 to the information processing device 300 (for example, a change in the output form) (515 and 516).

When the inquiry message is received (516), the control unit 370 of the information processing device 300 transmits a response message to the information processing device 200 to notify whether any change is made (for example, the change in the output form) (517 and 518). Here, it is assumed that no change is made in the information processing device 300 (for example, the change in the output form). Therefore, the control unit 370 of the information processing device 300 transmits a response message for notifying that no change is made (for example, the change in the output form) to the information processing device 200 (517 and 518).

When the response message indicating that no change is made (for example, the change in the output form) in this way (518), it is not necessary to change the setting in the information processing device 200. Therefore, the control unit 240 of the information processing device 200 transmits a stream for outputting the peripheral channel and the sub-audio to the information processing device 300 (519 and 520). When the information processing device 300 receives the stream in this way (520), the information processing device 300 outputs the image and the audio based on the received stream (521). For example, as illustrated in FIG. 5b, the image 11 based on the stream from the information processing device 200 is displayed as the peripheral channel on the display unit 351.

When the transmission process ends (519), the information processing device 200 stops the transmission process only for a given time and sleeps each unit (522). The intermittent transmission is continuously performed until a change request is given from the information processing device 300.

Here, in the intermittent transmission, a period in which the stream is not transmitted from the information processing device 200 occurs. Therefore, the information processing device 300 preferably performs a display process of interpolating and displaying the image corresponding to the stream finally received from the information processing device 200. However, the information processing device 300 is assumed not to have an interpolation process function either. In this case, during the sleep period, the image from the information processing device 200 may not be displayed on the display unit 351. Therefore, when the information processing device 300 does not have the interpolation process function, the image data from the information processing device 200 may be continuously transmitted. For example, in the stream which is a transmission target from the information processing device 200, the final image data at the time of the transmission stop is retained in a transmission buffer. During the sleep period, the image processing of the information processing device 200 is stopped, but the transmission process is continuously performed in a wireless link and the image data retained in the transmission buffer is continuously transmitted.

During the sleep period, only the image corresponding to the stream transmitted from the information processing device 400 may be displayed on the display unit 351. For example, the image corresponding to the stream transmitted from the information processing device 400 can be displayed on the entire surface of the display unit 351.

Next, an example of the case in which the user performs a manipulation of setting the output form (changing manipulation) will be described.

When the user performs the manipulation of setting the output form (changing manipulation) (531), as described above, the control unit 370 changes the content retained in the management information retention unit 390 (illustrated in FIG. 4) based on the user information related to the setting manipulation (532 and 533). For example, as illustrated in FIG. 5a, the case in which the user performs the setting manipulation (changing manipulation) of setting the image 11 based on the image data from the information processing device 200 as the middle channel is assumed. In this case, the control unit 370 changes the display form 396 (illustrated in FIG. 4) of the information processing device 200 in the management information retention unit 390 to "MAIN" (532 and 533).

Here, as described above, when the low power consumption mode is set in the information processing device 200, the information processing device 200 is assumed to sleep. In this way, when the information processing device 200 sleeps, the information processing device 200 may not be notified that the user performs the manipulation of setting the output form (changing manipulation).

Accordingly, when the user performs the manipulation of setting the output form (changing manipulation) 531 and the content retained in the management information retention unit 390 (illustrated in FIG. 4) is changed (532 and 533), the control unit 370 of the information processing device 300 sets a change trigger (534). The change trigger is a trigger for notifying the information processing device 200 that the user performs the manipulation of setting the output form (changing manipulation) when the inquiry message is received from the information processing device 200. Through the change trigger, the information processing device 200 cancels the state of the standby mode and notifies the information processing device 200 that the user performs the manipulation of setting the output form (changing manipulation).

Here, a case in which each unit of the information processing device 200 wakes up and the transmission process to the information processing device 300 starts is assumed. In this case, the control unit 370 of the information processing device 300 transmits a standby cancellation message to the information processing device 200 (535 and 536).

When the standby cancellation message is received (536), the control unit 240 of the information processing device 200 transmits a response message to the information processing device 300 (537 and 538).

In this way, it is necessary to inquire the setting in the information processing device 200 in accordance with the standby mode cancellation request from the sink device (535 to 538). Therefore, the control unit 240 of the information processing device 200 transmits the mode table request to the information processing device 300 (539 and 540). As described above, the mode table request is a request for transmitting each piece of information (the management information regarding the information processing device 200) managed in the information processing device 300. In the above-described processes (535 to 538), the messages (for example, the response message to the inquire message in the processes (515 to 518)) of the change (for example, the change in the output form) may be interchanged.

When the information processing device 300 receives the mode table request (540), the information processing device 300 transmits the command information according to the mode table request (541 and 542). Here, when the command information is already transmitted from the information processing device 300 to the information processing device 200, the information processing device 200 already acquire the information included in the command information. Therefore, the information processing device 300 may transmit only difference information as the command information according to the mode table request (541 and 542). The difference information is information regarding the change and is, for example, output form information of the resolution and the audio quality regarding the information processing device 200.

When the command information is received (542), the control unit 240 of the information processing device 200 specifies whether the output form of the data from the information processing device 200 is the main form or the sub-form based on the command information. Subsequently, the control unit 240 of the information processing device 200 transmits the mode setting information indicating the setting of the specified output form to the information processing device 300 (543 and 544). Here, the main form is assumed to be specified as the output form of the data from the information processing device 200. Accordingly, the control unit 240 of the information processing device 200 transmits the mode setting information for notifying the information processing device 300 that the specified output form (main form) is set and the normal power consumption mode is set, to the information processing device 300 (543 and 544). The processes (539 to 544) may be performed with Capability Re-negotiation when the device conforms to Wi-Fi Certified Miracast. In the case of Capability Re-negotiation, it is not necessary to perform negotiation again in regard to the setting values unchanged in the output form in the process (534). For example, wfd-displayedid, wfd-client-rtpports, wfd-I2C, and wfd-connectortype can be exemplified.

Subsequently, the control unit 240 of the information processing device 200 sets the image transmission mode (the middle channel) as the transmission mode (545). Accordingly, in the data transmission system 201, the resolution for displaying the middle channel and the audio quality for outputting the main audio are set (546). In the line control system 202, the normal power consumption mode is set (547).

When the normal power consumption mode is set in this way (547), the control unit 240 of the information processing device 200 starts a normal transmission process (548 and 549). That is, the information processing device 200 transmits the stream for outputting the middle channel and the main audio to the information processing device 300 (548 and 549). When the stream is received in this way (549), the information processing device 300 outputs the image and the audio based on the received stream (550). For example, as illustrated in FIG. 5a, the image 11 based on the stream from the information processing device 200 is displayed as the middle channel on the display unit 351.

In this example, the example in which the previous output form (the output form when the information processing device 300 is powered down) is set as the display form of the display unit 351 when the information processing device 300 is powered up has been described. However, when the information processing device 300 is powered up, another output form may be set. For example, when the information processing device 300 is powered up, a default output form may be normally set. Alternatively, the output form may be decided based on an order of connection to the information processing device 300.

In FIGS. 6 to 8, the example in which the information processing device 200 inquires the setting information regarding the information processing device 300 and sets the transmission parameters based on the received parameter information has been described. However, the information processing device 200 may ask a setting request for the parameters desired to be set to the information processing device 300 and may set the parameters when the information processing device 200 receives a response indicating that there is no problem from the information processing device 300. This example is illustrated in FIGS. 9 and 10.

Communication Example

Figure 9:
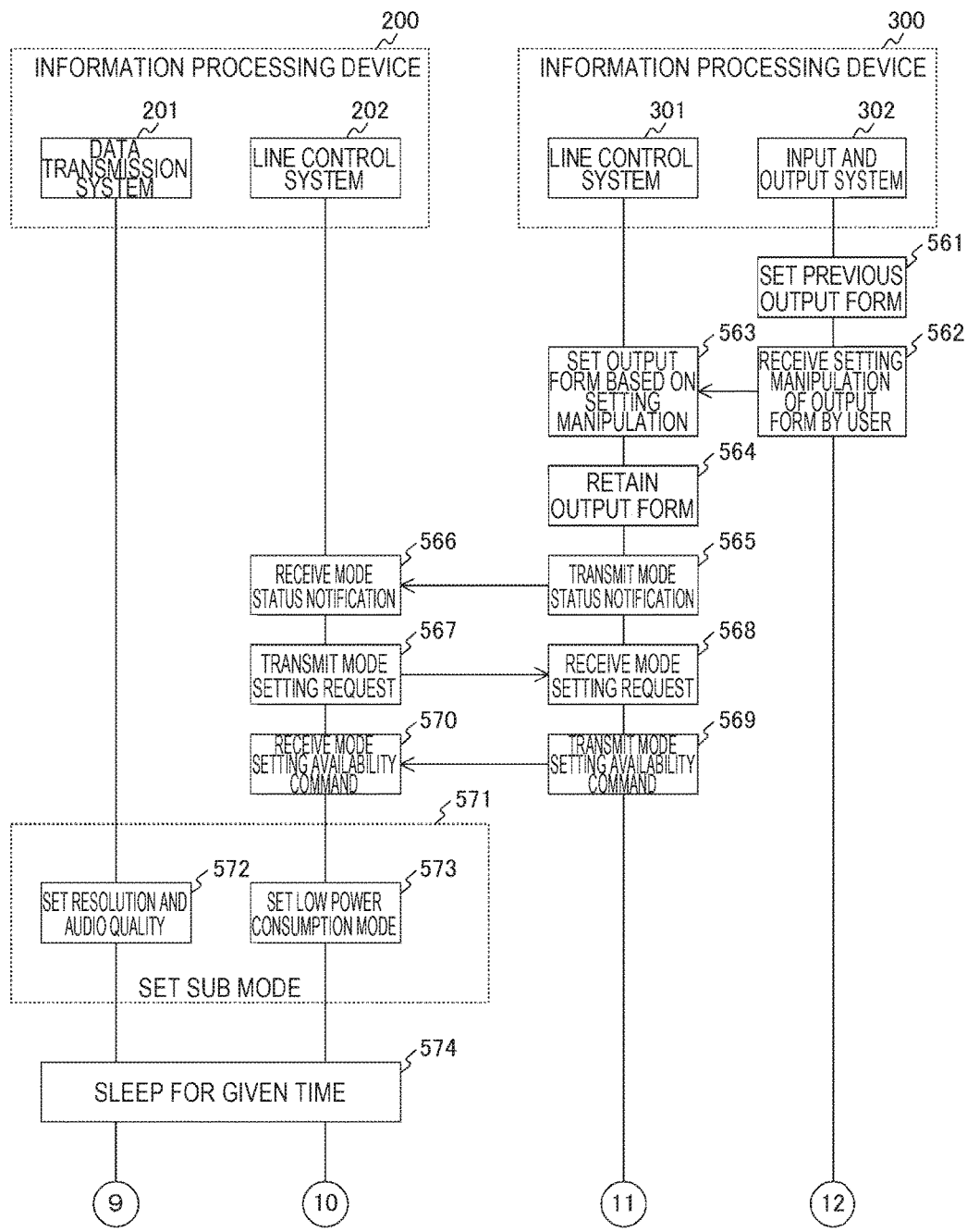
FIG. 9 is a sequence chart illustrating a communication process example between devices included in the communication system 100 according to the first embodiment of the present technology.
Figure 10:
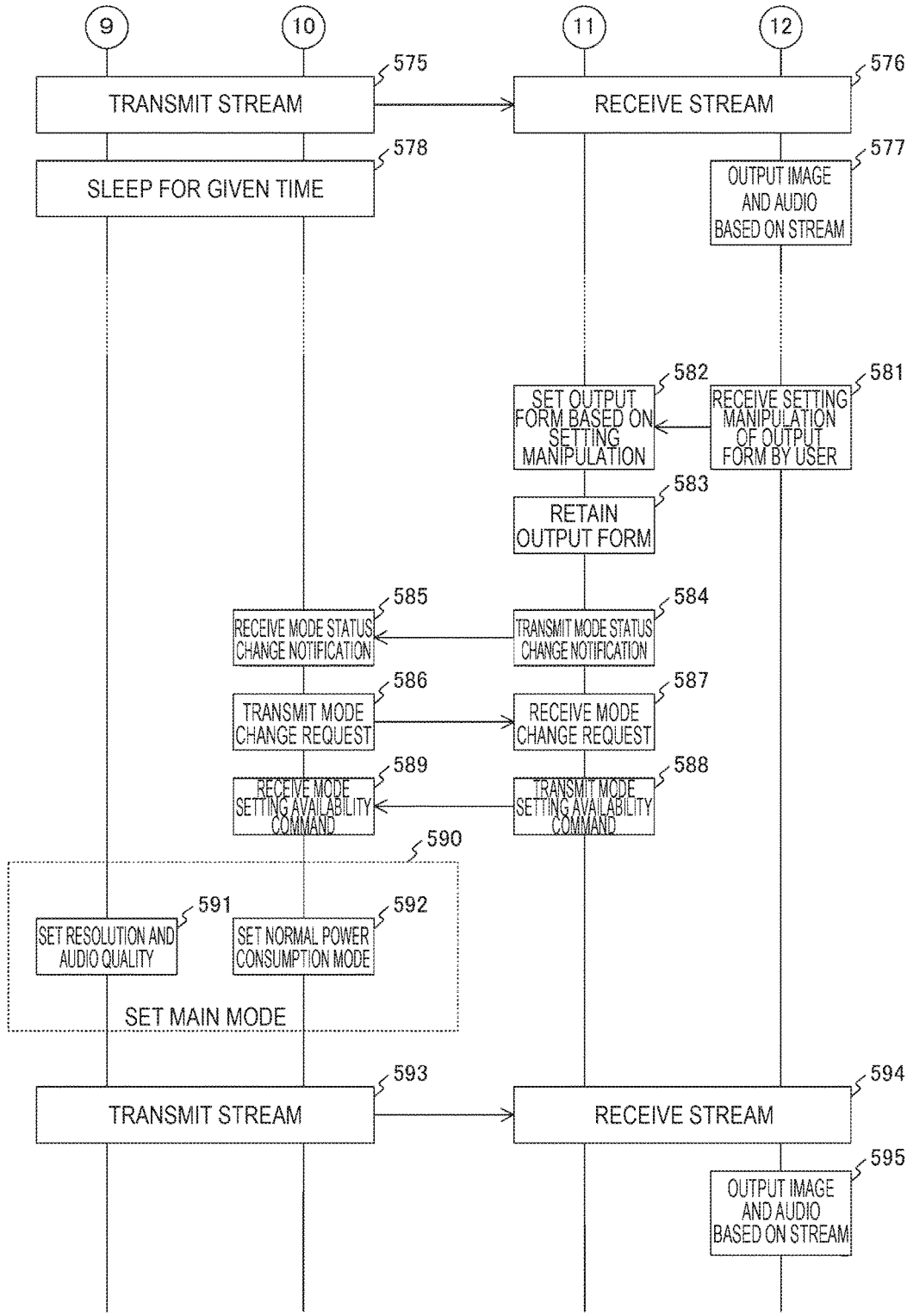
FIG. 10 is a sequence chart illustrating a communication process example between devices included in the communication system 100 according to the first embodiment of the present technology.
Figure 11:
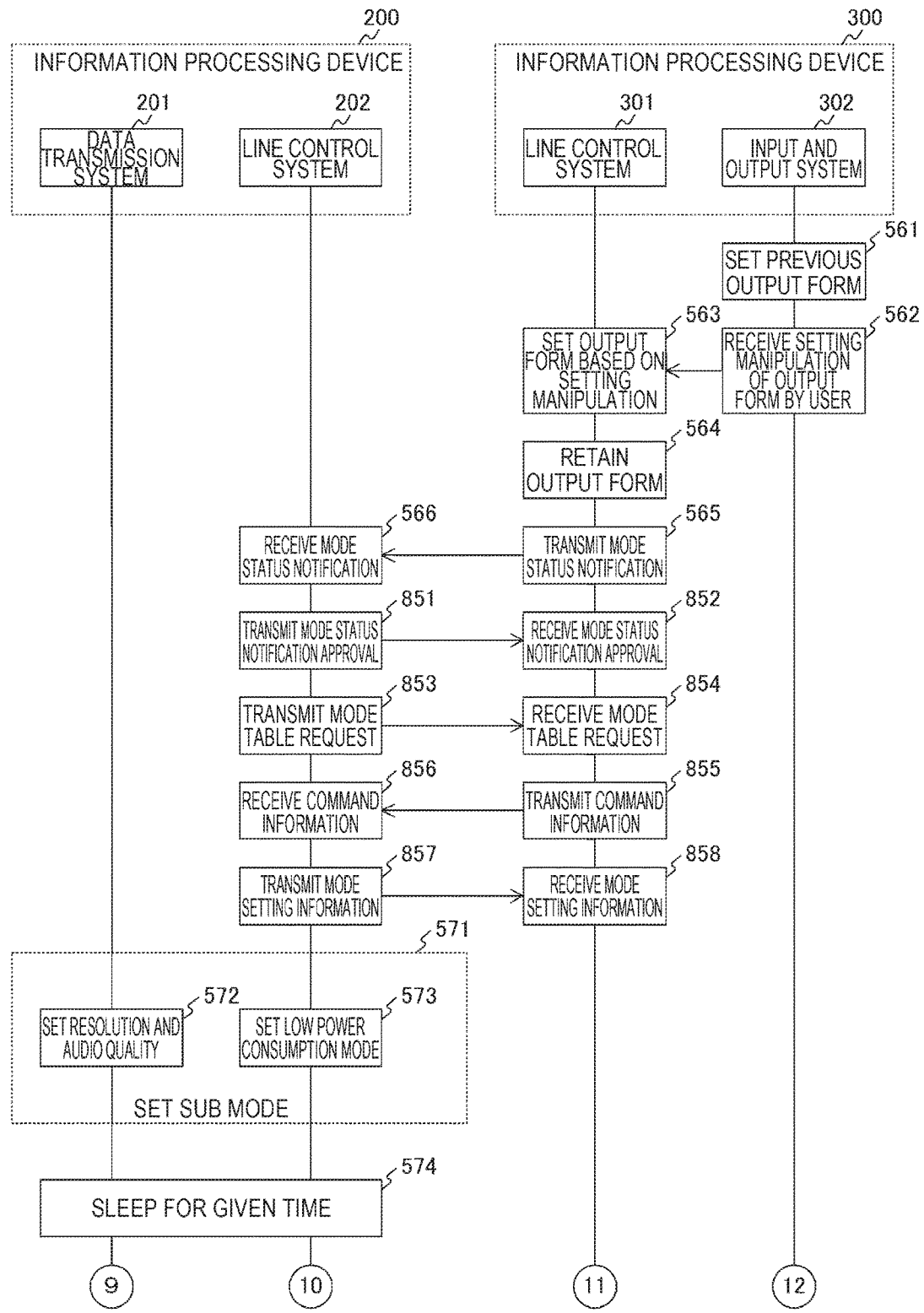
FIG. 11 is a sequence chart illustrating a communication process example between devices included in the communication system 100 according to the first embodiment of the present technology.

FIGS. 9 to 11 are sequence charts illustrating a communication process example between devices included in the communication system 100 according to the first embodiment of the present technology. In FIGS. 9 and 10, a part of the communication process example illustrated in FIGS. 6 to 8 is modified. Therefore, in FIGS. 9 and 10, the same reference numerals are given to common portions to the communication process example illustrated in FIGS. 6 to 8 and the description thereof will be partially omitted. In FIG. 11, a part of the communication process example illustrated in FIG. 9 is modified. Therefore, in FIG. 11, the same reference numerals are given to common portions to the communication process example illustrated in FIG. 9 and the description thereof will be partially omitted.

Processes (561 to 564) illustrated in FIG. 9 correspond to the processes (501 to 504) illustrated in FIG. 6.

Subsequently, the control unit 370 of the information processing device 300 transmits a mode status notification for notifying the information processing device 200 of the output form set by the user to the information processing device 200 (565 and 566). The mode status notification is information for giving notification of the resolution and the audio quality, the kinds of image and audio codecs, presence of absence of a 3D function, presence or absence of the content protection, the display size of a display device, topology information, a usable protocol, setting information (port information or the like) of the protocol, connection interface information (the type of connector or the like), horizontal synchronization and vertical synchronization positions, performance priority request information of a source device, a mode control table response to whether to correspond to the low power consumption mode, a maximum transmission throughput or a receivable maximum throughput of wireless transmission, central processing unit (CPU) power, a battery remaining quantity, and power supply information which can be set by the information processing device 200 along with the output form (for example, the main form or the sub-form) set by the user.

In this way, immediately after the setting manipulation of the output form by the user in the information processing device 300 is performed, the mode status notification for notifying the information processing device 200 of the output form related to the setting manipulation can be transmitted to the information processing device 200. Therefore, it is possible to shorten a setting time (change time) between the information processing devices 200 and 300 connected using the wireless communication.

When the mode status notification is received (566), the control unit 240 of the information processing device 200 compares a status parameter specified by the received mode status notification to a status parameter of the own information processing device. Subsequently, the control unit 240 of the information processing device 200 decides the setting content (for example, the resolution and audio, and the power consumption mode) based on a comparison result. Subsequently, the control unit 240 of the information processing device 200 transmits a mode setting request for notifying of the decided setting content (for example, the resolution and audio, and the power consumption mode) to the information processing device 300 (567 and 568).

When the mode setting request is received (568), the control unit 370 of the information processing device 300 determines whether to permit the setting content (for example, the resolution and audio, and the power consumption mode) specified by the received mode setting request. Then, the control unit 370 of the information processing device 300 transmits a mode setting availability command for notifying the determination result to the information processing device 200 (569 and 570).

When the mode setting availability command is received (570), the control unit 240 of the information processing device 200 confirms the content of the mode setting availability. For example, when a mode setting availability command indicating permission of the setting content related to the mode setting request transmitted by the information processing device 200 is received, the control unit 240 of the information processing device 200 sets the image transmission mode (the peripheral channel) as the transmission mode (571). Further, processes (571 to 574) illustrated in FIG. 9 correspond to the processes (511 to 514) illustrated in FIG. 6. Further, processes (575 to 578) illustrated in FIG. 10 correspond to the processes (519 to 522) illustrated in FIG. 7.

When a mode setting availability command indicating non-permission of the setting content related to the mode setting request transmitted by the information processing device 200 is received, the control unit 240 of the information processing device 200 newly decides the setting content (for example, the resolution and audio, and the power consumption mode). Then, the control unit 240 of the information processing device 200 transmits a mode setting request for notifying the information processing device 300 of the newly decided setting content (for example, the resolution and audio, and the power consumption mode) to the information processing device 300.

Processes (581 to 583) illustrated in FIG. 10 correspond to the processes (531 to 533) illustrated in FIG. 7.

Subsequently, the control unit 370 of the information processing device 300 transmits a mode status change notification for notifying the information processing device 200 of the output form changed by the user to the information processing device 200 (584 and 585). The mode status change notification is information for notifying of the resolution and the audio quality which can be set by the information processing device 200 and whether to correspond to the low power consumption mode along with the output form (for example, the main form or the sub-form) changed by the user.

When the mode status change notification is received (585), the control unit 240 of the information processing device 200 decides the setting content (for example, the resolution and audio, and the power consumption mode). The process of deciding the setting content is the same as the above-described decision process. Subsequently, the control unit 240 of the information processing device 200 transmits the mode change request for notifying the information processing device 300 of the decided setting content (for example, the resolution and audio, and the power consumption mode) to the information processing device 300 (586 and 587).

When the mode change request is received (587), the control unit 370 of the information processing device 300 determines whether to permit the setting content (for example, the resolution and audio, and the power consumption mode) specified by the received mode change request. Then, the control unit 370 of the information processing device 300 transmits the mode setting availability command for notifying the determination result to the information processing device 200 (588 and 589).

When the mode setting availability command is received (589), the control unit 240 of the information processing device 200 confirms the content of the mode setting availability command and sets the transmission mode (590). This confirmation process is the same as the above-described confirmation process. Processes (590 to 595) illustrated in FIG. 10 correspond to the processes (545 to 550) illustrated in FIG. 8.

Here, when the source device performs switch between the peripheral channel and the middle channel, information (for example, information for comprehending the beginning of a group of picture (GOP) or information for comprehending the beginning of a picture) indicating a timing of the switch may be included in the stream to be transmitted. In other words, when the source device performs the switch between the main display and the sub-display, information indicating the timing of the switch may be transmitted to the sink device. In this case, the sink device receiving the stream can switch between the peripheral channel and the middle channel at an appropriate timing based on information indicating the timing.

Here, FIGS. 6 to 10 illustrates the example in which the standby and wake-up of the source device connected to the sink device is controlled. Here, the standby and wake-up of the sink device may be controlled based on the standby and wake-up of the source device connected to the sink device. For example, when all of the source devices connected to the sink device stand by, control can be performed such that the sink device stands by. When at least one of the source devices connected to the sink device wakes up, control can be performed such that the sink device wakes up.

A modification example of the case in which the sink device notifies the source device that the content retained in the process (564) is changed in the processes (565 to 570) illustrated in FIG. 9 and the source device transmits the mode table request is illustrated in FIG. 11.

As illustrated in FIG. 11, the information processing device 300 transmits a mode status notification to notify the information processing device 200 that the output form is changed (564) and prompt to transmit a mode setting request from the information processing device 200 (565 and 566). When the correspondence is possible, the information processing device 200 receiving the mode status notification transmits a mode status notification approval indicating approval of the mode status notification to the information processing device 300 (851 and 852).

In this way, after the mode status notification approval is transmitted (851), processes are performed (853 to 858). The processes (853 to 858) correspond to the processes (505 to 510) illustrated in FIG. 6. In this way, by performing the processes (853 to 858) after the transmission of the mode status notification approval (851), the stream transmission control (for example, the data transmission speed control and the scalability transmission rate control) can be appropriately in a state change (the change of the output form (564)).

Here, for example, in a command prepared in Wi-Fi Certified Miracast, an RTSPM5 message including wfd-triggered-method is currently defined as a command which is transmitted to the information processing device 300 by the information processing device 200. However, when the RTSPM5 message including wfd-triggered-method is expanded as a command which is transmitted to the information processing device 200 by the information processing device 300, the RTSPM5 message including wfd-triggered-method can be received by the information processing device 200 and the information processing device 200 can start capability re-negotiation with the information processing device 300. That is, the management information can be exchanged using the RTSPM5 message including wfd-triggered-method. For example, when the management information is changed, the control unit 370 of the information processing device 300 can perform control such that the RTSPM5 message including wfd-triggered-method defined in the Wi-Fi Certified Miracast specification is transmitted as a command for notifying the information processing device 200 of the change to the information processing device 200. Beside the command, a command may be newly defined to serve as an equivalent.

Operation Example of Information Processing Device (Source Device)

Figure 12:
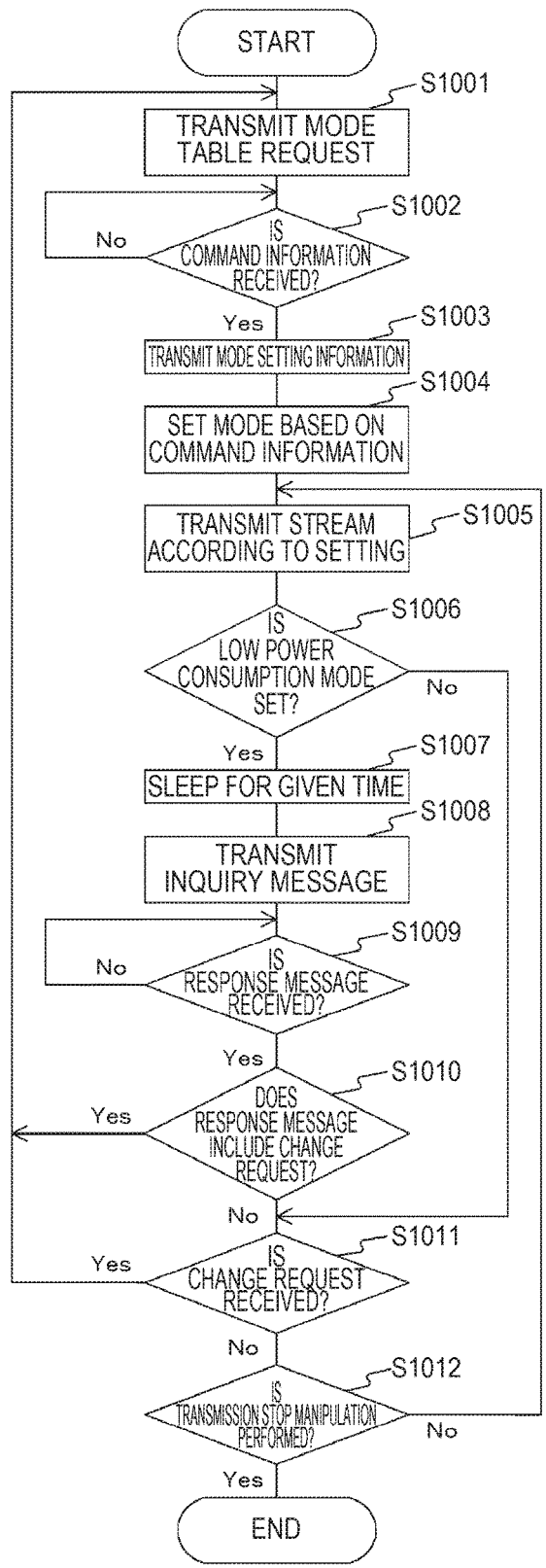
FIG. 12 is a flowchart illustrating an example of a processing procedure of a data transmission process performed by the information processing device 200 according to the first embodiment of the present technology.

FIG. 12 is a flowchart illustrating an example of a processing procedure of a data transmission process performed by the information processing device 200 according to the first embodiment of the present technology. FIG. 12 illustrates an example of a case in which the information processing device 200 first transmits the stream (the image data and the audio data) with a standard resolution to the information processing device 300. In this case, the output based on the stream to the information processing device 300 is assumed to be performed.

First, the control unit 240 transmits the mode table request to the information processing device 300 (step S1001). Subsequently, the control unit 240 determines whether the command information is received from the information processing device 300 (step S1002). When the command information is not received, the monitoring is continuously performed. When the command information may not be received despite waiting of a given time, the process may end as a timeout. For example, in Wi-Fi Certified Miracast, a timeout from 5 seconds to 9 seconds is set according to a situation.

When the command information is received from the information processing device 300 (step S1002), the control unit 240 transmits the mode setting information indicating that the mode is set based on the received command information to the information processing device 300 (step S1003).

Subsequently, the control unit 240 sets the mode based on the received command information (step S1004). When a change request for increasing the resolution is included in the command information, the control unit 240 sets the resolution of the image and the audio in response to the change request. When a change request for decreasing the resolution is included in the command information, the control unit 240 sets the resolution of the image and the audio quality of the audio in response to the change request.

Subsequently, the control unit 240 performs the transmission process of transmitting the stream to the information processing device 300 according to the setting (step S1005).

Subsequently, the control unit 240 determines whether the low power consumption mode is set (step S1006). When the low power consumption mode is not set (that is, the normal power consumption mode is set), the process proceeds to step S1011. Conversely, when the low power consumption mode is set (step S1006), the control unit 240 sleeps for a given time (step S1007).

Subsequently, the control unit 240 transmits an inquiry message to the information processing device 300 (step S1008). Subsequently, the control unit 240 determines whether a response message is received from the information processing device 300 (step S1009). When the response message is not received, the monitoring is continuously performed. When the response message may not be received despite of waiting of a given time, the process may end as a timeout. For example, in Wi-Fi Certified Miracast, a timeout from 5 seconds to 9 seconds is set according to a situation.

When the response message is received from the information processing device 300 (step S1009), the control unit 240 determines whether a change request is included in the response message (step S1010). When the change request is included in the response message (step S1010), the process returns to step S1001.

When the change request is not included in the response message (step S1010), the control unit 240 determines whether the change request is received (step S1011). When the change request is received (step S1011), the process returns to step S1001. Conversely, when the change request is not received (step S1011), the control unit 240 determines whether a transmission stop manipulation is performed (step S1012). When the transmission stop manipulation is performed (step S1012), the operation of the data transmission process ends. Conversely, when the transmission stop manipulation is not performed (step S1012), the process returns to step S1005.

Operation Example of Information Processing Device (Sink Device)

Figure 13:
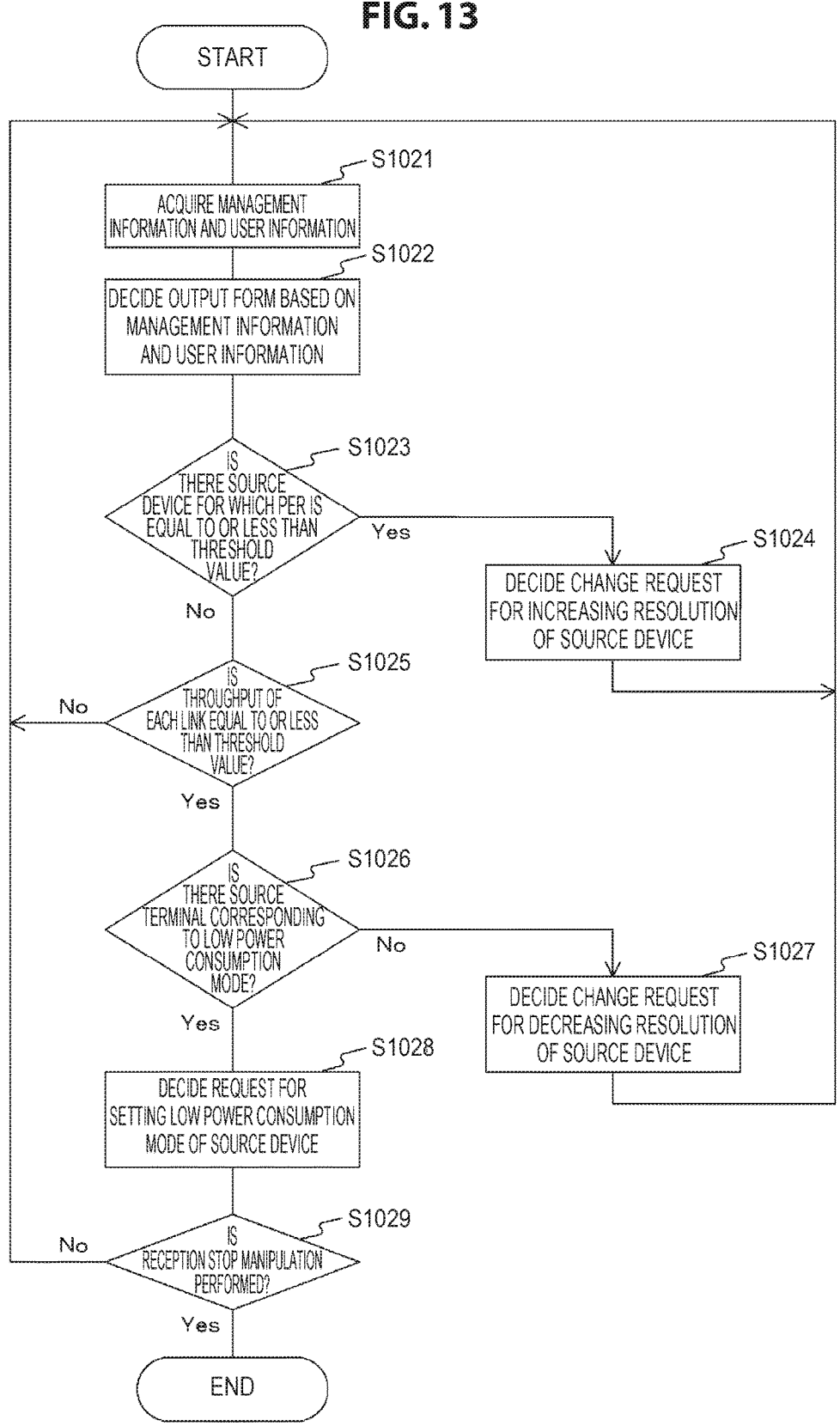
FIG. 13 is a flowchart illustrating an example of a processing procedure of a data transmission speed control process performed by the information processing device 300 according to the first embodiment of the present technology.

FIG. 13 is a flowchart illustrating an example of a processing procedure of a data transmission speed control process performed by the information processing device 300 according to the first embodiment of the present technology. FIG. 13 illustrates an example in which setting content (for example, a resolution and a power consumption mode) related to the source device is decided when the information processing device 300 receives the stream (the image data and the audio data).

For example, the control unit 370 of the information processing device 300 can decide the resolution to be used and the frequency channel to be used according to the user information for setting the middle channel or a link radio wave propagation environment between the information processing device 300 and each source device.

For example, a case in which a user manipulation of selecting the image 12 in the state illustrated in FIG. 5a performed is assumed. In this case, it is desirable to increase the resolution of the image 12 and decreases the resolution of the image 11. Further, it is desirable to select optimum resolutions of the images 11 and 12 according to elapse of a time and based on the link radio wave propagation environment of each source device.

For example, the information processing device 300 can comprehend the radio wave propagation characteristics while flowing data corresponding to the corresponding throughput to the plurality of frequency channels. For example, the information processing device 300 retains a table to comprehend an ideal throughput for each of the plurality of frequency channels. Then, the information processing device 300 may comprehend an available data transmission speed of the frequency channel to be used based on the number of simultaneously used source devices and the PER and may select an optimum frequency channel for each frequency channel.

For example, the control unit 370 acquires the management information from the management information retention unit 390 and acquires the user information from the user information acquisition unit 360 (step S1021). Subsequently, the control unit 370 decides the output form based on the acquired management information and user information (step S1022). Based on the decided output form, the images corresponding to two streams transmitted from each of the plurality of source devices are displayed on the display unit 351.

Subsequently, the control unit 370 determines whether there is the source device for which the PER included in the management information is less than a threshold value (step S1023). When there is the source device for which the PER included in the management information is equal to or less than the threshold value (step S1023), the control unit 370 decides a change request for increasing the resolution of the source device (step S1024). The control unit 370 performs control such that a high data transmission speed is allocated to the middle channel in accordance with the output form based on the user information. For example, the change request is included in the command information (for example, the command information illustrated in FIG. 6) to be transmitted to this source device. It may be determined whether the throughput after the increase in the resolution of the source device is less than the threshold value and the rate of the stream may be controlled based on the determination result.

When there is no source device for which the PER included in the management information is equal to or less than the threshold value (step S1023), the control unit 370 determines whether the throughput of each source device is equal to or less than a threshold value based on the management information (step S1025). That is, it is determined whether the throughput of each link is not problematic even for the current frequency channel (step S1025).

When the throughput of each source device is not equal to or less than the threshold value (step S1025), the process returns to S921. Conversely, when the throughput of each source device is equal to or less than the threshold value (step S1025), the control unit 370 determines whether there is the source device corresponding to the low power consumption mode based on the management information (step S1026).

When there is the source device corresponding to the low power consumption mode (step S1026), the control unit 370 decides a change request for setting the low power consumption mode in the source device corresponding to the low power consumption mode (step S1028). For example, the change request is included in the command information (for example, the command information illustrated in FIG. 6) to be transmitted to this source device.

When there is no source device corresponding to the low power consumption mode (step S1026), the control unit 370 decides a change request for decreasing the resolution of the source device (the source device for which the PER is equal to or less than the threshold value) (step S1027). For example, the change request is included in the command information (for example, the command information illustrated in FIG. 6) to be transmitted to this source device.

It is determined whether a reception stop manipulation is performed (step S1029). When the reception stop manipulation is performed, the operation of the data transmission speed control process ends. When the reception stop manipulation is not performed, the process returns to step S1021. When there is the source device that enters the sleep state through the setting of the low power consumption mode, the number of source devices connected to the information processing device 300 decreases. In this case, the threshold value for the throughput in step S1025 may be changed. After the threshold value for the throughput is changed in this way, a step corresponding to step S1025 may be further performed.

In this way, it is possible to realize a control protocol in which the sink device trains a line environment for a given time and notifies the source device of the resolution with which stable video communication can be performed. A control protocol in which the source device performs training in a line environment for a given time and requests a resolution with which stable video communication can be performed, and the sink device responds to the request may also be realized.

In this way, the control unit 370 of the information processing device 300 can perform transmission control (for example, the data transmission speed control and the scalability transmission rate control) of two streams transmitted from each source device based on the management information of the management information retention unit 390 and the user information acquired by the user information acquisition unit 360.

Further, control may be performed such that a sum data transmission speed of the two streams transmitted from each of the information processing devices 200 and 400 is minimized. For example, a maximum allowable value of the sum data transmission speed is set in the control unit 370 of the reception side information processing device 300. After the control unit 370 transmits a change request for decreasing a bit rate to the information processing device 200, the control unit 370 acquires bit rates of two streams transmitted from the information processing devices 200 and 400 from the stream reception unit 330. Subsequently, the control unit 370 calculates a sum data transmission speed of the acquired two streams. Subsequently, the control unit 370 decides the bit rate of the streams transmitted from the information processing device 400 within a range not greater than the set maximum allowable value and transmits a change request for increasing the bit rate to the information processing device 400. When the PER is large and thus is not receivable in the same frequency channel despite of the setting of the minimum bit rate, a different frequency channel may be used. When the images (the middle channel and the peripheral channel) are paused for a given time or more, the image data may be stopped as long as a manipulation (for example, pointing) is not performed by the user.

In this way, according to the first embodiment of the present technology, even when one sink device receives a plurality of streams transmitted from a plurality of source devices, appropriate stream transmission control (for example, the data transmission speed control) can be performed according to a manipulation, a situation, and an intention of the user. For example, it is possible to decrease the data transmission speeds of some of the plurality of image and audio streams and increase the data transmission speeds of the remaining streams according to an operation, a situation, and an intention of the user.

For example, when a sink device receives and displays a plurality of streams, important images and audios with high quality set timely by the user can be enjoyed. For the otherwise images and audios, the data transmission speeds can be adjusted automatically to the optimum frequency channel, power consumption, and transmission rate.

Here, for the management information retained in the management information retention unit 390, a command prepared in Wi-Fi Certified Miracast can be used for exchanging the management information. In this case, capability negotiation or capability re-negotiation defined in the Wi-Fi Display specification can be used. Here, as capability negotiation or capability re-negotiation, for example, RFC5939 or the Wi-Fi Certified Miracast specification can be exemplified. However, capability negotiation or capability re-negotiation is not limited thereto, but is defined as interchange of the device performance information. A communication example of the interchange using a command of the Wi-Fi Certified Miracast specification is illustrated in FIGS. 14 to 16.

Figure 14:
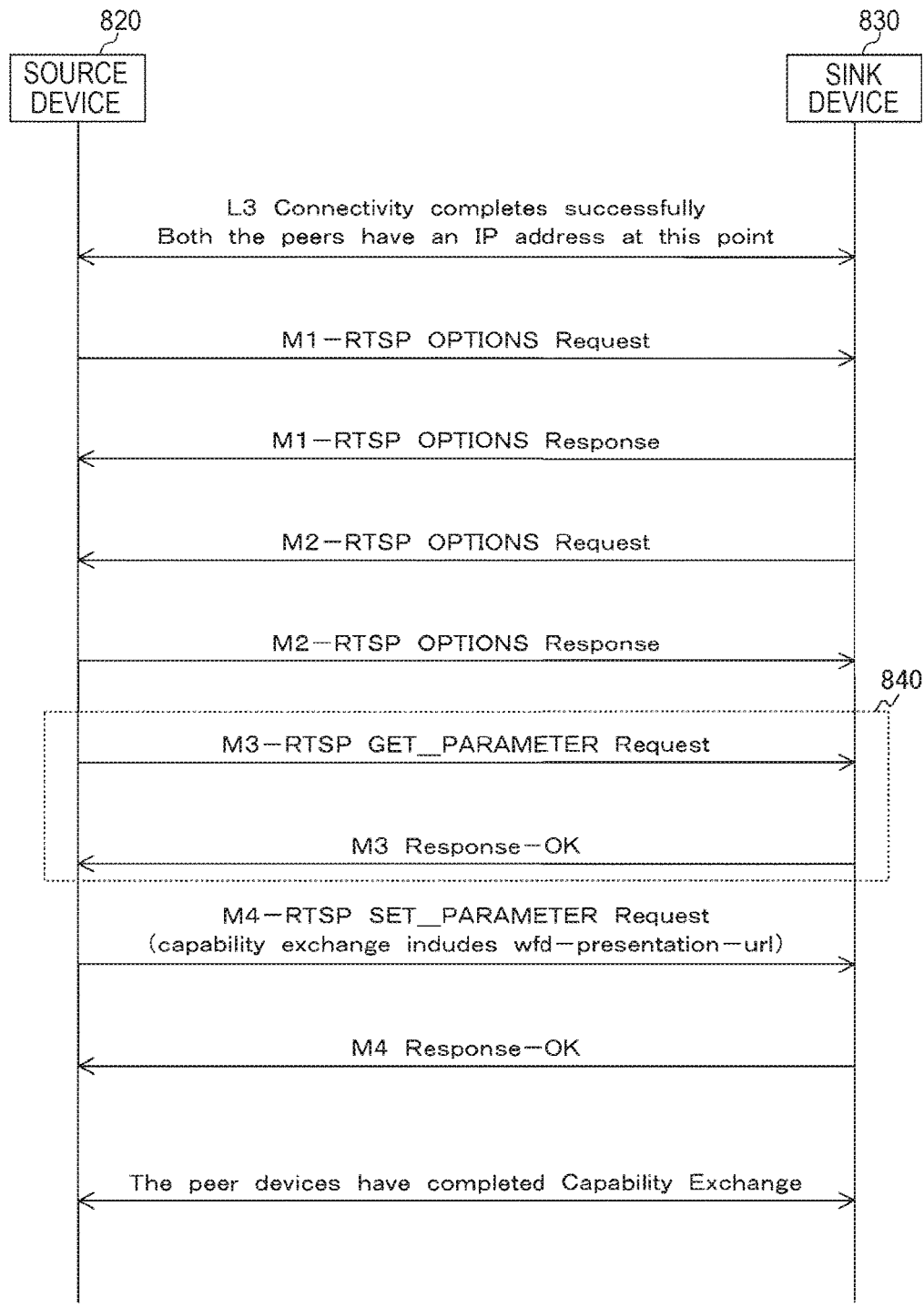
FIG. 14 is a sequence chart illustrating a communication process example between a source device and a sink device according to the first embodiment of the present technology.
Figure 15:
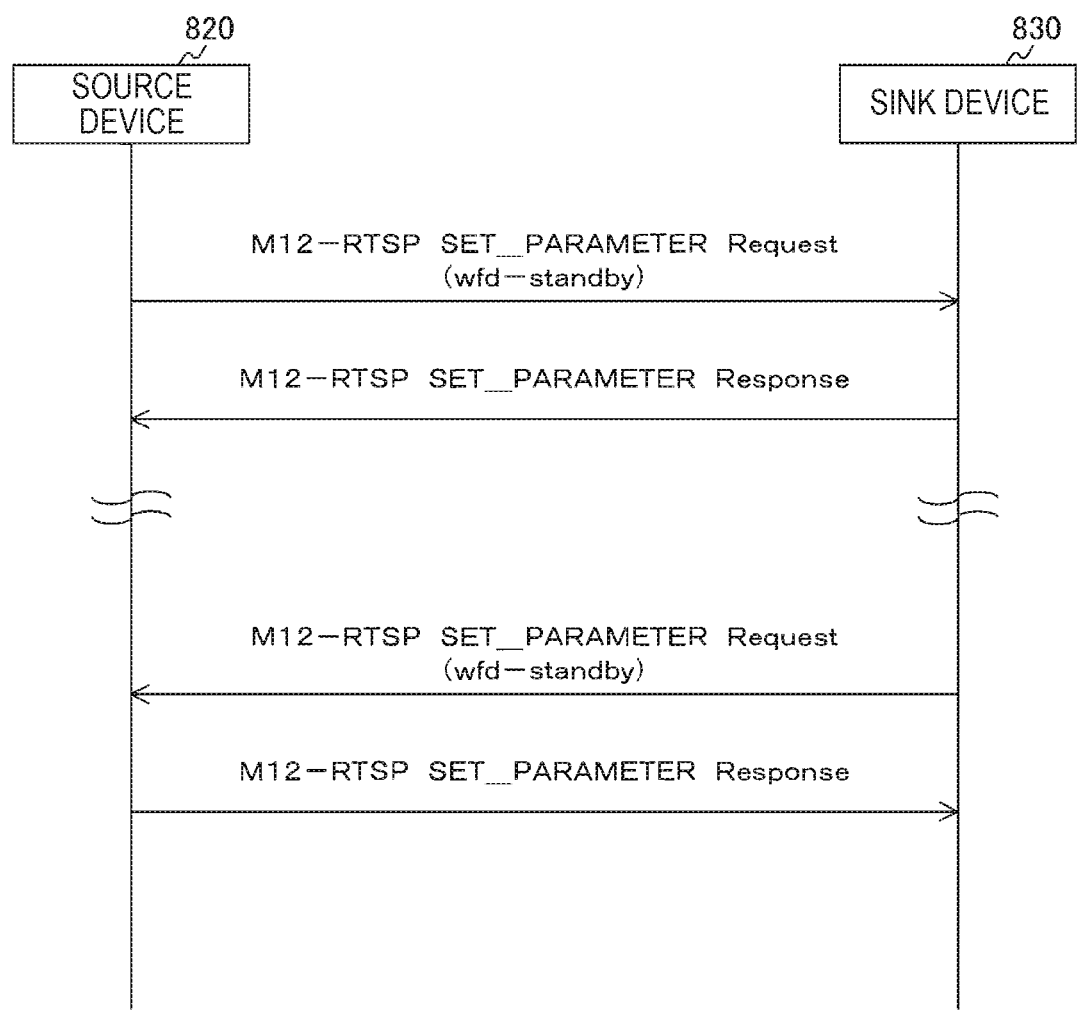
FIG. 15 is a sequence chart illustrating a communication process example between a source device and a sink device according to the first embodiment of the present technology.
Figure 16:
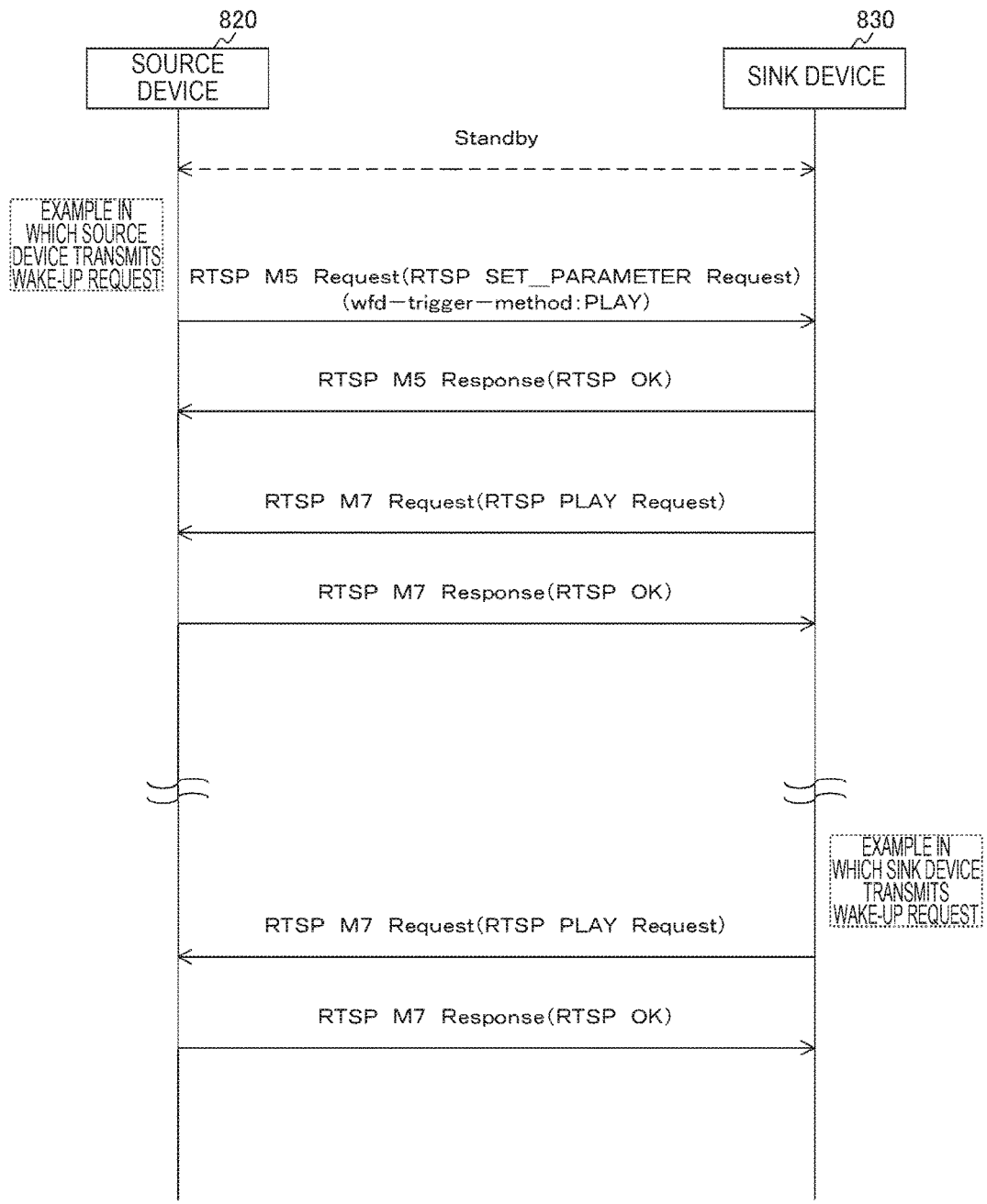
FIG. 16 is a sequence chart illustrating a communication process example between a source device and a sink device according to the first embodiment of the present technology.

Communication Example of Interchange Using
Wi-Fi Certified Miracast Specification Command FIGS. 14 to 16 are sequence charts illustrating a communication process example between a source device and a sink device according to the first embodiment of the present technology. FIGS. 14 to 16 illustrate a communication example of interchange using an RTSP protocol. A source device 820 corresponds to the information processing devices 200 and 400 and a sink device 830 corresponds to the information processing device 300.

First, the description will be made with reference to FIG. 14. For example, as indicated by a dotted rectangle 840 of FIG. 14, an "RTSP M3 Request" (RTSP GET_PARAMETER Request) message transmitted from the source device 820 to the sink device 830 and an "RTSP M3 Response" (RTSP GET_PARAMETER Response) message transmitted from the sink device 830 to the source device 820 in response to the "RTSP M3 Request" (RTSP GET_PARAMETER Request) message can be used. This exchange process corresponds to, for example, the processes (505 to 508) illustrated in FIG. 6 and the processes (539 to 542) illustrated in FIG. 8. On the other hand, the messages may be appropriately transmitted from the source device 820 to the sink device 830. For example, the interchange of the "RTSP M3 Request" (RTSP GET_PARAMETER Request) message and the "RTSP M3 Response" (RTSP GET_PARAMETER Response) message may be omitted, the management information may be included in a message to be transmitted from the source device 820 to the sink device 830, the management information may be transmitted from the source device 820 to the sink device 830, and the sink device 830 may select the information and retain the information in the management information retention unit 390. For example, when the content protection setting is performed, link protection setup is performed after M3 Response. Therefore, it is desirable to perform communication while ensuring a secrecy ability of a link set once by transmitting only messages of M4 or higher.

The interchange of information regarding the power consumption mode can be performed with predetermined messages using the RTSP protocol. For example, three kinds of management information of the following (1) to (3) can be exchanged:

(1) "setting to the standby mode,"
(2) "when the source device cancels the standby mode or when the source device cancels the standby mode of the sink device," and
(3) "when the sink device cancel the standby mode or when the sink device cancels the standby mode of the source device."

First, the description will be made with reference to FIG. 15. For example, when a command prepared in Wi-Fi Certified Miracast is used, an "RTSP M12 Request" (RTSP SET_PARAMETER (with WFD-standby)) message transmitted from the source device 820 to the sink device 830 and an "RTSP M12 Response" (RTSP OK) message transmitted from the sink device 830 to the source device 820 in response to the "RTSP M12 Request" (RTSP SET_PARAMETER (with WFD-standby)) message can be used in the interchange of (1) "setting to the standby mode," as described above. On the other hand, the same also applies to the setting to the standby mode from the sink device 830 to the source device 820.

Next, the description will be made with reference to FIG. 16. For example, (2) "when the source device cancels the standby mode or when the source device cancels the standby mode of the sink device," as described above, the source device 820 interchanges an "RTSP M5 Request" (RTSP SET_PARAMETER (Request (wfd-trigger-method: PLAY)) message transmitted to the sink device 830 and an "RTSP M5 Response" (RTSP OK) message transmitted from the sink device 830 to the source device 820 in response to the "RTSP M5 Request" (RTSP SET_PARAMETER (Request (wfd-trigger-method: PLAY)) message. The sink device 830 can uses an "RTSP M7 Request" (RTSP PLAY Request) message transmitted to the source device 820 and an "RTSP M7 Response" (RTSP OK) message transmitted from the source device 820 to the sink device 830 in response to the "RTSP M7 Request" (RTSP PLAY Request) message.

In the first embodiment of the present technology, the topology example in which the number of source devices is 2 has been described, and thus when any one of the two source devices is controlled, a command including terminal identification information may be given. Here, an example of using the terminal identification information 391 (DSC200 and DR400) illustrated in FIG. 4 will be described. The terminal identification information 391 of the information processing device 200 is indicated by DSC200, and the terminal identification information 391 of the information processing device 400 is indicated by DR400. For example, the information processing device 300 (the sink device 830) generates an "RTSP M7 Request" (RTSP SET_PARAMETER (Request (wfd-trigger-method: PLAY DSC200)) message by adding the terminal identification information 391 "DSC200" to the "RTSP M7 Request" (RTSP PLAY Request) message to be transmitted to the information processing device 200 (the source device 820). Further, for example, the information processing device 300 (the sink device 830) generates an "RTSP M7 Request" (RTSP SET_PARAMETER (Request (wfd-trigger-method: PLAY DR400)) message by adding the terminal identification information 391 "DR400" to the "RTSP M7 Request" (RTSP PLAY Request) message to be transmitted to the information processing device 400 (the source device 820). As described above, the sink device designates the source device and performs the RTSP M7 Request. In this example, the messages related to "PLAY" have been described as an example, but the present technology is not limited thereto. For example, a message related to "SETUP," "PAUSE," or "TEARDOWN" may be used.

For example, (3) "when the sink device cancel the standby mode or when the sink device cancels the standby mode of the source device," as described above, the sink device 830 can use the "RTSP M7 Request" (RTSP PLAY Request) message transmitted to the source device 820 and the "RTSP M7 Response" (RTSP OK) message transmitted from the source device 820 to the sink device 830 in response to the "RTSP M7 Request" (RTSP PLAY Request) message. The interchange corresponds to, for example, the processes (515 to 518) illustrated in FIG. 7 and the processes (535 to 538) illustrated in FIG. 7.

For example, in the interchange of the processes (565 to 570) illustrated in FIG. 9, the "RTSP M12 Request" (RTSP SET_PARAMETER (with WFD-standby)) message transmitted from the sink device 830 to the source device 820 and the "RTSP M12 Response" (RTSP OK) message transmitted from the source device 820 to the sink device 830 in response to the "RTSP M12 Request" (RTSP SET_PARAMETER (with WFD-standby)) message can be used.

Further, for example, in the interchange of the processes (584 to 589) illustrated in FIG. 10, the "RTSP M7 Request" (RTSP PLAY Request) message transmitted from the sink device 830 to the source device 820 and the "RTSP M7 Response" (RTSP OK) message transmitted from the source device 820 to the sink device 830 in response to the "RTSP M7 Request" (RTSP PLAY Request) message may be used.

In this way, the wireless communication unit 320 can perform the exchange of the capability information with capability negotiation or capability re-negotiation defined in the Wi-Fi Display specification. For example, the capability information is exchanged with the RTSP M3 message in capability negotiation or capability re-negotiation.

In this way, for example, the wireless communication unit 320 of the information processing device 300 performs the communication with the source device to exchange the capability information regarding the information processing device 300 and the capability information regarding the information processing device 200. The wireless communication unit 220 of the information processing device 200 performs the communication with the information processing device 300 to exchange the capability information regarding the information processing device 200 and the capability information regarding the information processing device 300. In this case, the wireless communication units 220 and 320 can exchange the capability information with capability negotiation or capability re-negotiation.

The control unit 370 of the information processing device 300 performs the stream transmission control (for example, the data transmission speed control and the scalability transmission rate control) with the information processing device 200 based on the capability information regarding the information processing device 200, the radio wave propagation measurement information regarding the communication with the information processing device 200, and the use of the information processing device 300. A stream transmission method is different from in the embodiment of the present technology, but the control unit 240 of the information processing device 200 can also perform the stream transmission control (for example, the data transmission speed control and the scalability transmission rate control) with the information processing device 300 based on the control performed from the information processing device 300 based on the capability information regarding the information processing device 200 and the radio wave propagation measurement information regarding the communication of the stream with the information processing device 300.

The control unit 370 of the information processing device 300 performs the control such that the power consumption mode is set in the information processing device 200 based on the capability information (for example, the information indicating whether the device is a mobile device) regarding the information processing device 200. In this case, the control unit 370 can perform the control such that the low power consumption mode is set in the information processing device 200 based on the capability information regarding the information processing device 200 and the management information for managing the information processing device 200. The control unit 240 of the information processing device 200 sets the power consumption mode based on the control performed from the information processing device 300 based on the capability information regarding the information processing device 200. In the embodiment of the present technology, the example of the topology in which two source devices are used has been described, but an embodiment of the present technology is not limited to the embodiment of the present technology. For example, when the number of devices is 2 or more, it is necessary to control data transmission speed control corresponding to the number of devices and state transition is considerable. Therefore, the control is difficult, but benefit can be obtained. It is possible to also correspond to topology in which two or more source devices are connected.

2. Second Embodiment

In a second embodiment of the present technology, an example of starting group authentication between the source device and the sink device using near field communication (NFC) and performing image transmission through direct connection between the source device and the sink device will be described. In the second embodiment of the present technology, an example of setting content managed under a digital copyright (DRM content) as a display target of the source device and the sink device will be described.

Configuration Example of Communication System

Figure 17:
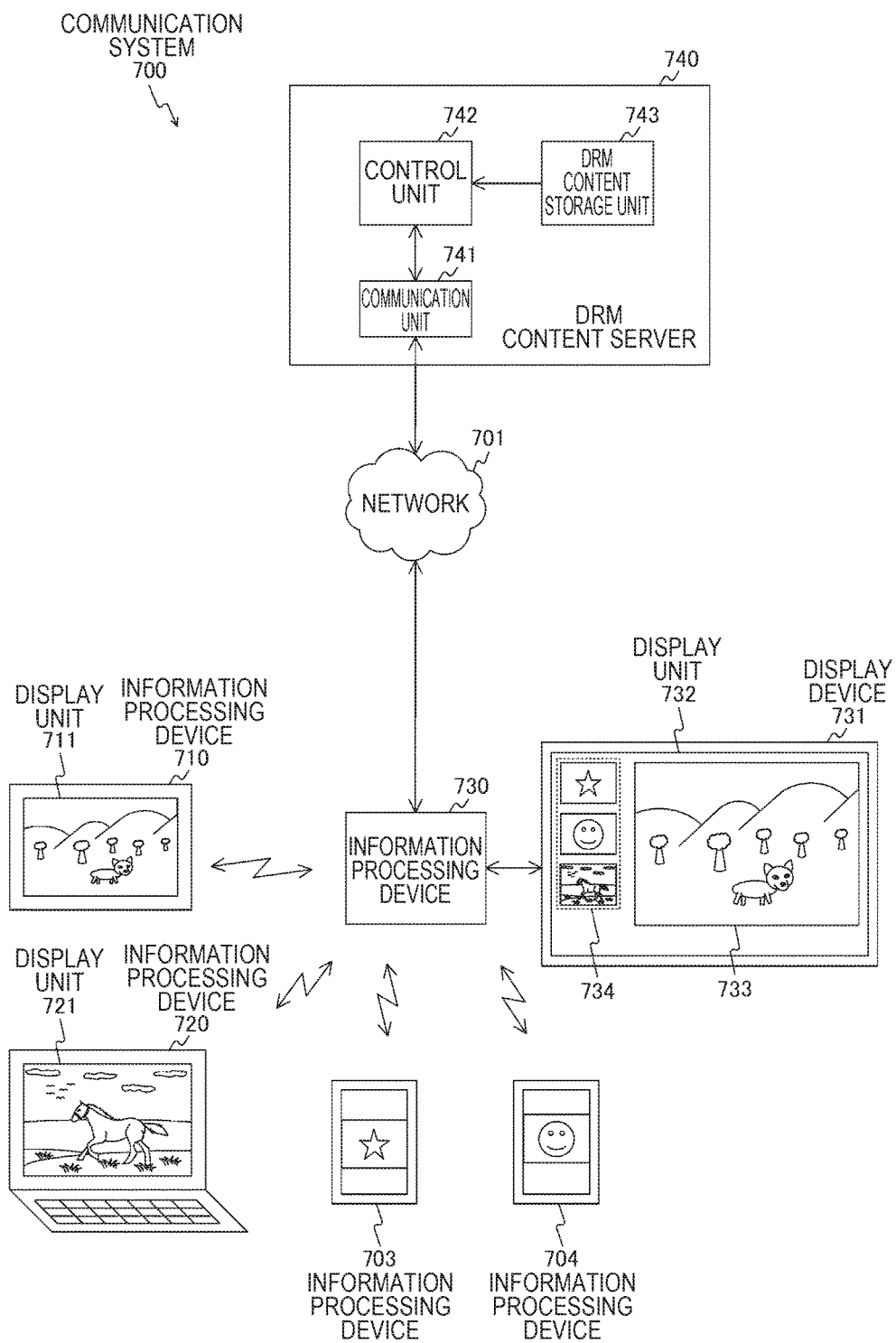
FIG. 17 is a diagram illustrating a system configuration example of a communication system 700 according to the second embodiment of the present technology.

FIG. 17 is a diagram illustrating a system configuration example of a communication system 700 according to the second embodiment of the present technology.

The communication system 700 includes a network 701, information processing devices 703, 704, 710, 720, and 730, a display device 731, and a DRM content server 740.

In the second embodiment of the present technology, an example in which the information processing devices 703, 704, 710, and 720 are assumed to be the transmission side information processing device (source device), and the information processing device 730 is assumed to be the reception side information processing device (sink device) will be described. The information processing devices 703, 704, 710, and 720 correspond to the information processing device 200 illustrated in FIG. 2, and the information processing device 730 corresponds to the information processing device 300 illustrated in FIG. 3. In the following description, the information processing device 710 will be mainly described as the source device, and the description similarly applies to the information processing devices 703, 704, and 720.

The information processing device 710 is the transmission side information processing device (the source device) that transmits an image. The information processing device 710 can establish the connection with the information processing device 730 through P2P direct communication (for example, WiFi Direct). For example, the information processing device 710 has a protocol capable of establishing the connection with the information processing device 730 through the WiFi Direct and enabling image communication such as the Wi-Fi CERTIFIED Miracast or digital living network alliance (DLNA).

The information processing device 730 has a communication function for establishing a connection with the information processing devices 703, 704, 710, and 720, or the DRM content server 740. The information processing device 730 has a function of establishing the connection with the information processing devices 703, 704, 710, and 720, and the DRM content server 740 and controlling all protocols. The information processing device 730 has a communication function of establishing a connection with a private LAN or a global LAN.

The information processing device 730 has a display function of displaying an image. The display function is a function of performing screen display of a television or a projector. The information processing device 730 may cause an image to be displayed on a display unit with which the information processing device 730 is equipped or may cause an image to be displayed on an external display device. In the second embodiment of the present technology, an example in which the display device 731 separate from the information processing device 730 is installed will be described.

When the display device 731 separate from the information processing device 730 is installed as described above, the information processing device 730 and the display device 731 can be connected through wired connection or wireless connection. For example, when the information processing device 730 and the display device 731 are connected through wired connection, the connection can be established using a wireline cable (for example, High-Definition Multimedia Interface (HDMI) (registered trademark), Mobile High-Definition Link (MHL), DisplayPort, or USB3.0). Further, for example, when the information processing device 730 and the display device 731 are connected through wireless connection, the connection can be established using the wireless LAN. A plurality of display devices may be connected to the information processing device 730.

The DRM content server 740 is a server that retains content (DRM content) in which a certain restriction is set on, for example, distribution or reproduction thereof. The DRM content server 740 provides the retained DRM content to the information processing devices (the information processing devices 703, 704, 710, 720, and 730) included in the communication system 700. For example, the DRM content server 740 is implemented by a device (for example a game machine, a hard disk drive (HDD) recorder, or a media server) including a retained medium.

For example, the DRM content server 740 is connected with the information processing device 730 using a wired line or a wireless line. For example, a communication scheme (for example, the wireless LAN) supported by the information processing device 730 may be used for the wireless communication. An infrared scheme, any other wireless scheme, or any other communication scheme may be used.

For example, the DRM content server 740 is connected with the information processing devices 703, 704, 710, and 720 via the information processing device 730.

The DRM content server 740 includes a communication unit 741, a control unit 742, and a DRM content storage unit 743.

The communication unit 741 performs transmission and reception of each piece of information with the information processing device 730 via the network 701 under control of the control unit 742.

The control unit 742 controls the respective units of the DRM content server 740 based on a control program. For example, the control unit 742 performs control for providing the DRM content stored in the DRM content storage unit 743 according to a request from each of the information processing devices (the information processing devices 703, 704, 710, 720, and 730) included in the communication system 700.

The DRM content storage unit 743 is a storage unit that stores the DRM content.

Here, a communication mode between the source device and the sink device will be described. For example, an image transmission mode is set as the communication mode. Here, the image transmission mode is a communication mode in which image transmission from the source device to the sink device is performed, and the source device and the sink device are directly connected in the P2P manner. The image transmission mode includes an image transmission mode (the middle channel) in which an image of the middle channel is transmitted and an image transmission mode (the peripheral channel) in which an image of the peripheral channel is transmitted.

The image transmission mode (the middle channel) is a communication mode in which image data for causing the image to be displayed on the middle channel (a middle channel region 733) in the display unit of the sink device is transmitted. In the image transmission mode (the middle channel), for example, the image data is transmitted through a wireless transmission path of a high frequency band.

The image transmission mode (the peripheral channel) is a communication mode in which image data for causing the image to be displayed on the middle channel (the peripheral channel region 734) in the display unit of the sink device is transmitted. In the image transmission mode (the peripheral channel), for example, the image data is transmitted through the wireless transmission path of the low frequency band.

In the source device, the communication mode is assumed to be sequentially switched under the control of the sink device, for example, as in the image transmission mode (the peripheral channel)→the image transmission mode (the middle channel)→the image transmission mode (the peripheral channel)→ . . . .

Communication Example of Image Data

Figure 18:
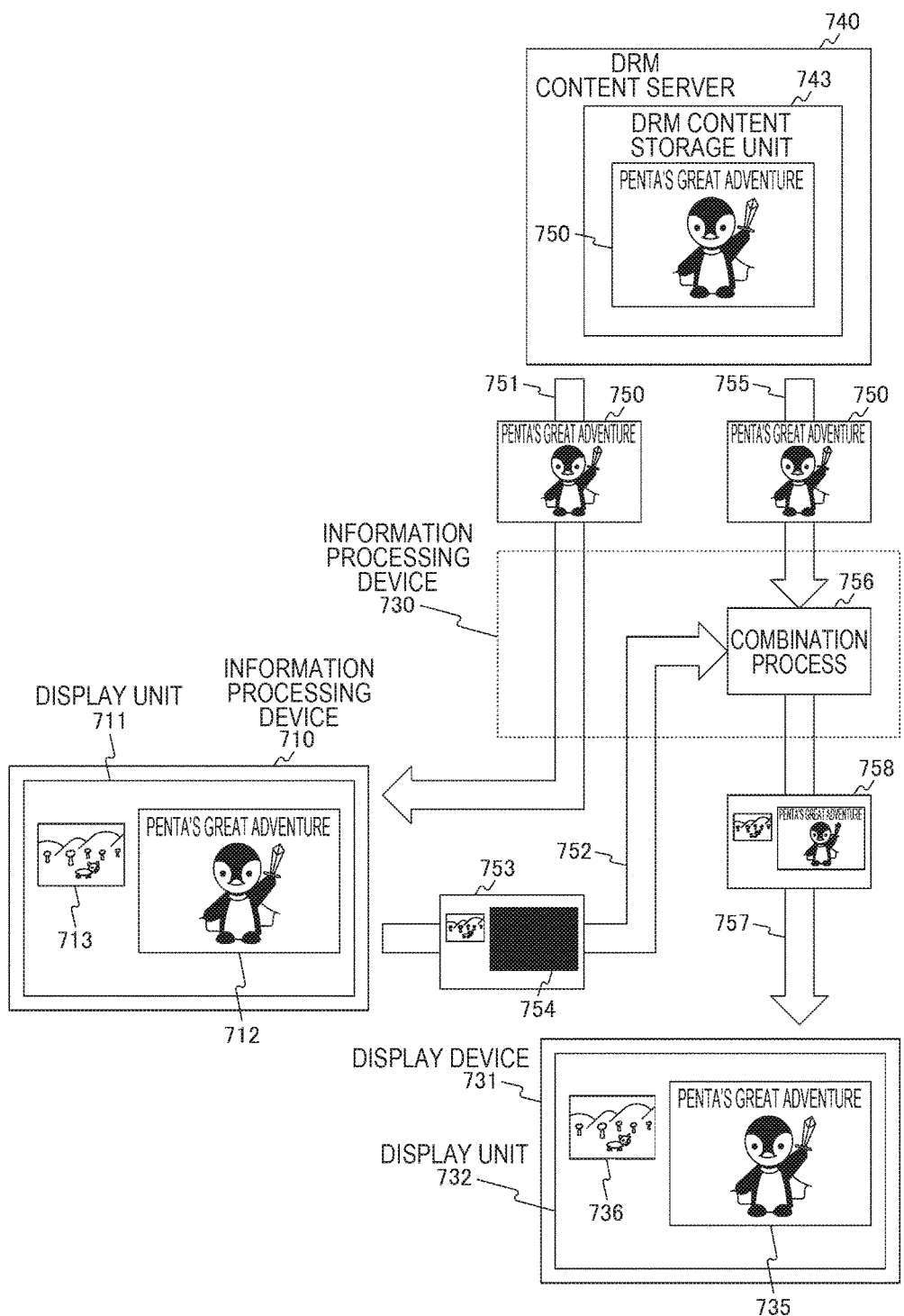
FIG. 18 is a diagram schematically illustrating an example of the flow of image data interchanged between devices included in the communication system 700 according to the second embodiment of the present technology.

FIG. 18 is a diagram schematically illustrating an example of the flow of image data interchanged between the devices included in the communication system 700 according to the second embodiment of the present technology.

FIG. 18 illustrates an example in which DRM content 750 stored in the DRM content storage unit 743 of the DRM content server 740 is displayed on a display unit 711 of the information processing device 710 and a display unit 732 of the display device 731.

Here, a certain restriction is set on, for example, distribution or reproduction of the DRM content 750. For this reason, for example, it may be difficult to transfer the DRM content 750 displayed on the display unit 711 of the information processing device 710 to the display device 731 according to Wi-Fi Certified Miracast and cause the DRM content 750 to be displayed on the display unit 732.

In this regard, in the second embodiment of the present technology, the sink device acquires the DRM content to be displayed on a non-display region (a DRM content display region) included in a display screen transmitted from the source device from an external device. Then, the sink device displays a combined image in which the display screen transmitted from the source device is combined with the DRM content. Here, the non-display region indicates a display region (for example, the DRM content display region) of an image managed under a copyright in the display screen displayed on the source device.

For example, as indicated by an arrow 751, the control unit of the information processing device 710 acquires the DRM content 750 from the DRM content server 740 via the information processing device 730. Then, the control unit of the information processing device 710 causes the acquired DRM content 750 to be displayed on the display unit 711. For example, an image based on the DRM content 750 is displayed on a region 712 of the display unit 711, and an image based on content stored in the information processing device 710 is displayed on a region 713 of the display unit 711.

Here, when the DRM content 750 is transferred as indicated by the arrow 751, the sink device (the information processing device 730) performs only a routing function. When the sink device performs only the routing function as described above, the DRM content can be transferred.

As indicated by an arrow 752, the control unit of the information processing device 710 transmits an entire display screen 753 displayed on the display unit 711 to the information processing device 730 according to Wi-Fi Certified Miracast. However, a certain restriction is set on, for example, distribution or reproduction of the DRM content 750. For this reason, the control unit of the information processing device 710 transmits an image of a specific color (for example, a black image) 754 as the display region (the region 712 of the display unit 711) of the DRM content 750 in the display screen 753 displayed on the display unit 711. Here, for example, the display region (the region 712 of the display unit 711) of the DRM content 750 is a region (a non-display image region) in which the DRM content 750 is not displayable in other devices.

As indicated by an arrow 755, the control unit of the information processing device 730 acquires the DRM content 750 from the DRM content server 740. Then, the control unit of the information processing device 730 performs a combination process 756 of combining the display screen 753 transmitted from the information processing device 710 with the acquired DRM content 750. In the combination process 756, the control unit of the information processing device 730 performs a combination process of combining the region of the image of the specific color 754 in the display screen 753 transmitted from the information processing device 710 with the image based on the DRM content 750.

Then, as indicated by an arrow 757, the control unit of the information processing device 730 causes a combined image 758 generated through the combination process 756 to be transmitted to the display device 731 and displayed on the display unit 732. For example, the image based on the DRM content 750 is displayed on a region 735 of the display unit 732, and the image based on the content stored in the information processing device 710 is displayed on a region 736 of the display unit 732.

As a result, the DRM content 750 stored in the DRM content storage unit 743 of the DRM content server 740 can be displayed on both the display unit 711 of the information processing device 710 and the display unit 732 of the display device 731.

Switching Example of Communication Mode of Source Device

Here, a switching method when the communication modes (the image transmission mode in which the DRM content is displayed and the image transmission mode in which the DRM content is not displayed) will be described.

For example, switching using the source device or switching using the sink device can be used as triggers for switching of the communication modes of the source device. For example, the switching using the source device is active switching according to a manipulation of the user using the source device. For example, the switching using the sink device is switching according to a manipulation of the user using the sink device.

The manipulation (the switching manipulation) of the user in each device is, for example, the manipulation of the user using the manipulation reception unit (for example, a manipulation member or a touch panel) with which each device is equipped or the manipulation of the user using the user information acquisition unit (for example, a detection unit that detects a gesture) with which each device is equipped.

In the switching using the source device, for example, a manipulation input of an application or a manipulation member installed in the source device in advance can be used as a switching trigger. For example, when the switching manipulation is performed in the source device, a command related to switching of the communication mode is transmitted to the sink device (the information processing device 730). When the command is received, the sink device (the information processing device 730) performs control such that the band of the source device that has transmitted the command is increased or decreased while performing control for the other bands.

In the switching using the source device, for example, the manipulation of the user in the sink device (the information processing device 730) can be used as the switching trigger. For example, when the switching manipulation of the source device is performed in the sink device (the information processing device 730), control is performed such that the band of the source device in which the switching manipulation has been performed is increased or decreased while performing control for the other bands.

Connection Process Example

Figure 19:
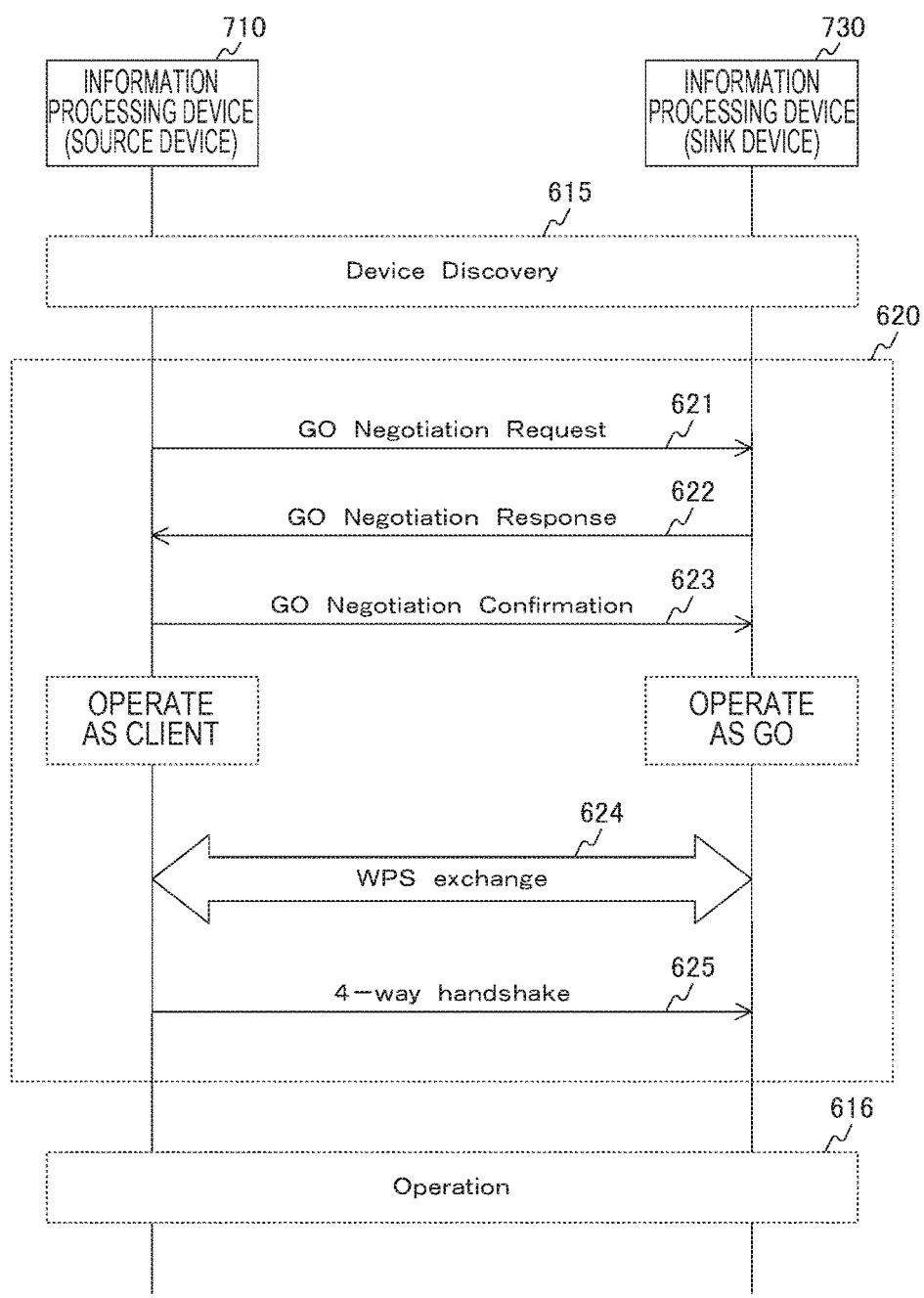
FIG. 19 is a sequence chart illustrating a connection process example between a source device and a sink device according to the second embodiment of the present technology.

FIG. 19 is a sequence chart illustrating a connection process example between the source device and the sink device according to the second embodiment of the present technology. FIG. 19 illustrates a connection process example between the information processing device (the source device) 710 and the information processing device (the sink device) 730.

First, the information processing device 710 performs the Device Discovery (615). When the information processing device 730 is detected through the Device Discovery, the information processing device 710 performs decision of a master-slave relation based on a Formation and an authentication process with the information processing device 730 (620). When the respective processes are completed, a connection is established between the information processing device 710 and the information processing device 730. Then, the information processing device 710 performs direct communication (Operation) with the information processing device 730 (616).

Here, the Formation (620) will be described.

First, GO_Negotiation is performed between the information processing device 710 and the information processing device 730. In GO_Negotiation, the information processing device 710 and the information processing device 730 exchange a priority for operating as a group owner (GO), and the information processing device that has the higher priority is decided to operate as the group owner (GO). FIG. 19 illustrates an example in which the priority of the information processing device 730 is higher, and the information processing device 730 is decided as the group owner (GO).

Specifically, the information processing device 710 transmits GO_Negotiation_Request to the information processing device 730 (621). Upon receiving GO_Negotiation_Request (621), the information processing device 730 transmits GO_Negotiation_Response to the information processing device 710 (622). Upon receiving GO_Negotiation_Response (622), the information processing device 710 transmits GO_Negotiation_Confirmation to the information processing device 730 (623).

Through these interchanges (621 to 623), the information processing device 730 is decided as the group owner (GO), and the information processing device 710 is decided as a client.

Then, the information processing device 710 and the information processing device 730 execute Wi-Fi protected access (WPS)_exchange (624). Through the execution of WPS_exchange, the information processing device 710 and the information processing device 730 share credentials (for example, a service set identifier (SSID) and a Wi-Fi protected access 2 (WPS2)-pre-shared key (PSK).

Then, the information processing device 710 and the information processing device 730 execute 4-way_handshake (625).

Example of Initiating Group Authentication Using NFC

In the second embodiment of the present technology, an example in which the group authentication between the source device and the sink device starts using the near field communication will be described. For example, the group authentication can start using a Wi-Fi Direct over near field communication (NFC) protocol or a Wi-Fi direct using NFC protocol. For example, the group authentication can be initiated by the source device having the NFC function touching the sink device having the NFC function directly.

The Wi-Fi Direct over NFC protocol is a protocol for connecting the source device and the sink device by touching between the source device and the sink device. The protocol is, for example, a protocol for interchanging information for connecting Wi-Fi Direct by causing the source device with the NFC tag to touch (or approach) the sink device equipped with the NFC reader/writer function.

As described above, the group authentication can be initiated by the operation of the user of causing the source device to touch the sink device directly. Thus, when the user intends to participate in the group, the user can actively perform an operation for participating in the group. Further, switching to the connection with the access point can be performed after the direct connection between the source device and the sink device. Accordingly, it is possible to provide a user-friendly interface. Further, it is possible for the user to cause the source device to be connected to a desired sink device by performing the operation of causing the source device to touch the desired sink device.

The group authentication may be initiated by causing the source device to touch another device instead of touching the sink device directly. For example, a reader/writer device is installed near an entrance of a place in which image transmission between the source device and the sink device is performed. The reader/writer device interchanges various kinds of information with the information processing device using the near field communication (for example, NFC). The reader/writer device transmits information interchanged with the information processing device to the sink device using a wireless line or a wired line.

For example, the group authentication may be initiated by causing the source device to touch the reader/writer device. In this case, the reader/writer device transmits information (for example, terminal identification information or a personal identification number (PIN) code) related to the touched source device to the sink device. For the PIN code, a unique ID that is independently generated is preferably used.

Further, for example, a remote controller for manipulating the sink device (for example, the information processing device 730) or the display device (for example, the display device 731) may be used as the sink device. For example, the group authentication may be initiated by causing the source device to touch the remote controller equipped with the NFC reader/writer function. In this case, the remote controller transmits information (for example, the terminal identification information or the PIN code) related to the touched source device to the sink device.

Communication Example

Figure 20:
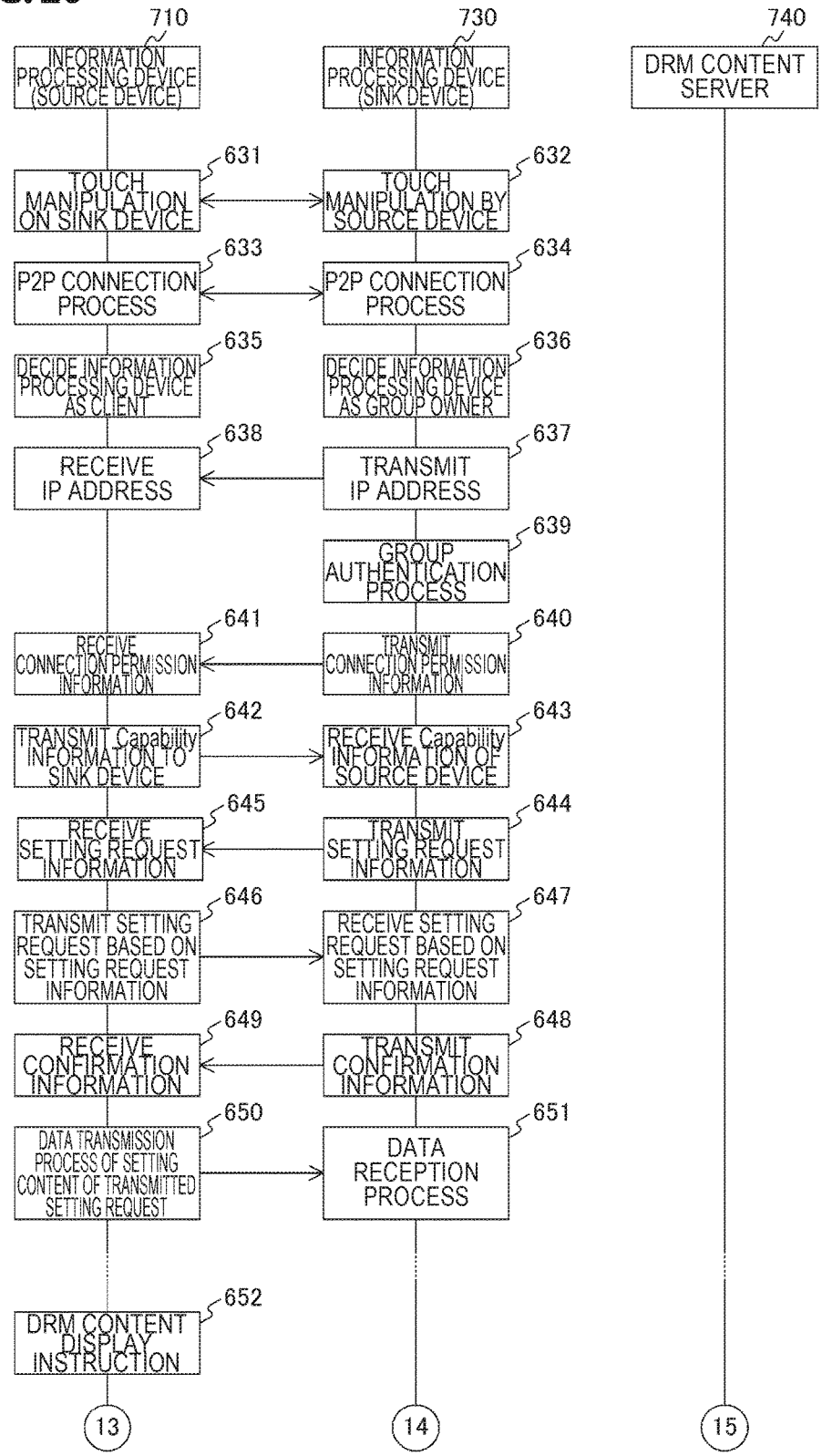
FIG. 20 is a sequence chart illustrating a communication process example between devices included in the communication system 700 according to the second embodiment of the present technology.
Figure 21:
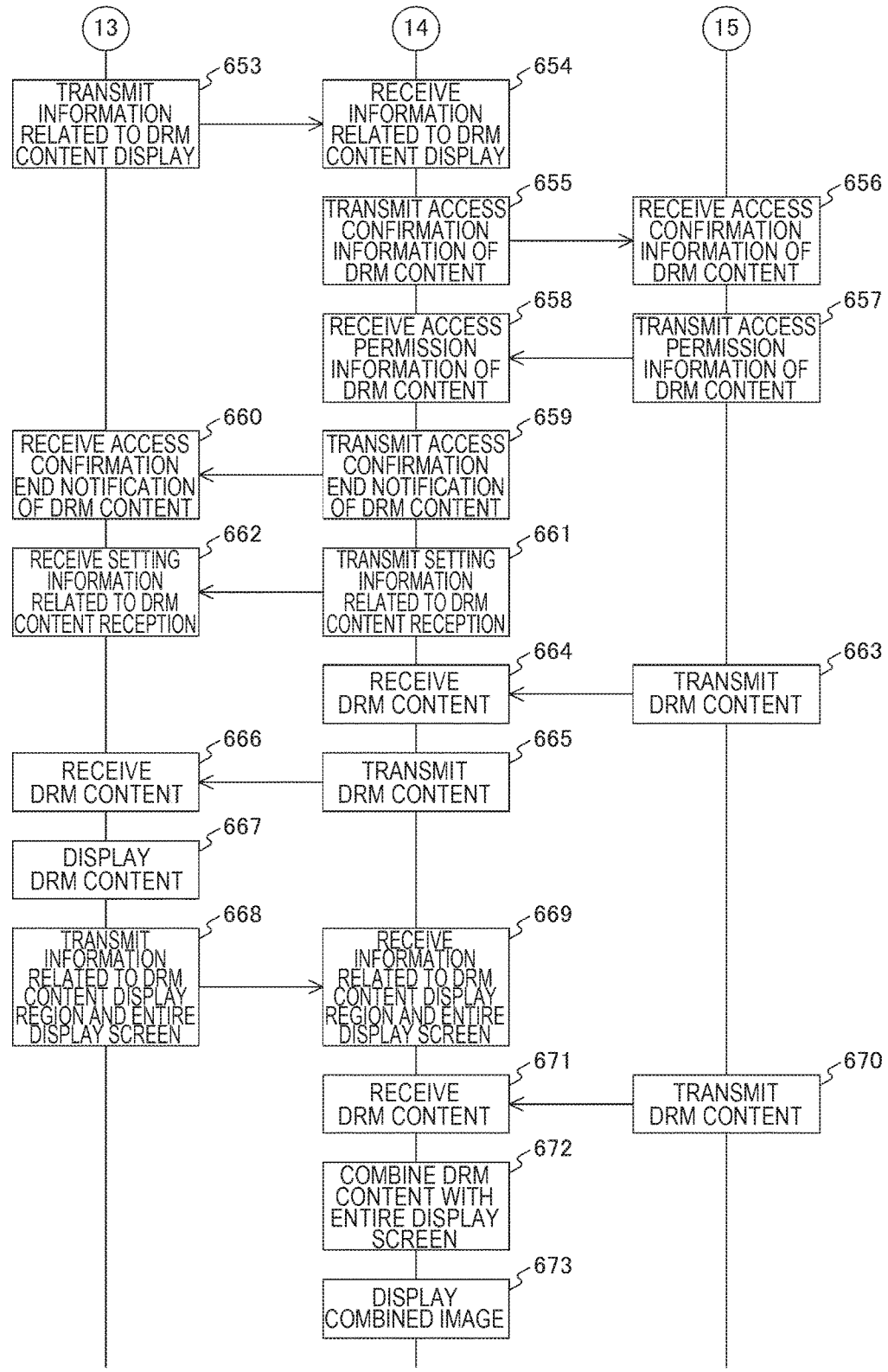
FIG. 21 is a sequence chart illustrating a communication process example between devices included in the communication system 700 according to the second embodiment of the present technology.

FIGS. 20 and 21 are sequence charts illustrating a communication process example between devices included in the communication system 700 according to the second embodiment of the present technology. FIGS. 20 and 21 illustrate a communication process example among the information processing device (the source device) 710, the information processing device (the sink device) 730, and the DRM content server 740.

FIGS. 20 and 21 illustrate an example in which the group authentication is initiated by causing the information processing device 710 to touch the information processing device 730 directly.

In the example of FIGS. 20 and 21, the information processing device (the sink device) 730 functions as a group authentication server. In other words, the information processing device (the sink device) 730 is assumed to have a group authentication function.

In FIGS. 20 and 21, the information processing device 710 is assumed to have an NFC tag function, and the information processing device 730 is assumed to have an NFC reader/writer function. The information processing device 730 functions as a DHCP server.

First, the information processing device 710 is touched by the information processing device 730 (631 and 632). When the information processing device 710 is touched by the information processing device 730 as described above (631 and 632), the control unit of the information processing device 710 (corresponding to the control unit 240 illustrated in FIG. 2) initiates a direct connection with the information processing device 730 (633 and 634).

Then, the information processing device 710 is decided as a P2P client (635), and the information processing device 730 is decided as a P2P group owner (GO) (636). Then, the control unit of the information processing device 710 receives a radio parameter from the information processing device 730, and performs the connection process based on the received radio parameter.

Then, the control unit of the information processing device 710 acquires an IP address from the information processing device 730 (DHCP server) (637 and 638).

Further, the control unit (corresponding to the control unit 370 illustrated in FIG. 3) of the information processing device 730 performs a group authentication process (639). In the group authentication process, it is determined whether or not the information processing device 710 participates in the group operated by the application activated by the information processing device 710 (639). In other words, the control unit of the information processing device 730 performs the group authentication process for determining whether or not a connection for operating the application activated by the information processing device 710 is permitted to the information processing device 710 (639).

For example, in the group authentication process, it is determined whether or not the manipulation of the user for giving the permission to the information processing device 710 has been performed in any one of the source device and the sink device that belong to the same group and are already in the connection state. Then, a determination for permitting the information processing device 710 to participate in the group can be performed under the condition that the manipulation of the user for giving the permission to the information processing device 710 have been performed in any one of the devices (the source device, and the sink device).

For example, a display screen (for example, pop-up) for performing the manipulation of the user for giving the permission to the information processing device 710 is displayed on the display unit of at least one of the devices (the source device, and the sink device). Then, when the manipulation of the user for giving the permission to the information processing device 710 is performed on display screen, the control unit of the information processing device 730 determines to permit the information processing device 710 to participate in the group (639).

For example, the group authentication process may be performed whether or not the information processing device has been registered in advance. For example, the control unit of the information processing device 730 determines to permit the information processing device whose terminal identification information has been registered in the information processing device 730 in advance to participate in the group (639).

When the information processing device 710 is determined to be permitted to participate in the group in the group authentication process (639), the control unit of the information processing device 730 transmits connection permission information to the information processing device 710 (640 and 641). Here, the connection permission information is information indicating that the information processing device 710 is permitted to participate in the group operated by the application activated by the information processing device 710.

Further, when the information processing device 710 is determined not to be permitted to participate in the group in the group authentication process (authentication is not permitted) (639), the control unit of the information processing device 730 transmits connection non-permission information to the information processing device 710. Here, the connection non-permission information is information indicating that the information processing device 710 is not permitted to participate in the group operated by the application activated by the information processing device 710. When the information processing device 710 receives the connection non-permission information, the operation of the data transmission process ends.

Upon receiving the connection permission information from the information processing device 730 (641), the control unit of the information processing device 710 transmits the capability information related to the information processing device 710 to the information processing device 730 via the access point 701 (642 and 643). The capability information is capability information for performing Wi-Fi CERTIFIED Miracast communication with the information processing device 730.

Upon receiving the capability information from the information processing device 710 (643), the control unit of the information processing device 730 transmits setting request information to the information processing device 710 (644 and 645). The setting request information is information for requesting a setting for performing the image transmission according to the Wi-Fi CERTIFIED Miracast standard.

Here, the information processing device 730 performs band control and display screen control for the source devices connected with the information processing device 730. For this reason, it is necessary to request a newly connected information processing device 710 to transmit a setting of a parameter in which group sharing is considered based on a relation with other source devices. In this regard, after the information processing device 710 is permitted to participate in the group, the control unit of the information processing device 730 transmits the setting request information related to the information processing device 710 based on each piece of information related to each of the source devices connected with the information processing device 730 (644 and 645).

When the setting request information is received (645), in the information processing device 710, the image transmission mode is set as an initial state. Then, the control unit of the information processing device 710 transmits a setting request to the information processing device 730 based on the setting request information received from the information processing device 730 (646 and 647). Further, when Wi-Fi Certified Miracast communication is performed between the information processing device 710 and the information processing device 730, the image transmission mode is assumed to be continuously set in the information processing device 710.

When the setting request is received (647), the control unit of the information processing device 730 transmits confirmation information indicating permission for reception of an image corresponding to the setting request to the information processing device 710 (648 and 649). Further, when reception of an image corresponding to the setting request is not permitted, the control unit of the information processing device 730 transmits confirmation information indicating the non-permission to the information processing device 710. In this case, the operation of the data transmission process ends.

When the confirmation information has been received (649), the control unit of the information processing device 710 starts the direct P2P connection with the information processing device 730 (650 and 651). Then, the control unit of the information processing device 710 performs the negotiation of the image parameter and the audio parameter with the information processing device 730 based on the connection request corresponding to the received confirmation information, and transmits the image data (650 and 651).

Here, a DRM content display instruction manipulation for displaying the DRM content is assumed to be performed (652). When the DRM content display instruction manipulation is performed (652), the control unit of the information processing device 710 transmits information related to DRM content display to the information processing device 730 (653 and 654). Here, for example, the information related to the DRM content display is command information related to the non-display region (the DRM content display region) in the display screen and can specify the non-display region and the DRM content. The information related to the DRM content display includes, for example, information related to the DRM content display region and information related to the DRM content. The information related to the DRM content display region is, for example, information specifying a display size and a display position in the display unit 711. For example, the information related to the DRM content is, for example, information (for example, a uniform resource locator (URL)) specifying DRM content serving as a display target.

When the information related to the DRM content display is received (654), the control unit of the information processing device 730 transmits access confirmation information of the DRM content to the DRM content server 740 (655, 656). The access confirmation information of the DRM content is confirmation information for accessing the DRM content specified by the information related to the DRM content display.

When the access confirmation information of the DRM content is received (656), the control unit 742 of the DRM content server 740 determines whether or not access to the DRM content is permitted. Then, when the access to the DRM content is determined to be permitted, the control unit 742 of the DRM content server 740 transmits access permission information of the DRM content to the information processing device 730 (657 and 658). Further, when the access to the DRM content is determined not to be permitted, the control unit 742 of the DRM content server 740 transmits access non-permission information of the DRM content to the information processing device 730. In this case, the information processing device 710 is not able to cause the DRM content to be displayed on the display unit 711.

When the access permission information of the DRM content is received (658), the control unit of the information processing device 730 transmits an access confirmation end notification of the DRM content to the information processing device 710 (659 and 660). The access confirmation end notification of the DRM content is information for giving the DRM content server 740 a notification indicating that the access confirmation to the DRM content has ended.

The control unit of the information processing device 730 transmits setting information related to DRM content reception to the information processing device 710 (661 and 662). The setting information related to the DRM content reception is information (for example, a resolution, a transmission rate, other capability information, or a result of performing band control including other links) for the information processing device 710 to receive the DRM content via the information processing device 730.

When the access confirmation end notification of the DRM content and the setting information related to the DRM content reception are received (660 and 662), the control unit of the information processing device 710 acquires the DRM content (663 to 666). In this case, the control unit of the information processing device 710 receives and acquires the DRM content from the DRM content server 740 via the information processing device 730 (663 to 666).

Then, the control unit of the information processing device 710 decodes the received DRM content, and causes the image based on the decoded DRM content to be displayed on the display unit 711 (667).

Then, the control unit of the information processing device 710 transmits the entire display screen displayed on the display unit 711 to the information processing device 730 according to Wi-Fi Certified Miracast (668 and 669). In this case, the control unit of the information processing device 710 transmits the image of the specific color (for example, the black image) as the DRM content display region (the display region in the display unit 711) in the display screen displayed on the display unit 711 (668 and 669). In other words, the entire display screen displayed on the display unit 711 and the information related to the DRM content display region are transmitted to the information processing device 730 (668 and 669).

The control unit of the information processing device 730 acquires the DRM content to be combined with the entire display screen displayed on the display unit 711 from the DRM content server 740 (670, 671). Then, the control unit of the information processing device 730 performs the combination process of combining the display screen transmitted from the information processing device 710 with the acquired DRM content (672).

Then, the control unit of the information processing device 730 causes the combined image generated by the combination process (672) to be transmitted to the display device 731 and displayed on the display unit 732 (673).

As described above, the control unit of the information processing device 730 performs control such that the DRM content (second image information) to be displayed on the DRM content display region (the non-display region) included in the display screen (first image information) transmitted from the information processing device 710 is acquired. Then, the control unit of the information processing device 730 performs control such that the combined image in which the display screen (the first image information) is combined with the DRM content (the second image information) is transmitted to the display device 731 and displayed on the display unit 732.

In this case, the control unit of the information processing device 730 can specify the non-display region in the display screen (the first image information) and the DRM content (the second image information) based on the command information related to the non-display region transmitted from the information processing device 710. For example, the control unit of the information processing device 730 can specify the non-display region based on the position and the size of the non-display region included in the command information. Further, for example, the control unit of the information processing device 730 can acquire the DRM content (the second image information) from the external device based on the address information (for example, URL) related to the DRM content (the second image information) included in the command information.

The control unit of the information processing device 710 performs control such that the command information related to the non-display region included in the image information that is displayed on the display unit 711 and transmitted to and displayed on the information processing device 730 is transmitted to the information processing device 730. Then, the control unit of the information processing device 710 performs control such that image information other than the non-display region in the image information is transmitted to the information processing device 730.

Operation Example of Information Processing Device (Source Device)

Figure 22:
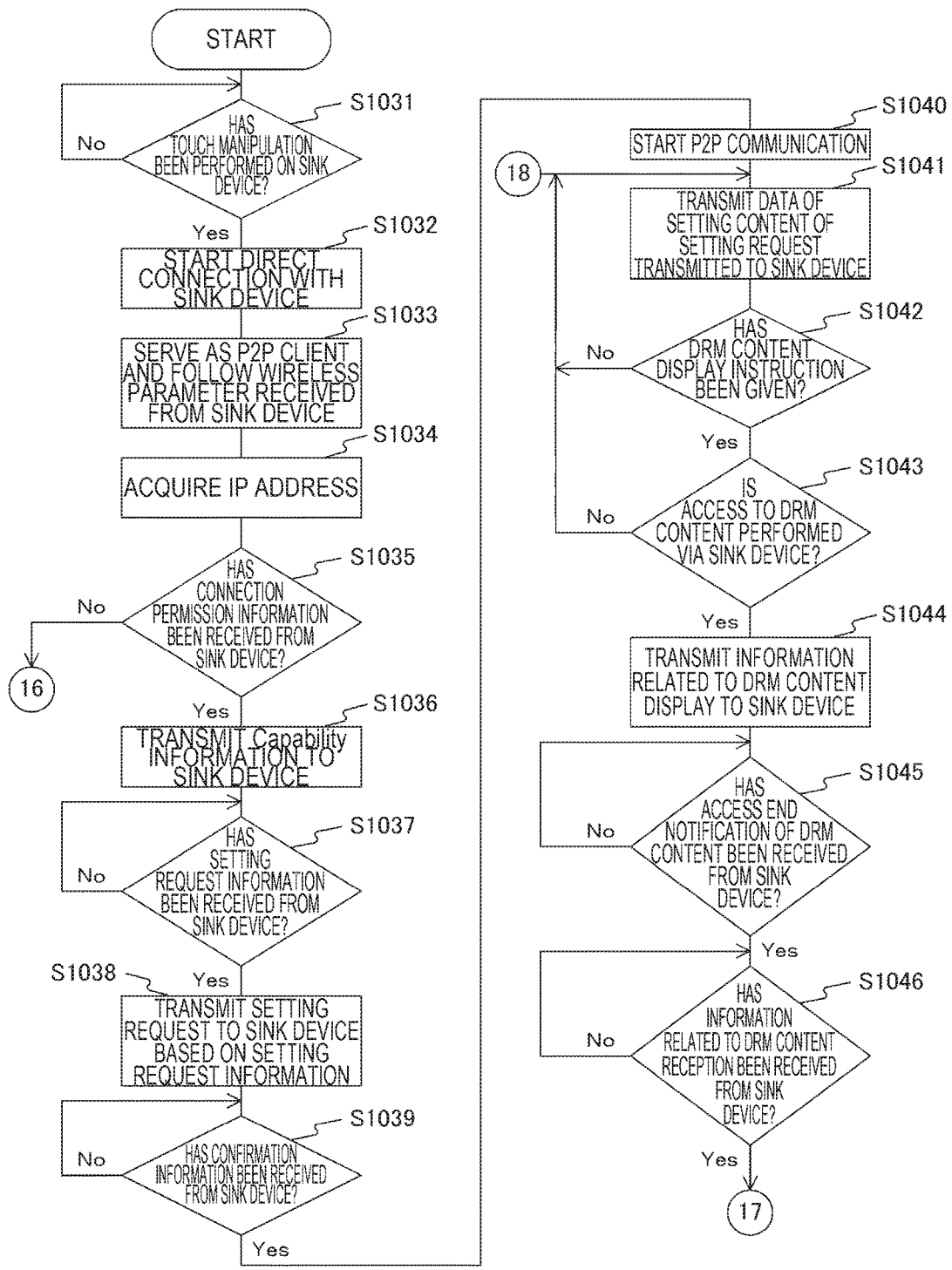
FIG. 22 is a flowchart illustrating an example of a processing procedure of a data transmission process performed by the information processing device 710 according to the second embodiment of the present technology.
Figure 23:
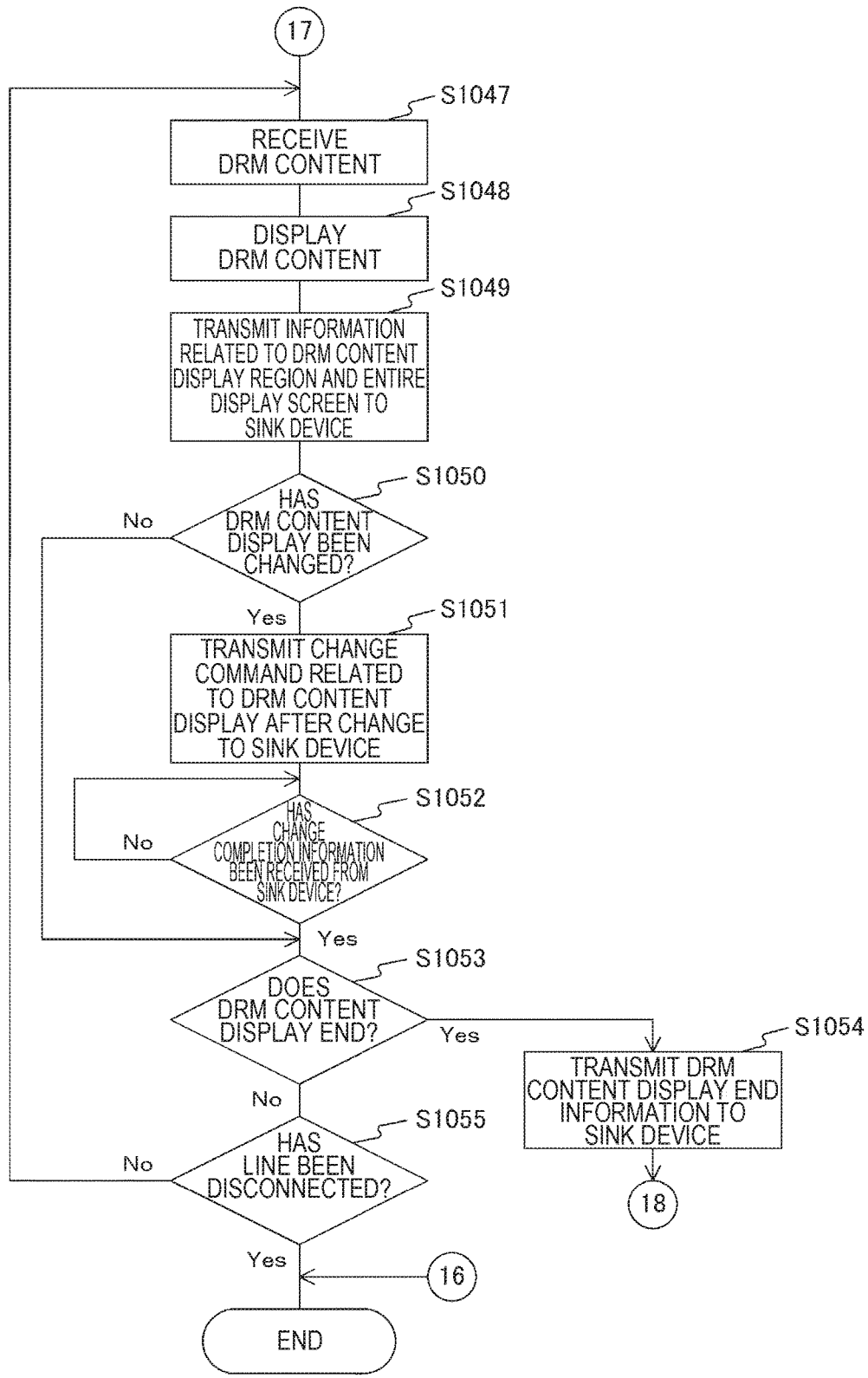
FIG. 23 is a flowchart illustrating an example of a processing procedure of a data transmission process performed by the information processing device 710 according to the second embodiment of the present technology.

FIGS. 22 and 23 are flowcharts illustrating an example of a processing procedure of the data transmission process performed by the information processing device 710 according to the second embodiment of the present technology. FIGS. 22 and 23 illustrate an example in which the group authentication is initiated by causing the information processing device 710 to touch the information processing device 730 directly.

In FIGS. 22 and 23, the information processing device 710 is assumed to have an NFC tag function, and the information processing device 730 is assumed to have an NFC reader/writer function. The information processing device 730 functions as a DHCP server.

First, the control unit of the information processing device 710 determines whether or not the information processing device 710 touches the information processing device 730 (step S1031). When the information processing device 710 does not touch the information processing device 730 (step S1031), it is continuously monitored.

When the information processing device 710 touches the information processing device 730 (step S1031), the control unit of the information processing device 710 starts the direct connection with the information processing device 730 (step S1032). In other words, the information processing device 710 functions as a P2P client, and the information processing device 730 functions as a P2P GO. Then, the control unit of the information processing device 710 receives a wireless parameter from the information processing device 730, and performs the connection process based on the received wireless parameter (step S1033).

Then, the control unit of the information processing device 710 acquires an IP address from the information processing device 730 (DHCP server) (step S1034).

Then, the control unit of the information processing device 710 determines whether or not the connection permission information has been received from the information processing device 730 (step S1035). When the connection permission information has not been received from the information processing device 730 (step S1035), the operation of the data transmission process ends.

When the connection permission information has been received from the information processing device 730 (step S1035), the control unit of the information processing device 710 transmits the capability information related to the information processing device 710 to the information processing device 730 (step S1036).

Then, the control unit of the information processing device 710 determines whether or not the setting request information has been received from the information processing device 730 (step S1037). When the setting request information has not been received (step S1037), it is continuously monitored.

When the setting request information has been received (step S1037), in the information processing device 710, the image transmission mode is set as the initial state. Then, the control unit of the information processing device 710 transmits the setting request to the information processing device 730 based on the setting request information received from the information processing device 730 (step S1038).

Then, the control unit of the information processing device 710 determines whether or not the confirmation information indicating permission for reception of an image corresponding to the setting request has been received from the information processing device 730 (step S1039). When the confirmation information has not been received from the information processing device 730 (step S1039), it is continuously monitored.

When the confirmation information has been received from the information processing device 730 (step S1039), the control unit of the information processing device 710 starts the direct P2P connection with the information processing device 730 (step S1040). Then, the control unit of the information processing device 710 performs the negotiation of the image parameter and the audio parameter with the information processing device 730 based on the connection request corresponding to the received confirmation information, and transmits the image data (step S1041).

Then, the control unit of the information processing device 710 determines whether or not the DRM content display instruction manipulation has been performed (step S1042). Then, when the DRM content display instruction manipulation has not been performed (step S1042), the process returns to step S1041.

When the DRM content display instruction manipulation is performed (step S1042), the control unit of the information processing device 710 determines whether or not access to the DRM content is performed via the information processing device 730 (step S1043). For example, when access to the DRM content is performed via the information processing device 730, the information processing device 710 newly installs a port that is connected with a private LAN via the information processing device 730 and accesses the DRM content connected to the private LAN.

When the access to the DRM content is determined not to be performed via the information processing device 730 (step S1043), the DRM content is not displayable, and thus the process returns to step S1041. In this case, since the access to the DRM content is determined not to be performed via the information processing device 730, the control unit of the information processing device 710 may give the user a notification indicating that the DRM content is not displayable (through a display or audio output).

When the access to the DRM content is determined to be performed via the information processing device 730 (step S1043), the control unit of the information processing device 710 transmits the information related to the DRM content display to the information processing device 730 (step S1044).

Then, the control unit of the information processing device 710 determines whether or not the access confirmation end notification of the DRM content has been received (step S1045). Then, when the access confirmation end notification of the DRM content has not been received, it is continuously monitored.

When the access confirmation end notification of the DRM content has been received (step S1045), the control unit of the information processing device 710 determines whether or not the setting information related to the DRM content reception has been received (step S1046). Then, when the setting information related to the DRM content reception has not been received, it is continuously monitored.

When the setting information related to the DRM content reception has been received (step S1046), the control unit of the information processing device 710 receives the DRM content from the DRM content server 740 via the information processing device 730 (step S1047).

Then, the control unit of the information processing device 710 decodes the received DRM content, and causes the image based on the decoded DRM content to be displayed on the display unit 711 (step S1048).

Then, the control unit of the information processing device 710 transmits the entire the display screen displayed on the display unit 711 to the information processing device 730 according to Wi-Fi Certified Miracast (step S1049). In this case, the control unit of the information processing device 710 transmits the image of the specific color (for example, the black image) as the DRM content display region (the display region in the display unit 711) in the display screen displayed on the display unit 711 (step S1049).

Then, the control unit of the information processing device 710 determines whether or not a change manipulation for changing a DRM content display position has been performed (step S1050). When the change manipulation has not been performed (step S1050), the process proceeds to step S1053. When the change manipulation has been performed (step S1050), the control unit of the information processing device 710 transmits a change command related to the DRM content display after the change by the change manipulation to the information processing device 730 (step S1051). The change command is a command for giving the sink device a notification indicating that the position of the DRM content display region has been changed. The change command includes the information (for example, the display size and the display position in the display unit 711) related to the DRM content display region after the change by the change manipulation and the information (the URL of the DRM content serving as the display target) related to the DRM content. The control unit of the information processing device 730 can determine the position of the DRM content in the entire display screen in the display unit 711 of the information processing device 710 based on the change command.

Then, the control unit of the information processing device 710 determines whether or not change completion information has been received from the information processing device 730 (step S1052). The change completion information is information (command) for giving a notification indicating that the change process corresponding to the change command transmitted from the information processing device 710 has been completed. As the change completion information is received by the information processing device 710, the control unit of the information processing device 710 can change the display position of the DRM content.

Then, the control unit of the information processing device 710 determines whether or not a manipulation (a DRM content display end manipulation) for ending the DRM content display has been performed (step S1053). When the DRM content display end manipulation has been performed (step S1053), the control unit of the information processing device 710 transmits DRM content display end information to the information processing device 730 (step S1054), and the process returns to step S1041. The DRM content display end information is information (a command) for giving the sink device a notification indicating that the DRM content display ends.

When the DRM content display end manipulation is performed (step S1053), the control unit of the information processing device 710 performs a change such that the process of displaying the image of the specific color as the DRM content display region is not performed.

When the DRM content display end information is received, the control unit of the information processing device 730 ends the DRM content combination process so that the image data transmitted from the information processing device 710 can be decoded without change and displayed on the display device 731.

When the DRM content display end manipulation has not been performed (step S1053), the control unit of the information processing device 710 determines whether or not the line has been disconnected (step S1055). Then, when the line has been disconnected (step S1055), the operation of the data transmission process ends. When the line has not been disconnected (step S1055), the process returns to step S1047.

Operation Example of Information Processing Device (Sink Device)

Figure 24:
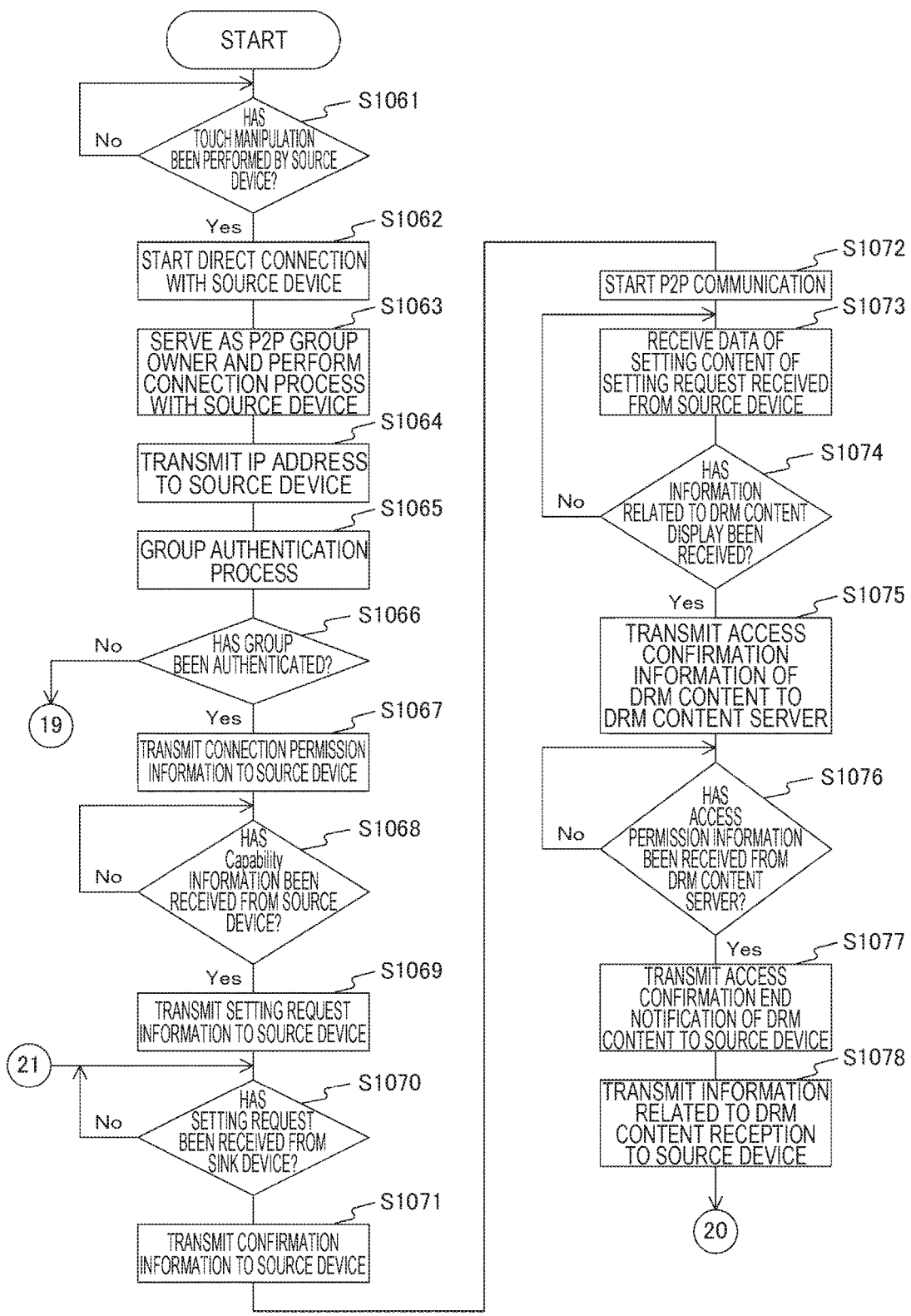
FIG. 24 is a flowchart illustrating an example of a processing procedure of a data reception process performed by the information processing device 730 according to the second embodiment of the present technology.
Figure 25:
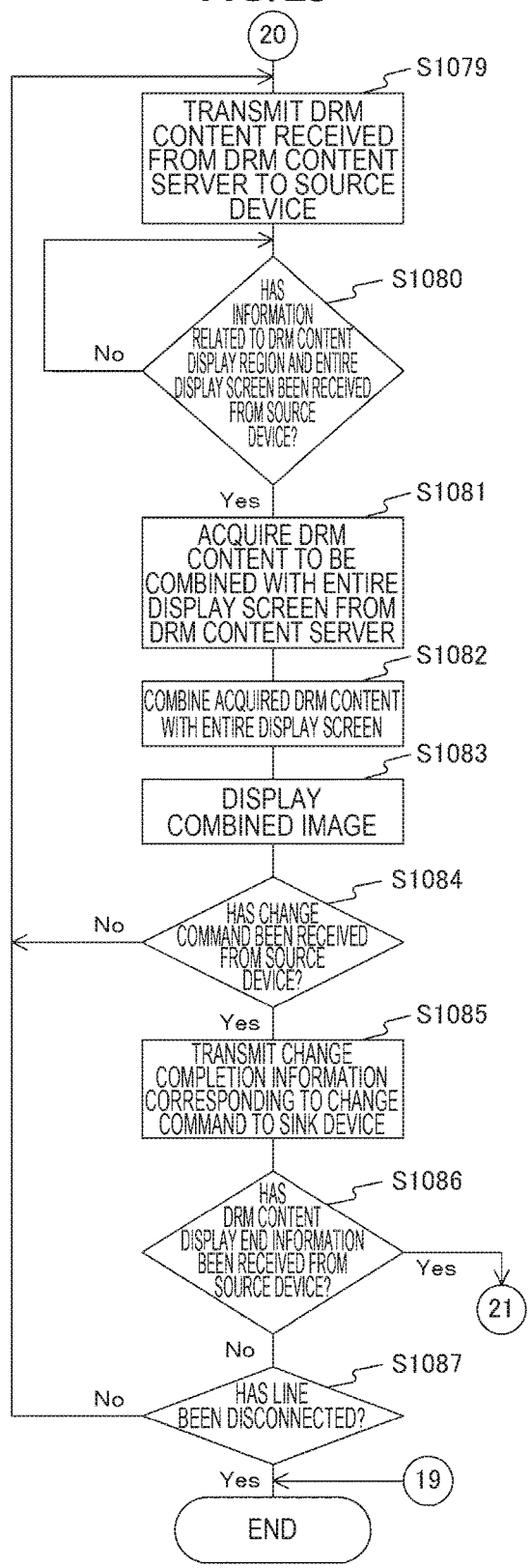
FIG. 25 is a flowchart illustrating an example of a processing procedure of a data reception process performed by the information processing device 730 according to the second embodiment of the present technology.

FIGS. 24 and 25 are flowcharts illustrating an example of a processing procedure of the data transmission process performed by the information processing device 710 according to the second embodiment of the present technology. FIGS. 24 and 25 illustrate an example in which the group authentication is initiated by causing the information processing device 710 to be touched by the information processing device 730 directly.

In FIGS. 24 and 25, the information processing device 710 is assumed to have an NFC tag function, and the information processing device 730 is assumed to have an NFC reader/writer function. The information processing device 730 functions as a DHCP server.

First, the control unit of the information processing device 730 determines whether or not the information processing device 730 is touched by the information processing device 710 (step S1061). When the information processing device 730 is not touched by the information processing device 710 (step S1061), it is continuously monitored.

When the information processing device 730 is touched by the information processing device 710 (step S1061), the control unit of the information processing device 730 starts the direct connection with the information processing device 710 (step S1062). In other words, the information processing device 710 functions as a P2P client, and the information processing device 730 functions as a P2P GO. Then, the control unit of the information processing device 730 transmits a wireless parameter to the information processing device 710, and performs the connection process based on the wireless parameter (step S1063).

Then, the control unit of the information processing device 730 transmits an IP address to the information processing device 710 (step S1064).

Then, the control unit of the information processing device 730 performs the group authentication process (step S1065). When the information processing device 710 is determined to be permitted to participate in the group authentication process (step S1066), the control unit of the information processing device 730 transmits connection permission information to the information processing device 710 (step S1067).

Further, when the information processing device 710 is determined not to be permitted to participate in the group authentication process (when the authentication is not permitted) (step S1067), the operation of the data reception process ends. In this case, the control unit of the information processing device 730 may transmit connection non-permission information to the information processing device 710.

Then, the control unit of the information processing device 730 determines whether or not the capability information related to the information processing device 710 has been received from the information processing device 710 (step S1068). When the capability information related to the information processing device 710 has been received (step S1068), the control unit of the information processing device 730 transmits the setting request information to the information processing device 710 (step S1069).

Then, the control unit of the information processing device 730 determines whether or not the setting request has been received from the information processing device 710 (step S1070). Then, when the setting request has not been received, it is continuously monitored.

When the setting request has been received (step S1070), the control unit of the information processing device 730 transmits the confirmation information indicating permission for reception of an image corresponding to the connection request to the information processing device 710 (step S1071).

Then, the control unit of the information processing device 730 initiates the P2P direct connection with the information processing device 710 (step S1072). Then, the control unit of the information processing device 730 performs a negotiation of an image parameter and an audio parameter with the information processing device 710 based on the received connection request, and performs a process of receiving the image data (step S1073). Step S1073 is an example of a first process set forth in the claims.

Then, the control unit of the information processing device 730 determines whether or not the information related to the DRM content display has been received from the information processing device 710 (step S1074). Then, when the information related to the DRM content display has not been received (step S1074), the process returns to step S1073.

When the information related to the DRM content display has been received (step S1074), the control unit of the information processing device 730 transmits the access confirmation information of the DRM content to the DRM content server 740 (step S1075).

Then, the control unit of the information processing device 730 determines whether or not the access permission information of the DRM content has been received from the DRM content server 740 (step S1076). When the access permission information of the DRM content has not been received (step S1076), it is continuously monitored.

When the access permission information of the DRM content has been received (step S1076), the control unit of the information processing device 730 transmits the access confirmation end notification of the DRM content to the information processing device 710 (step S1077).

Then, the control unit of the information processing device 730 transmits the setting information related to the DRM content reception to the information processing device 710 (step S1078). Then, the control unit of the information processing device 730 transmits the DRM content received from the DRM content server 740 to the information processing device 710 (step S1079).

Then, the control unit of the information processing device 730 determines whether or not the entire display screen displayed on the display unit 711 of the information processing device 710 and the information related to the DRM content display region have been received from the information processing device 710 (step S1080). When the entire display screen and the information related to the DRM content display region have not been received (step S1080), it is continuously monitored.

When the entire display screen and the information related to the DRM content display region have been received (step S1080), the control unit of the information processing device 730 acquires the DRM content from the DRM content server 740 (step S1081). Then, the control unit of the information processing device 730 performs the combination process of combining the display screen transmitted from the information processing device 710 with the acquired DRM content (step S1082).

Then, the control unit of the information processing device 730 causes the combined image generated by the combination process to be transmitted to the display device 731 and displayed on the display unit 732 (step S1083). Steps S1080 to S1083 are an example of a second process set forth in the claims.

Then, the control unit of the information processing device 730 determines whether or not the change command has been received from the information processing device 710 (step S1084). When the change command has not been received (step S1084), the process returns to step S1079.

When the change command has been received (step S1084), the control unit of the information processing device 730 transmits the change completion information corresponding to the received change command to the information processing device 710 (step S1085).

Then, the control unit of the information processing device 730 determines whether or not the DRM content display end information has been received from the information processing device 710 (step S1086). When the DRM content display end information has been received (step S1086), the process returns to step S1070. When the DRM content display end information has been received (step S1086), the control unit of the information processing device 730 ends the DRM content combination process so that the image data transmitted from the information processing device 710 can be decoded without change and displayed on the display device 731.

When the DRM content display end information has not been received (step S1086), the control unit of the information processing device 730 determines whether or not the line has been disconnected (step S1087). Then, when the line has been disconnected (step S1087), the operation of the data transmission process ends. When the line has not been disconnected (step S1087), the process returns to step S1079.

In the second embodiment of the present technology, the example in which the image information transmitted from one source device is displayed at one sink device side has been described. However, the second embodiment of the present technology can also be applied when the image information transmitted from a plurality of source devices is simultaneously displayed at one sink device side. In this case, the display control described in the first embodiment of the present technology can be applied. In other words, the control unit of the information processing device 730 can perform control such that a plurality of combined images related to a plurality of display screens transmitted from a plurality of source devices are transmitted to the display device 731 and simultaneously displayed on the display unit 732.

In the second embodiment of the present technology, the example in which the change command is transmitted from the source device to the sink device to notify of the change in the DRM content display position has been described, but the present technology is not limited thereto.

For example, when image transmission is performed between the source device and the sink device, it is necessary to synchronize functions such as play, stop, fast forward, and rewind of image content between the source device and the sink device. In this regard, command information specifying control information such as play, stop, fast forward, and rewind performed on the non-display image region may be transmitted from the source device to the sink device at regular or irregular intervals.

As described above, the case in which the command (for example, the command "RTSP M7 Request" (RTSP SET_PARAMETER (Request (wfd-trigger-method: PLAY 710)) received from the information processing device 710) for managing a source device from which the PLAY command has been received among a plurality of source devices at the sink device side is received is assumed. In this case, a destination (for example, a URL of the DRM content server) of the PLAY command is described in the command, and thus the sink device can play the DRM content for the information processing device 710 that is being received. Further, the functions other than play (for example, stop, fast forward, rewind, and the like) can also be implemented.

Further, for example, it is necessary to cause an image reproduction timing of the source device to match an image reproduction timing of the sink device. To this end, a notification indicating a picture number, a decoding time until the DRM content is displayed after the DRM content is received by the source device, and the like may be given to the sink device by the source device. In other words, the control unit of the information processing device 730 can perform display control for the combined image based on control information related to the image displayed on the non-display region included in the command information.

Further, for example, image data serving as a transmission target may be switched based on the size of the DRM content display region of the display unit of the source device (or the display device connected to the source device). For example, when the size of the DRM content display region is larger than a threshold value, the black image is set as the region corresponding to the DRM content, and the image data is transmitted from the sink device to the source device. On the other hand, when the size of the DRM content display region is smaller than the threshold value, the image data of the DRM content is transmitted from the sink device to the source device. In other words, the sink device can control whether the sink device transfers all of the received DRM content or some of the received DRM content to the source device based on the size of the DRM content display region.

Example in which Manipulation Image is Displayed on Image Based on DRM Content

The above description has been made in connection with the example in which the sink device causes the combined image in which the DRM content is combined with the display screen to be displayed on the source device. Here, a manipulation image used for the user manipulation may be displayed on the display screen displayed on the source device. For example, the manipulation image is an image (for example, an icon or a cursor) moving on the display screen according to the user manipulation using a manipulation member (for example, a keyboard, a mouse, or a touch panel). For example, the manipulation image is also referred to as a "manipulation mark," "pointing information," "manipulation information," or the like.

For example, the manipulation image may move on the image based on the DRM content. In this case, it is important to cause the manipulation image displayed on the source device to be displayed on the sink device. In this regard, an example in which the manipulation image displayed on the source device is appropriately displayed on the sink device will be described below.

Communication Example of Image Data

Figure 26:
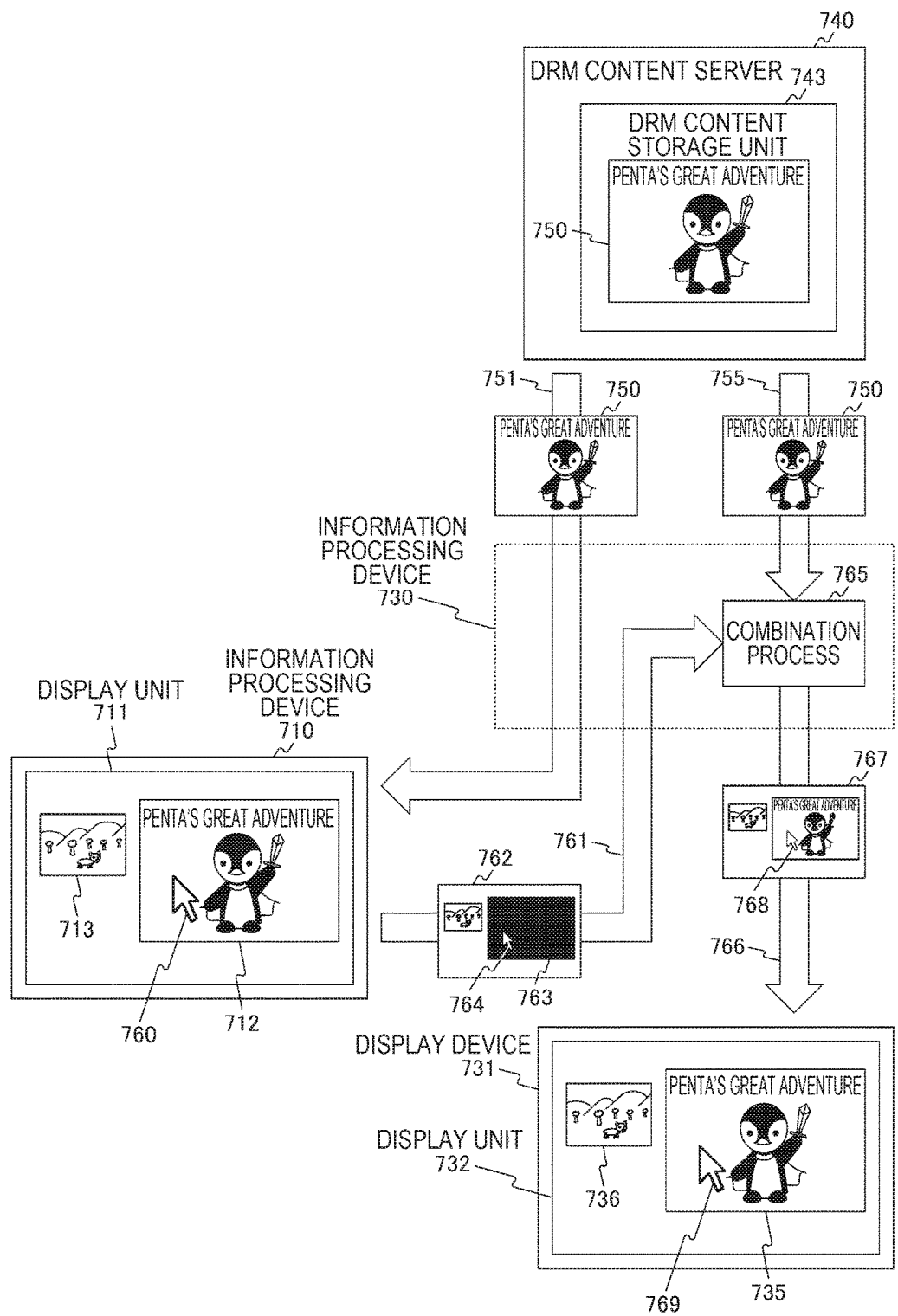
FIG. 26 is a diagram schematically illustrating an example of the flow of image data interchanged between devices included in the communication system 700 according to the second embodiment of the present technology.

FIG. 26 is a diagram schematically illustrating an example of the flow of the image data interchanged between the devices included in the communication system 700 according to the second embodiment of the present technology. The example illustrated in FIG. 26 is a modified example of FIG. 18, and thus parts that are common to those of FIG. 18 are denoted by the same reference numerals, and description thereof is omitted.

FIG. 26 illustrates an example in which a manipulation image 760 is displayed to be superimposed on the image (the image based on the DRM content 750) displayed on the region 712 of the display unit 711.

In this case, as indicated by an arrow 761, the control unit of the information processing device 710 transmits the entire display screen 762 displayed on the display unit 711 to the information processing device 730 according to Wi-Fi Certified Miracast. Here, the control unit of the information processing device 710 transmits the display screen 762 without setting an image of a specific color 763 as a region 764 of the manipulation image 760 in the display region (the region 712) of the DRM content 750 in the display screen 762.

The control unit of the information processing device 730 performs a combination process 765 of combining the DRM content 750 acquired from the DRM content server 740 with the display screen 762 transmitted from the information processing device 710. In the combination process 765, the control unit of the information processing device 730 performs the combination process of combining the image based on the DRM content 750 with the region of the image of the specific color 763 in the display screen 762 transmitted from the information processing device 710. In this case, the control unit of the information processing device 730 performs the combination process of combining the region 764 of the manipulation image 760 in the region of the image of the specific color 763 to be superimposed on the image based on the DRM content 750.

Then, as indicated by an arrow 766, the control unit of the information processing device 730 causes a combined image 767 generated by the combination process 765 to be transmitted to the display device 731 and displayed on the display unit 732. For example, the image based on the DRM content 750 is displayed on the region 735 of the display unit 732, and a manipulation image 769 is displayed to be superimposed on the image based on the DRM content 750.

As a result, the manipulation image can be appropriately displayed on both the source device and the sink device.

FIG. 26 illustrates the example in which the image of the specific color is not set as the region of the manipulation image, and the region of the manipulation image is transmitted. However, information (manipulation image information) specifying the region of the manipulation image in the display screen and a display form (for example, a position, a shape, and a color) of the manipulation image may be transmitted from the source device to the sink device. In this case, the sink device can display the manipulation image based on the manipulation image information. In other words, the control unit of the information processing device 730 can display the manipulation image to be superimposed on the combined image based on the manipulation image information related to the manipulation image displayed on the non-display region included in the command information.

3. Third Embodiment

In a third embodiment of the present technology, an example in which the source device accesses the access point and initiates the group authentication between the source device and the sink device will be described. In the third embodiment of the present technology, an example in which the DRM content is displayed through the connection between the source device and the sink device via the access point and the direct connection between the source device and the sink device will be described.

Configuration Example of Communication System

Figure 27:
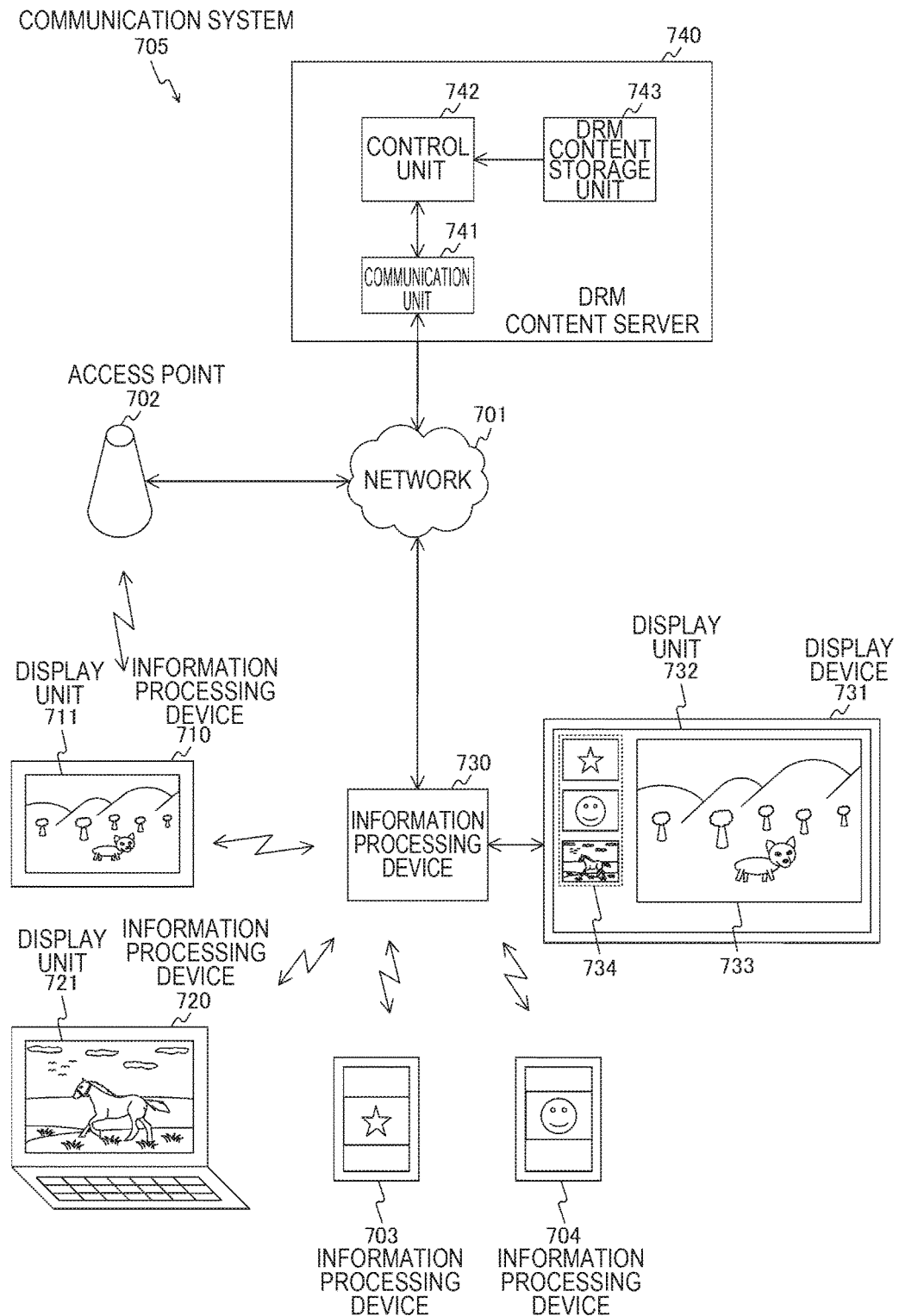
FIG. 27 is a diagram illustrating a system configuration example of a communication system 705 according to the third embodiment of the present technology.

FIG. 27 is a diagram illustrating a system configuration example of a communication system 705 according to the third embodiment of the present technology.

The communication system 705 includes a network 701, an access point 702, information processing devices 703, 704, 710, 720, and 730, a display device 731, and a DRM content server 740. The communication system 705 is a modified example of the communication system 700 illustrated in FIG. 17, and thus parts that are common to the communication system 700 are denoted by the same reference numerals, and part of description thereof is omitted.

The access point 702 is an access point of a wireless LAN (for example, Wi-Fi). For example, the access point 702 has a function of an infrastructure mode of an IEEE802.11 standard. The access point 702 is connected to one or more information processing devices (for example, a transmission side information processing device (source device) and a reception side information processing device (sink device)).

The access point 702 can be connected with the information processing device 730 via a wired line (for example, Ethernet (registered trademark)). For example, the access point 702 can be connected with the information processing device 730 via the network 701. The access point 702 may be connected with an internal bus of the information processing device 730 and perform a process. Examples of the internal bus of the information processing device 730 include a Universal Serial Bus (USB), Peripheral Component Interconnect (PCI), and PCI Express. The connection between the access point 702 and the information processing device 730 may be a wired connection or a wireless connection (for example, the wireless LAN). For example, in the case of the wireless LAN, the network 701 is connected to the information processing device 730, and the information processing device 730 has to determine whether a transmission/reception process is a transmission/reception process with the access point 702 or a transmission/reception process with the information processing device 710.

In the third embodiment of the present technology, an example in which the access point 702 and the information processing devices 703, 704, 710, and 720 are connected using the wireless LAN (for example, the wireless LAN corresponding to IEEE 802.11 a/b/g/n/ac/ad) will be described. An example in which the access point 702 and the information processing device 730 are connected via an Ethernet line will be described.

The information processing device 710 is an information processing device that can be connected with the access point 702 in the infrastructure mode.

Here, a connection example in which the information processing device 710 establishes the connection with the access point 702 in the infrastructure mode will be described. The information processing device 710 transmits a connection request signal to the access point 702 in response to a beacon signal transmitted from the access point 702. As described above, the information processing device 710 starts an operation (a connection establishment operation) for establishing the connection with the access point 702 by transmitting the connection request signal.

The connection establishment operation is an operation of linking a level of a layer 2. For example, a connection authentication process of determining whether or not the information processing device 710 is connected as an application is necessary in addition to password authentication using packet identification (PID) performed in the wireless LAN.

The information processing device 710 may be a standby device that establishes the connection with the access point 702 and interchanges various kinds of information with the information processing device 730 via the access point 702. Further, when the information processing device 710 is used only as the standby device, the information processing device 710 may not have a protocol capable of enabling image communication.

The information processing device 710 has a concurrent function (a time division concurrent function or a simultaneous use concurrent function) for establishing connections with both of the access point 702 and the information processing device 730. When the information processing device 710 has one type of physical layer, the time division concurrent function is implemented by accessing two frequencies in a time division manner in one type of physical layer. Further, when the information processing device 710 has two types of physical layers, it is possible to simultaneously access different information processing devices through two types of physical layers. Accordingly, the simultaneous use concurrent function is implemented.

When the information processing device 710 has the concurrent function as described above, the information processing device 710 performs a time division or simultaneous connection to both the access point and the sink device without performing disconnection and switching of the access point and the sink device.

Here, in the third embodiment of the present technology, an example in which the information processing device 710 is directly connected with the DRM content server 740 without intervention of the information processing device 730 will be described.

The information processing device 730 has a communication function for establishing a connection with the access point 702, the information processing devices 703, 704, 710, and 720, or the DRM content server 740. The information processing device 730 has a function of establishing the connection with the access point 702, the information processing devices 703, 704, 710, and 720, and the DRM content server 740 and controlling all protocols. The information processing device 730 has a communication function of establishing a connection with a private LAN or a global LAN.

Here, it is important to stabilize the connection between the information processing device 730 and the information processing devices 703, 704, 710, and 720. Thus, it is desirable to use a frequency different from a radio frequency used by the access point 702 for the connection between the information processing device 730 and the information processing devices 703, 704, 710, and 720. In the third embodiment of the present technology, an example in which a frequency band such as 2.4 GHz, 5 GHz, or 60 GHz of IEEE 802.11 a/b/g/n/ac/ad is used will be described. Here, any other wireless standard or any other frequency band may be used.

The DRM content server 740 may be equipped with a protocol for establishing a connection with the access point 702 and connected with the information processing device 730 via the access point 702.

Here, the communication mode between the source device and the sink device will be described. In the third embodiment of the present technology, in the state in which the source device is connected with the sink device (when participation in the group is permitted), a communication mode of either of a standby mode and the image transmission mode is assumed to be set in the source device.

The standby mode is a communication mode in which the connection state between the source device and the sink device via the access point is maintained with no image transmission from the source device to the sink device. In other words, the standby mode is a mode set when the source device is recognized as a network participant by the sink device.

As described above, in the image transmission mode, the image transmission from the source device to the sink device is assumed to be allowed, but in the standby mode, the image transmission from the source device to the sink device is assumed not to be allowed. However, even in the standby mode, transmission from the source device to the sink device is assumed to be allowed, for example, when there is simple messaging.

Further, when a plurality of source devices are connected to one sink device, in each source device, the communication mode is assumed to be sequentially switched, for example, as in the standby mode→the image transmission mode (the peripheral channel)→the image transmission mode (the middle channel)→the standby mode . . . .

Switching Example of Communication Mode of Source Device

Here, a switching method when the communication modes (the standby mode and the image transmission mode) of the source device are switched will be described.

For example, the following (B1) and (B2) can be used as triggers for switching of the communication modes of the source device:

(B1) switching using the source device (for example, active switching according to a manipulation of the user using the source device); and (B2) switching using the sink device (for example, switching according to a manipulation of the user using the sink device).

The manipulation (the switching manipulation) of the user in each device is, for example, the manipulation of the user using the manipulation reception unit (for example, a manipulation member or a touch panel) with which each device is equipped or the manipulation of the user using the user information acquisition unit (for example, a detection unit that detects a gesture) with which each device is equipped.

In (B1), for example, a manipulation input of an application or a manipulation member installed in the source device in advance can be used as a switching trigger. For example, when the switching manipulation is performed in the source device, a command related to switching of the communication mode is transmitted to the sink device (the information processing device 730). When the command is received, the sink device (the information processing device 730) performs control such that the band of the source device that has transmitted the command is increased or decreased while performing control for the other bands.

In (B2), for example, the manipulation of the user in the sink device (the information processing device 730) can be used as the switching trigger. For example, when the switching manipulation of the source device is performed in the sink device (the information processing device 730), control is performed such that the band of the source device in which the switching manipulation has been performed is increased or decreased while performing control for the other bands.

Switching Example of Communication Mode

Figure 28:
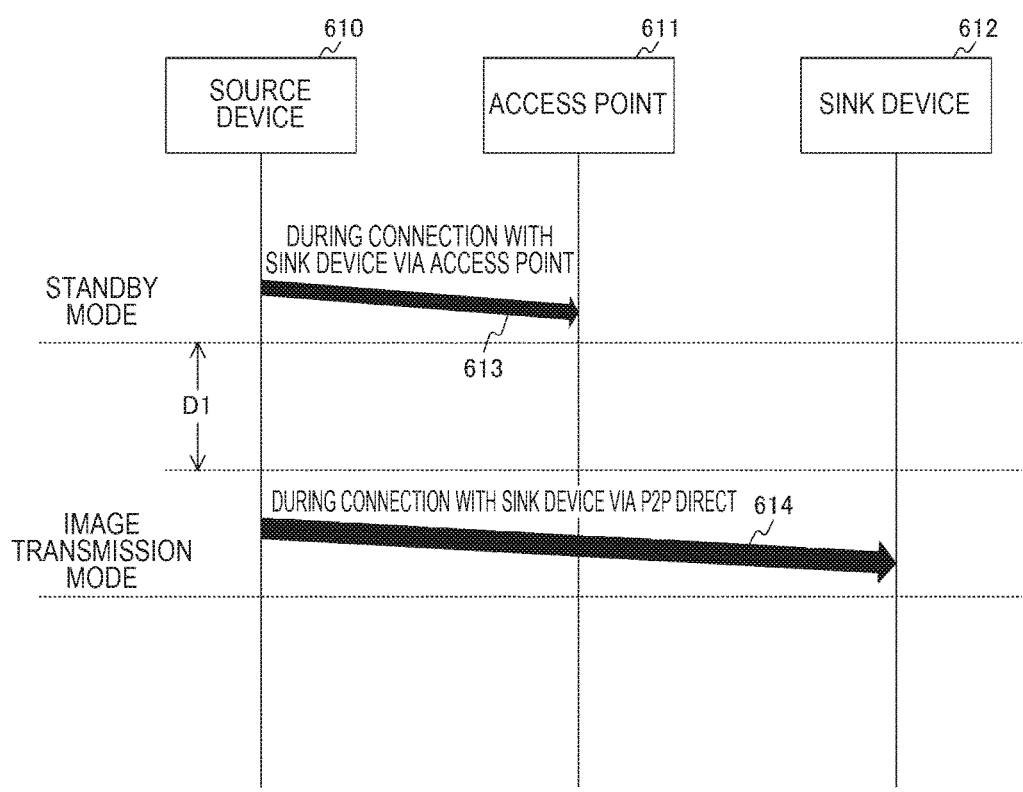
FIG. 28 is a diagram illustrating a switching example of a communication mode between a source device and a sink device serving as a basis for the present technology.

FIG. 28 is a diagram illustrating a switching example of the communication mode between the source device and the sink device serving as the basis for the present technology.

In the third embodiment of the present technology, a connection scheme of indirectly connecting a source device 610 with a sink device 612 via an access point 611 is employed in the standby mode as described above. In the image transmission mode, a connection scheme of directly connecting the source device 610 with the sink device 612 without intervention of the access point 611 is employed.

For example, switching from a connection (613) in the standby mode to a connection (614) in the image transmission mode is assumed to be performed. In other words, switching from the standby mode (613) in which the connection is established via the access point 611 to the image transmission mode (614) in which the connection is established without intervention of the access point 611 is assumed to be performed.

When the switching is performed as described above, it is necessary to perform Wi-Fi direct control (P2P Device Discovery, P2P Service Discovery, and GO Negotiation), 4-way handshake (Handshake) for performing the security authentication of the wireless LAN, dynamic host configuration protocol (DHCP) access for acquiring an Internet protocol (IP) address, interchange of a port setting of a real time streaming protocol (RTSP), or the like, which are illustrated in FIG. 19. Thus, when switching from the connection (613) in the standby mode to the connection (614) in the image transmission mode is performed, a connection period D1 of a time of several seconds occurs.

Here, the access point 611 and the source device 610 are assumed to be in the same group authentication and the source device 610 and the sink device 612 are assumed to be in the same group authentication. In this case, the security authentication is performed between the access point 611 and the source device 610. For this reason, there is assumed to be no problem even if a set value between the access point 611 and the source device 610 is used for the connection process between the source device 610 and the sink device 612.

In this regard, in the third embodiment of the present technology, an example in which the security authentication between the source device and the sink device is omitted, and more seamless connection switching is performed is described. For example, it is possible to divert a process such as IP acquisition of a high-bandwidth digital content protection system (HDCP) and a port setting of real-time transport protocol (RTP). Thus, even when switching to a communication mode having a different connection scheme (switching from the standby mode to the image transmission mode and switching from the image transmission mode to the standby mode) is performed, a rapid connection process can be performed. Thus, it is possible to cause the user to feel as if the connection were continuously maintained.

Further, when the source device and the sink device support a tunneled direct link setup (TDLS) function, a TDLS protocol may be used.

Communication Example of Image Data

Figure 29:
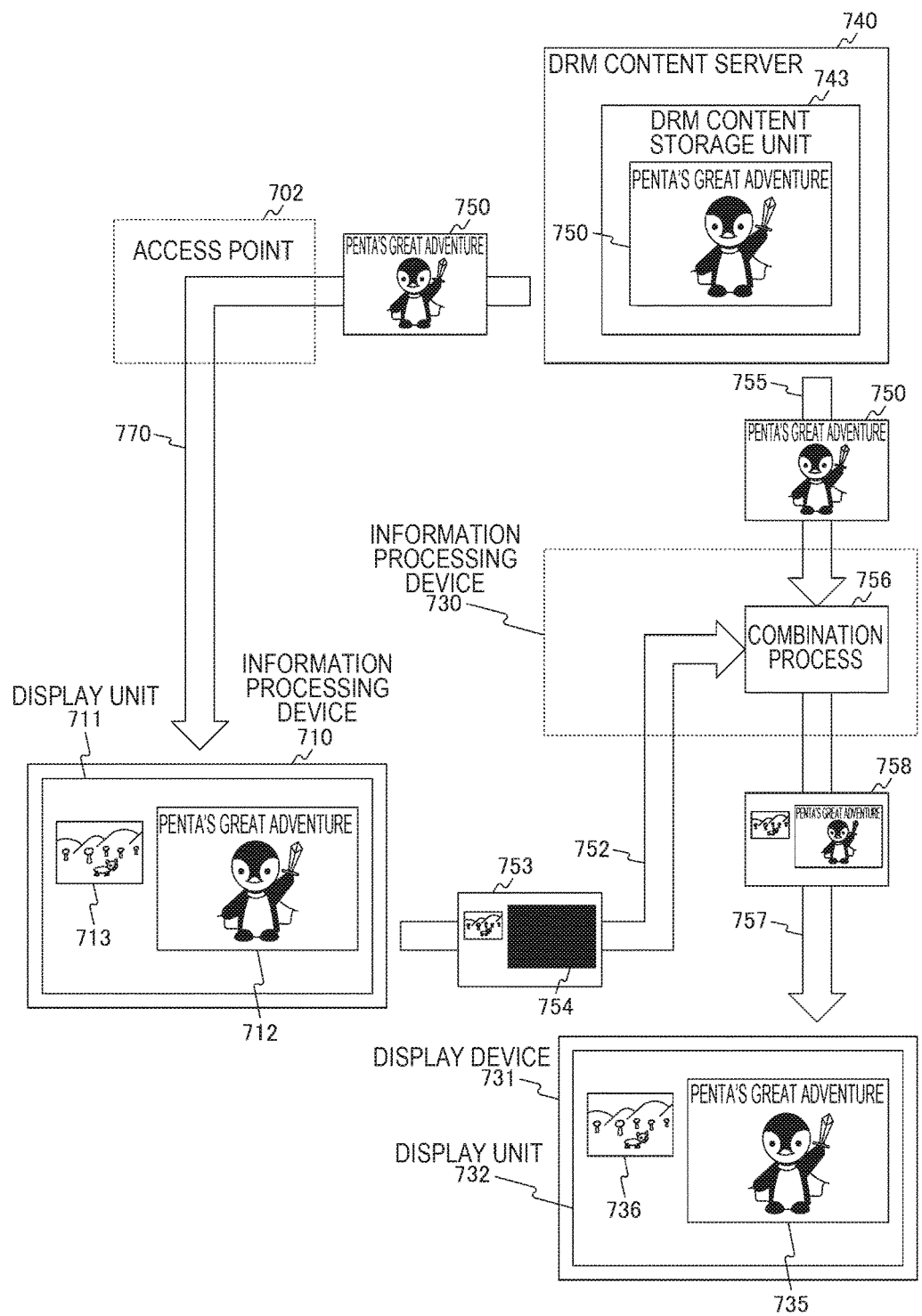
FIG. 29 is a diagram schematically illustrating an example of the flow of image data interchanged between devices included in the communication system 705 according to the third embodiment of the present technology.

FIG. 29 is a diagram schematically illustrating an example of the flow of the image data interchanged between the devices included in the communication system 705 according to the third embodiment of the present technology. The example illustrated in FIG. 29 is a modified example of FIG. 18, and thus parts that are common to those of FIG. 18 are denoted by the same reference numerals, and description thereof is omitted.

FIG. 29 illustrates an example in which the information processing device 710 acquires the DRM content 750 from the DRM content server 740 via the access point 702.

For example, as indicated by an arrow 770, the control unit of the information processing device 710 acquires the DRM content 750 from the DRM content server 740 via the access point 702. Then, the control unit of the information processing device 710 causes the acquired DRM content 750 to be displayed on the display unit 711.

The same applies when the manipulation image 760 is displayed to be superimposed on the image (the image based on the DRM content 750) displayed on the region 712 of the display unit 711 as illustrated in FIG. 26.

Communication Example

Figure 30:
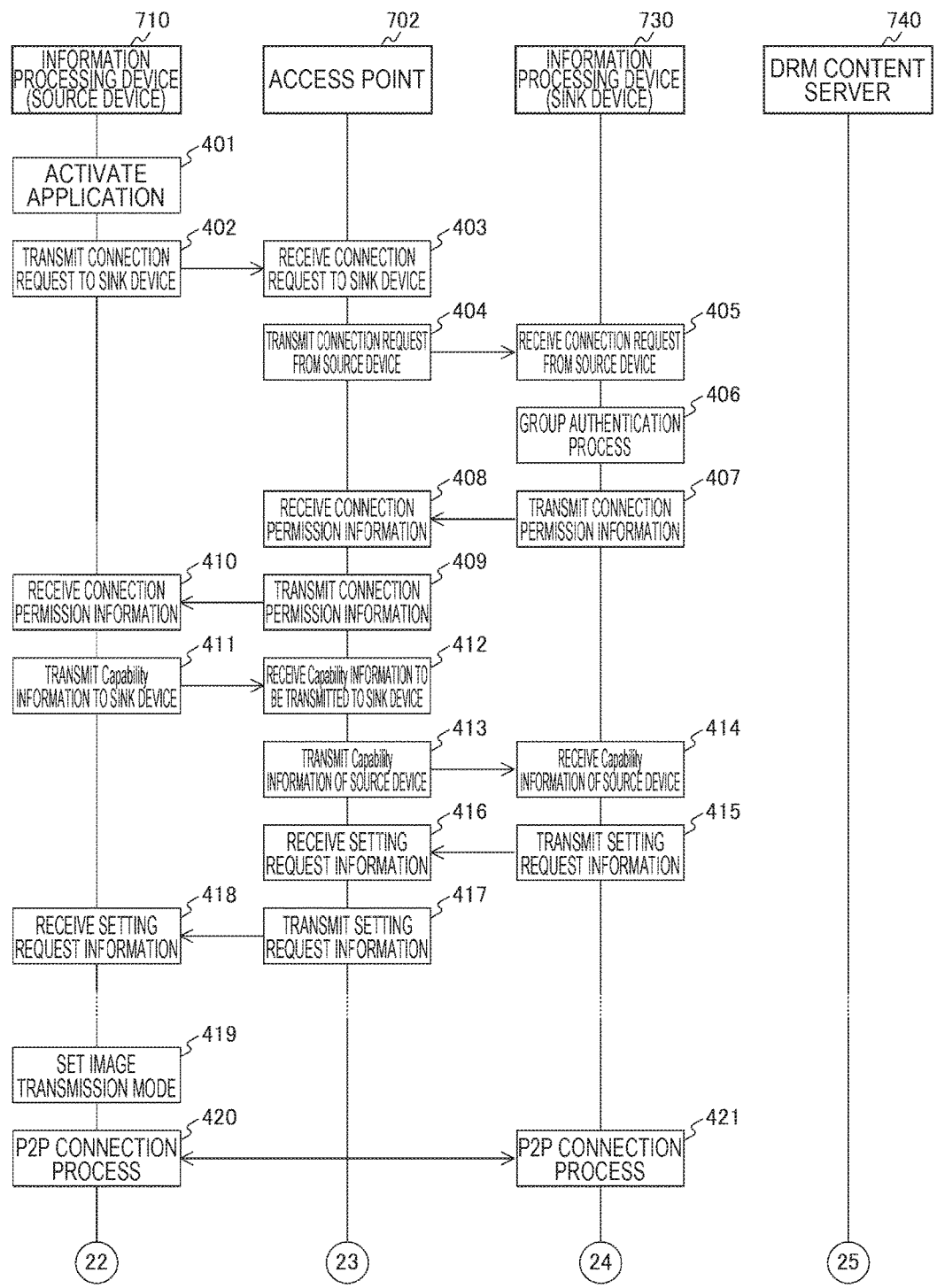
FIG. 30 is a sequence chart illustrating a communication process example between devices included in the communication system 705 according to the third embodiment of the present technology.
Figure 31:
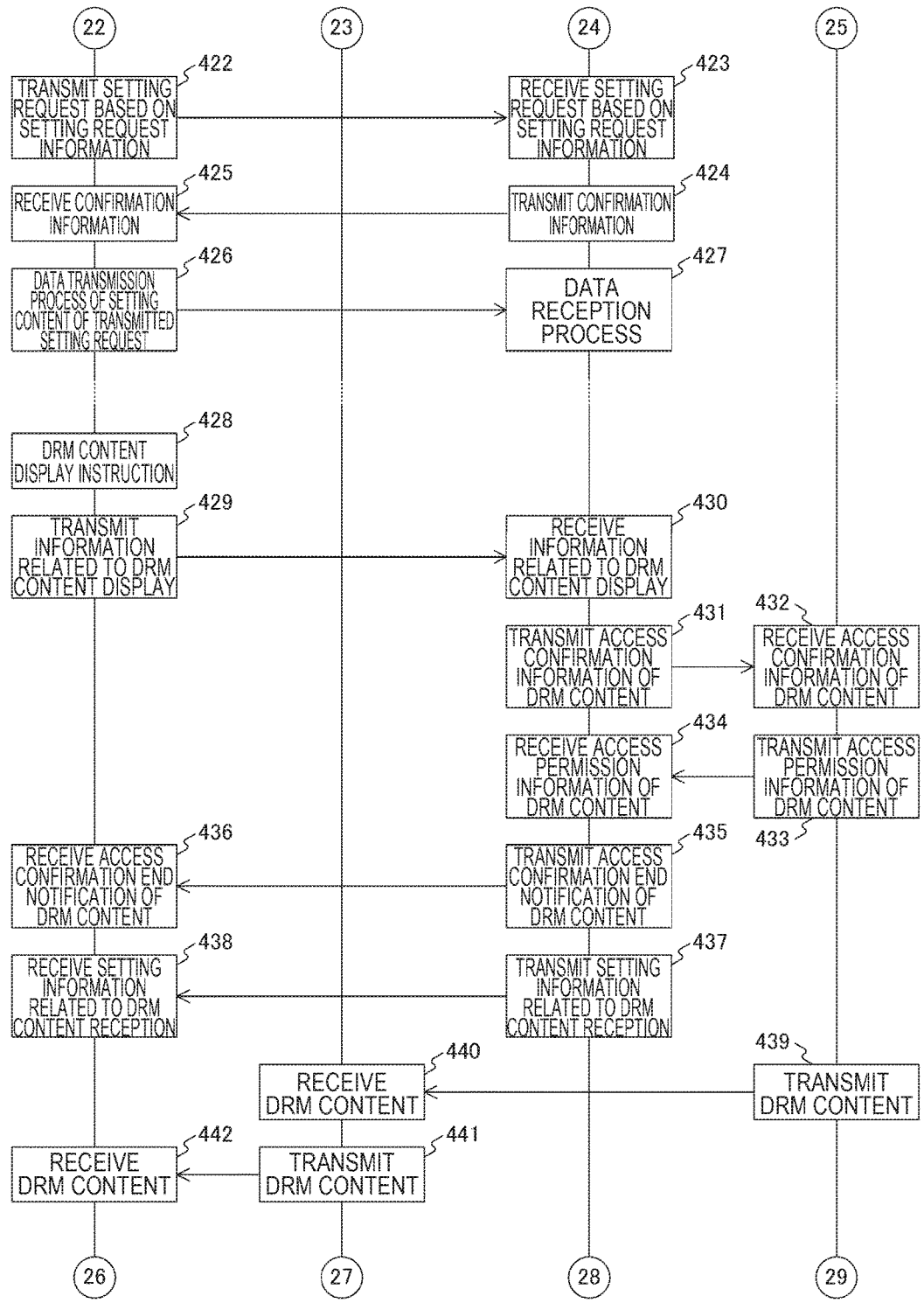
FIG. 31 is a sequence chart illustrating a communication process example between devices included in the communication system 705 according to the third embodiment of the present technology.
Figure 32:
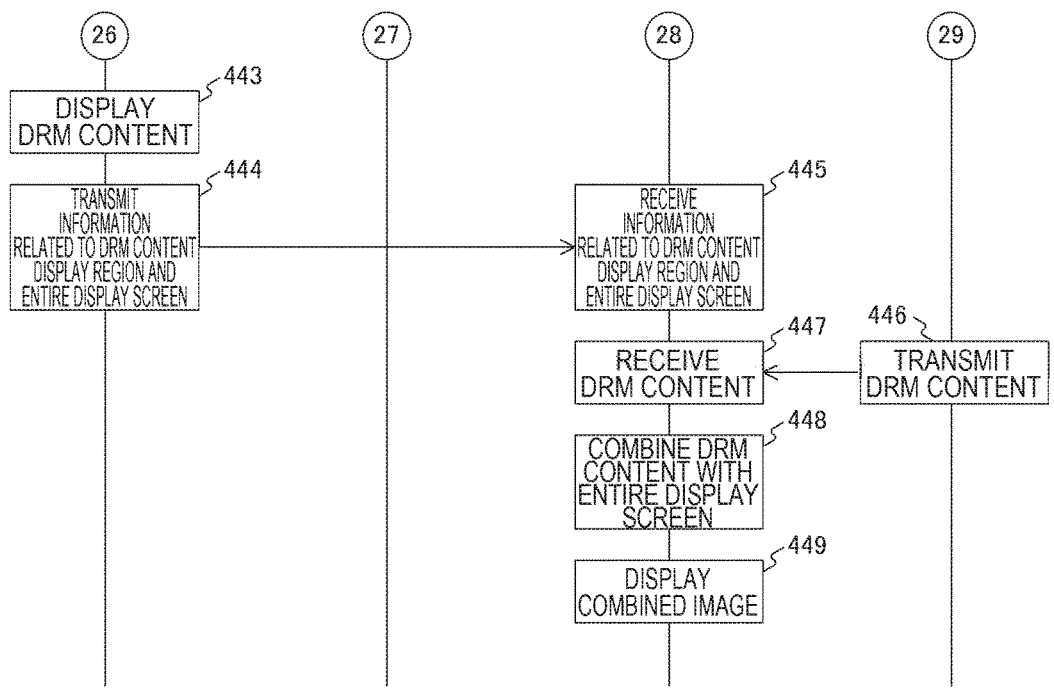
FIG. 32 is a sequence chart illustrating a communication process example between devices included in the communication system 705 according to the third embodiment of the present technology.

FIGS. 30 to 32 are sequence charts illustrating a communication process example between the respective devices included in the communication system 705 according to the third embodiment of the present technology. FIGS. 30 to 32 illustrate a communication process example among the information processing device (the source device) 710, the access point 702, the information processing device (the sink device) 730, and the DRM content server 740.

In the example of FIGS. 30 to 32, the information processing device (the sink device) 730 functions as the group authentication server. In other words, the information processing device (the sink device) 730 is assumed to have a group authentication function.

FIGS. 30 to 32 are an example in which the communication process example illustrated in FIGS. 20 and 21 is partially modified, and thus part of description of some parts that are common to FIGS. 20 and 21 is omitted.

First, the information processing device 710 activates an application (an application installed in the information processing device 710 in advance) for performing communication with the information processing device 730 (401). The activation of the application is performed, for example, according to a manipulation of the user (for example, a manipulation of pressing an application button).

Here, in the example of FIGS. 30 and 32, the source device is connected directly to the access point and then starts each process as a default. In other words, the information processing device 710 activates an application that is installed in advance, and transmits a connection request to the sink device (the information processing device 730) via a specific access point (the access point 702).

Specifically, after establishing the connection with the access point 702, the information processing device 710 performs the device discovery (corresponding to the Device Discovery (615) illustrated in FIG. 19), and causes a connectable sink device to be displayed on the display unit 711.

Here, for example, a method of receiving a message such as a Probe Request and performing the device discovery so that the WiFi direct protocol can be executed via the access point 702 may be used as the device discovery method. Further, for example, a method of interchanging a device service type represented by a universal plug and play (UPnP) between stations connected to the access point 702 and performing the device discovery may be used.

A plurality of sink devices corresponding to the activated application may also be discovered through the device discovery process. In this case, a selection screen for selecting a desired sink device from a plurality of discovered sink devices may be displayed on the display unit of the source device, and the desired sink device may be selected on the selection screen by the manipulation of the user. A device closest to the source device among a plurality of discovered sink devices may be automatically selected and connected. When the closest device is automatically selected, for example, the position information acquired by the respective devices may be used.

As described above, the information processing device 710 activates an application, and selects the sink device (401). FIGS. 30 and 32 illustrate an example in which the information processing device 730 is selected.

When the sink device (the information processing device 730) is selected as described above (401), the control unit (corresponding to the control unit 240 illustrated in FIG. 2) of the information processing device 710 transmits the connection request to the sink device (the information processing device 730) via the access point 702 (402 to 405). The connection request includes, for example, identification information (for example, the terminal identification information 391 illustrated in FIG. 4) identifying the information processing device 710 and identification information (application information) identifying an application to be activated.

Upon receiving the connection request from the information processing device 710 (405), the control unit (corresponding to the control unit 370 illustrated in FIG. 3) of the information processing device 730 performs a group authentication process (406). In the group authentication process, it is determined whether or not the information processing device 710 participates in the group operated by the application activated by the information processing device 710 (406). In other words, the control unit of the information processing device 730 performs the group authentication process for determining whether or not a connection for operating the application activated by the information processing device 710 is permitted to the information processing device 710 (406).

For example, in the group authentication process, it is determined whether or not the manipulation of the user for giving the permission to the information processing device 710 has been performed in any one of the source device and the sink device that belong to the same group and are already in the connection state. Then, a determination for permitting the information processing device 710 to participate in the group can be performed under the condition that the manipulation of the user for giving the permission to the information processing device 710 have been performed in any one of the devices (the source device and the sink device).

For example, a display screen (for example, pop-up) for performing the manipulation of the user for giving the permission to the information processing device 710 is displayed on the display unit of at least one of the devices (the source device and the sink device). Then, when the manipulation of the user for giving the permission to the information processing device 710 is performed on display screen, the control unit of the information processing device 730 determines to permit the information processing device 710 to participate in the group (406).

Further, for example, the group authentication process may be performed based on whether or not the information processing device is registered in the sink device. For example, the control unit of the information processing device 730 determines that the information processing device whose terminal identification information is registered in the information processing device 730 is permitted to participate in the group (406). However, in this case, the control unit of the information processing device 730 determines that the information processing device is permitted to participate in the group as long as it is within a previously set time (406).

When the information processing device 710 is determined to be permitted to participate in the group in the group authentication process (406), the control unit of the information processing device 730 transmits connection permission information to the information processing device 710 via the access point 701 (407 to 410). Here, the connection permission information is information indicating that the information processing device 710 is permitted to participate in the group operated by the application activated by the information processing device 710.

Further, when the information processing device 710 is determined not to be permitted to participate in the group in the group authentication process (authentication is not permitted) (406), the control unit of the information processing device 730 transmits connection non-permission information to the information processing device 710 via the access point 702. Here, the connection non-permission information is information indicating that the information processing device 710 is not permitted to participate in the group operated by the application activated by the information processing device 710. When the information processing device 710 receives the connection non-permission information, the operation of the data transmission process ends.

Upon receiving the connection permission information from the information processing device 730 (410), the control unit of the information processing device 710 transmits the capability information related to the information processing device 710 to the information processing device 730 via the access point 702 (411 to 414). The capability information is capability information for performing Wi-Fi CERTIFIED Miracast communication with the information processing device 730. The capability information includes information for performing direct P2P connection with the information processing device 730.

Upon receiving the capability information from the information processing device 710 (414), the control unit of the information processing device 730 transmits setting request information to the information processing device 710 via the access point 702 (415 to 418). The setting request information is information for requesting a setting for performing the image transmission according to the Wi-Fi CERTIFIED Miracast standard.

Here, the information processing device 730 performs band control and display screen control for the source devices connected with the information processing device 730. For this reason, it is necessary to request a newly connected information processing device 710 to transmit a setting of a parameter in which group sharing is considered based on a relation with other source devices. In this regard, after the information processing device 710 is permitted to participate in the group, the information processing device 730 transmits the setting request information related to the information processing device 710 based on each piece of information related to each of the source devices connected with the information processing device 730 (415 to 418).

Further, as described above, in the information processing device 710, the standby mode is initially set based on an instruction given from the information processing device 730. In other words, when the setting request information is received from the information processing device 730 (418), in the information processing device 710, the standby mode is set as an initial state.

The communication mode in the information processing device 710 is sequentially switched based on the instruction from the information processing device 730. For example, when only the information processing device 710 is connected to the information processing device 730, the communication mode is sequentially switched in the order of the standby mode→the image transmission mode→the standby mode→the image transmission mode . . . . Further, when a plurality of source devices are connected with the information processing device 730, the communication mode is sequentially switched in the order of the standby mode→the image transmission mode (the peripheral channel)→the image transmission mode (the middle channel)→the standby mode . . . .

Here, the communication mode of the information processing device 710 is assumed to be switched according to the switching method of any one of (B1) and (B2) described above. Here, an example in which the communication mode of the information processing device 710 is switched from the standby mode to the image transmission mode is described.

When the image transmission mode is set (419), then, the control unit of the information processing device 710 maintains the connection with the access point 702, and performs the P2P connection process for performing direct connection with the information processing device 730 (420 and 421). After the P2P connection process is completed (420 and 421), the control unit of the information processing device 710 transmits the connection request to the information processing device 730 based on the setting request information received from the information processing device 730 (422 and 423). In other words, the control unit of the information processing device 710 transmits the connection request to the information processing device 730 based on the setting request information received from the information processing device 730 (422 and 423). The connection request is a connection request related to a connection setting of up to a layer 3.

Upon receiving the connection request (423), the control unit of the information processing device 730 transmits confirmation information indicating permission for reception of an image corresponding to the connection request to the information processing device 710 (426 and 427). When the confirmation information has been received (425), the control unit of the information processing device 710 starts the direct P2P connection with the information processing device 730 (426 and 427). Then, the control unit of the information processing device 710 performs the negotiation of the image parameter and the audio parameter with the information processing device 730 based on the connection request corresponding to the received confirmation information, and transmits the image data.

As described above, the information processing device 710 continues in the state in which it is possible to access the DRM content via the access point 702. The information processing device 710 performs P2P direct communication with the information processing device 730 to interchange a Wi-Fi Certified Miracast-related command.

Here, the DRM content display instruction manipulation for displaying the DRM content is assumed to be performed (428). In this case, among processes (428 to 449), the processes other than the processes (439 to 442) of acquiring the DRM content through the information processing device 710 correspond to processes (652 to 673) illustrated in FIGS. 20 and 21.

In other words, when the information processing device 710 acquires the DRM content, the DRM content is received and acquired from the DRM content server 740 via the access point 702 (439 to 442). In other words, the control unit of the information processing device 710 receives and acquires the DRM content from the DRM content server 740 via the access point 702 (439 to 442).

Operation Example of Information Processing Device (Source Device)

Figure 33:
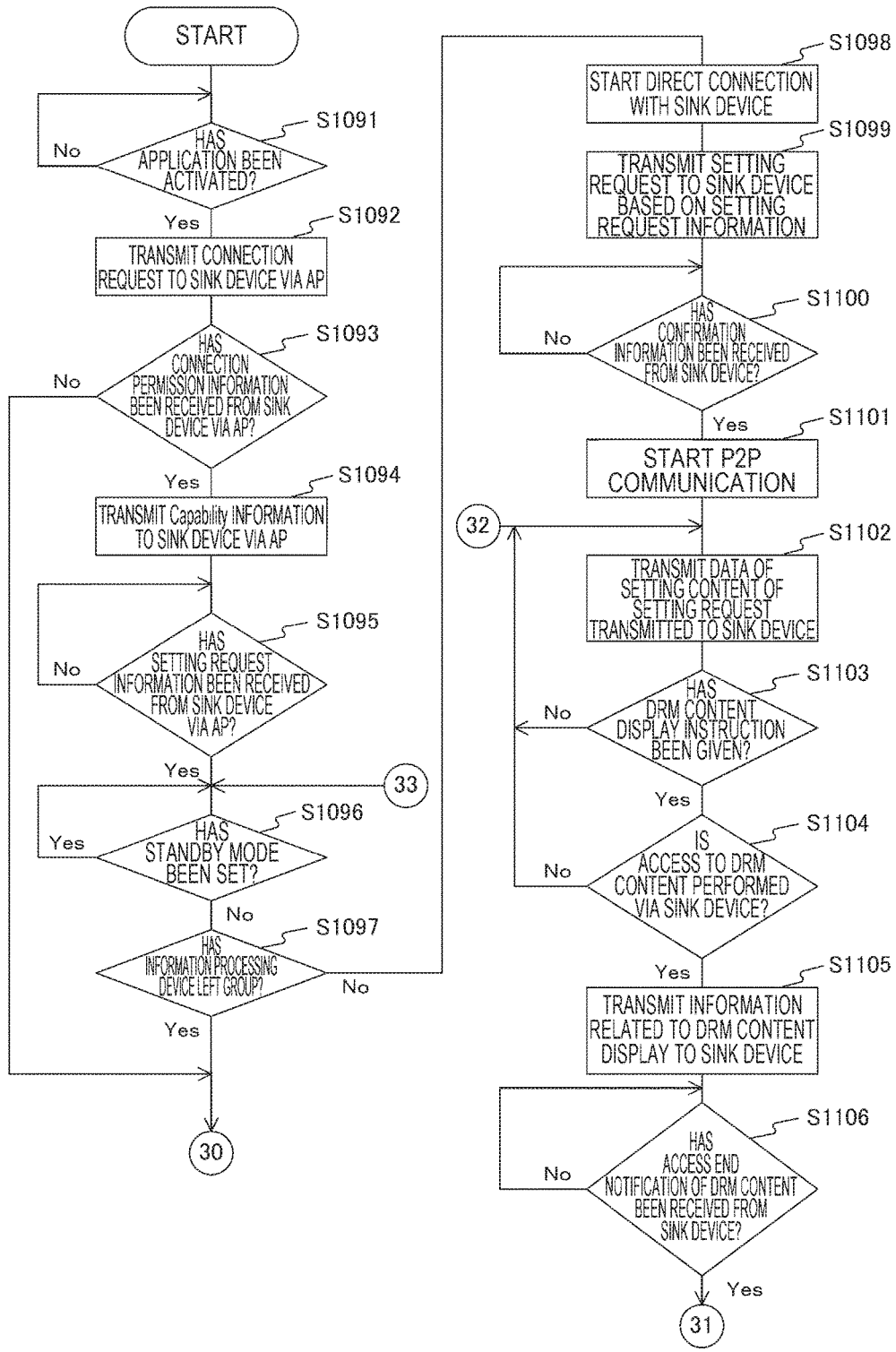
FIG. 33 is a flowchart illustrating an example of a processing procedure of a data transmission process performed by the information processing device 710 according to the third embodiment of the present technology.
Figure 34:
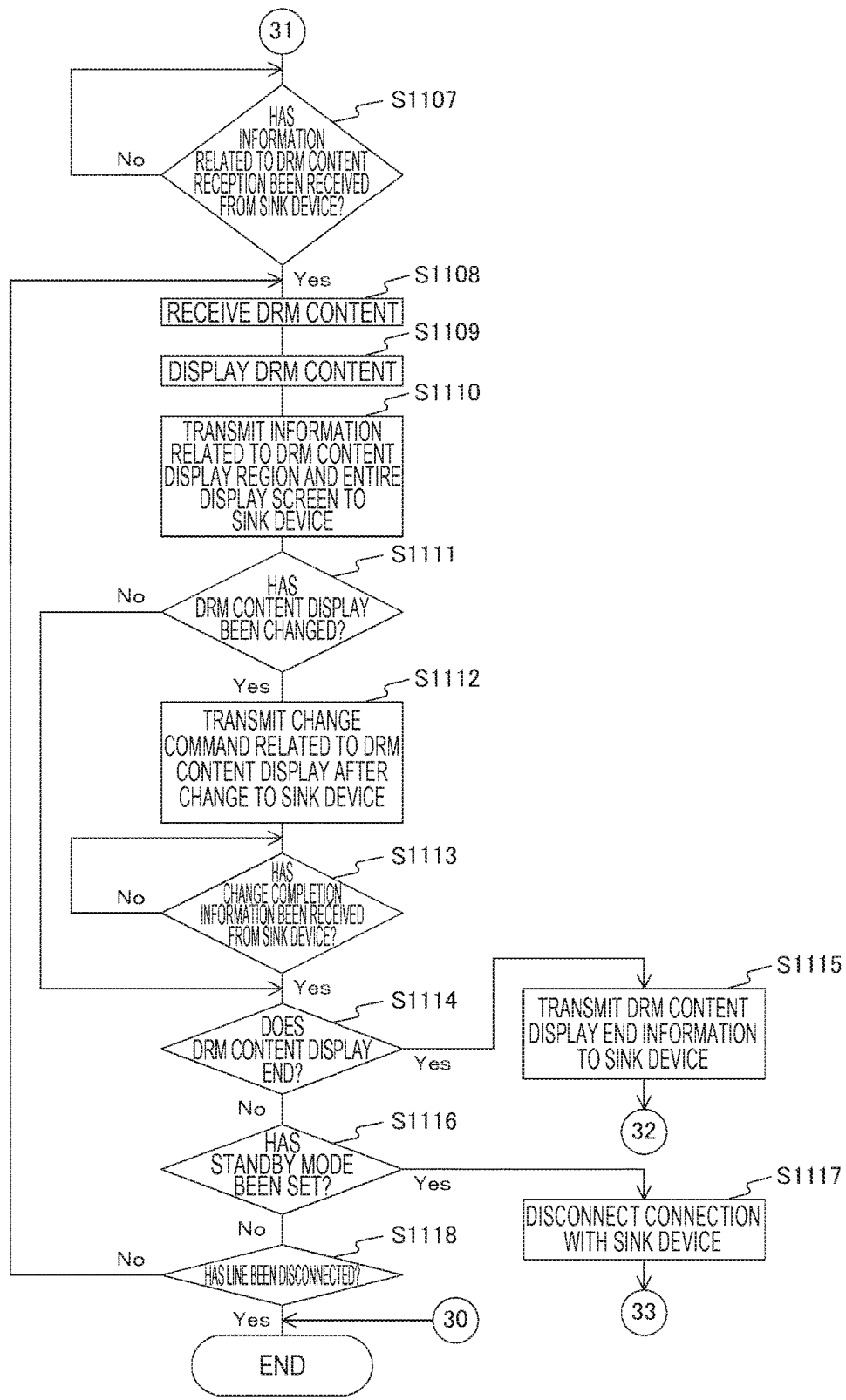
FIG. 34 is a flowchart illustrating an example of a processing procedure of a data transmission process performed by the information processing device 710 according to the third embodiment of the present technology.

FIGS. 33 and 34 are flowcharts illustrating an example of a processing procedure of a data transmission process performed by the information processing device 710 according to the second embodiment of the present technology. FIGS. 33 and 34 illustrate an example in which the source device (the information processing device 710) is directly connected to the access point and then starts each process as default. In other words, the information processing device 710 activates an application that is installed in advance, and transmits the connection request to the sink device via a specific access point (the access point 702). Further, FIGS. 33 and 34 illustrate an example in which the source device (the information processing device 710) is connected to the information processing device 730 serving as the sink device and connected to the access point 702 serving as a specific access point.

First, the information processing device 710 activates an application for performing communication with the sink device (the information processing device 730) (step S1091). After the activation, the sink device (the information processing device 730) serving as a connection target is selected (step S1091).

Then, the control unit of the information processing device 710 transmits the connection request to the information processing device 730 via the access point 702 (AP) (step S1092). Then, the control unit of the information processing device 710 determines whether or not the connection permission information has been received from the information processing device 730 via the access point 701 (step S1093). When the connection permission information has not been received from the information processing device 730 (step S1093), the operation of the data transmission process ends. In this case, the operation of the data transmission process may end when the connection permission information has not been received within a predetermined period of time.

When the connection permission information has been received from the information processing device 730 (step S1093), the control unit of the information processing device 710 transmits the capability information of the information processing device 710 to the information processing device 730 via the access point 702 (step S1094).

Then, the control unit of the information processing device 710 determines whether or not the setting request information has been received from the information processing device 730 via the access point 702 (step S1095). When the setting request information has not been received (step S1095), it is continuously monitored.

When the setting request information has been received (step S1095), in the information processing device 710, the standby mode is set as the initial state. Then, the control unit of the information processing device 710 determines whether or not the standby mode has been set (step S1096). Then, when the standby mode has been set in the information processing device 710 (step S1096), it is continuously monitored.

When the standby mode has not been set (when the image transmission mode has been set) (step S1096), the control unit of the information processing device 710 determines whether or not the information processing device 710 has left the group (step S1097). Here, when the information processing device 710 has left the group, for example, when the information processing device 710 has moved to a place that neither the radio waves of the access point nor the sink device reaches, a manipulation of the user for leaving the group may be performed. This manipulation of the user may be, for example, a manipulation of pressing a leaving button (for example, a manipulation of pressing the manipulation member or a manipulation of pressing the touch panel). The manipulation of the user is assumed to be performed in any one of the information processing device 710, another source device, and the sink device.

Then, when the information processing device 710 has left the group (step S1097), the operation of the data transmission process ends. When the information processing device 710 has not left the group (step S1097), the control unit of the information processing device 710 maintains the connection with the access point 702, and performs the P2P connection process for performing direct connection with the information processing device 730 (step S1098).

When the P2P connection process has been completed (step S1098), the control unit of the information processing device 710 transmits the setting request to the information processing device 730 based on the setting request information received from the information processing device 730 (step S1099).

Then, the control unit of the information processing device 710 determines whether or not the confirmation information indicating permission for reception of an image corresponding to the setting request has been transmitted from the information processing device 730 (step S1100). When the confirmation information has not been transmitted from the information processing device 730 (step S1100), it is continuously monitored.

When the confirmation information has been transmitted from the information processing device 730 (step S1100), the control unit of the information processing device 710 initiates the P2P direct connection with the information processing device 730 (step S1101).

The subsequent processing procedure (steps S1102 to S1115) corresponds to the processing procedure (steps S1041 to S1054) illustrated in FIGS. 22 and 23, and thus description thereof is omitted. However, a difference lies in that when the DRM content is acquired, the DRM content is received and acquired from the DRM content server 740 via the access point 702 (step S1108). In other words, the control unit of the information processing device 710 receives and acquires the DRM content from the DRM content server 740 via the access point 702 (step S1108).

Further, when the DRM content display end manipulation has not been performed (step S1114), the control unit of the information processing device 710 determines whether or not the standby mode has been set (step S1116). Then, when the standby mode has been set in the information processing device 710 (step S1116), the control unit of the information processing device 710 disconnects the direct connection with the information processing device 730 (step S1117), and the process returns to step S1096.

Then, the control unit of the information processing device 710 determines whether or not the line has been disconnected (step S1118). Then, when the line has been disconnected (step S1118), the operation of the data transmission process ends. When the line has not been disconnected (step S1118), the process returns to step S1108.

4. Fourth Embodiment

In a fourth embodiment of the present technology, an example in which a DRM content transfer request is transmitted to the DRM content server so that the DRM content can be transmitted from the source device to the sink device will be described. In other words, in the fourth embodiment of the present technology, an example in which the DRM content is transmitted from the source device to the sink device and displayed on the sink device will be described. A configuration of a communication system according to the fourth embodiment of the present technology is substantially the same as that of the communication system 700 illustrated in FIG. 17. Thus, in the fourth embodiment of the present technology, parts that are common to those of the communication system 700 are denoted by the same reference numerals, and part of description thereof is omitted.

Further, in the fourth embodiment of the present technology, an example in which, when only Wi-Fi Certified Miracast is used for communication, only single transfer is permitted using a function type message will be described.

Communication Example of Image Data

Figure 35:
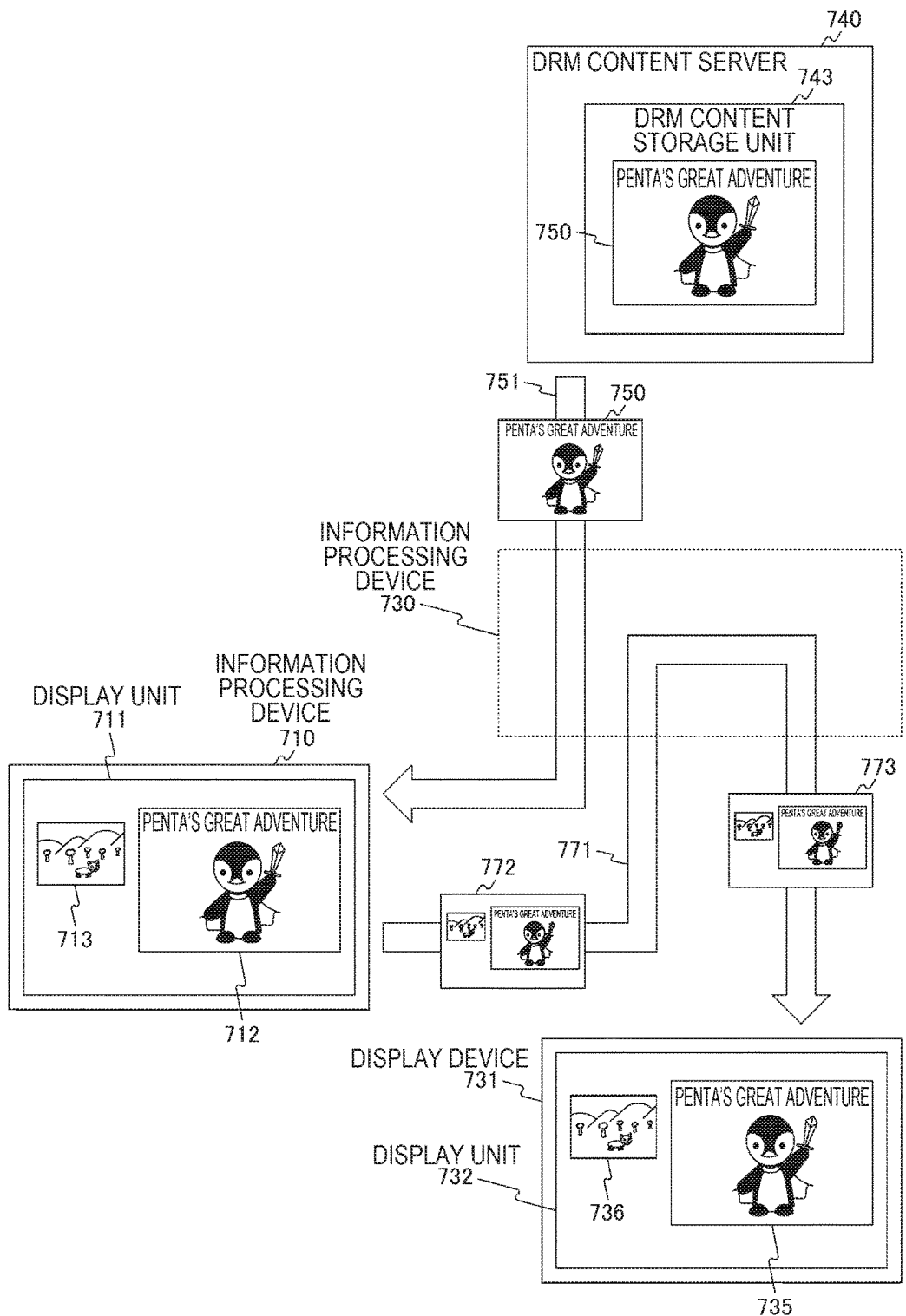
FIG. 35 is a diagram schematically illustrating an example of the flow of image data interchanged between devices included in a communication system 700 according to a fourth embodiment of the present technology.

FIG. 35 is a diagram schematically illustrating an example of the flow of the image data interchanged between the devices included in a communication system 700 according to the fourth embodiment of the present technology. The example illustrated in FIG. 35 is a modified example of FIG. 18, and thus parts that are common to those of FIG. 18 are denoted by the same reference numerals, and description thereof is omitted.

FIG. 35 illustrates an example in which the display screen including the DRM content displayed on the display unit 711 of the information processing device 710 is transmitted to the information processing device 730 and displayed on the display unit 732 of the display device 731.

For example, as indicated by an arrow 771, the control unit of the information processing device 710 transmits a display screen 772 including the image (the image based on the DRM content 750) displayed on the region 712 of the display unit 711 to the information processing device 730. Then, the control unit of the information processing device 730 causes a received display screen 773 to be transmitted to the display device 731 and displayed on the display unit 732.

The same applies when the manipulation image 760 is displayed to be superimposed on the image (the image based on the DRM content 750) displayed on the region 712 of the display unit 711 as illustrated in FIG. 26.

Communication Example

Figure 36:
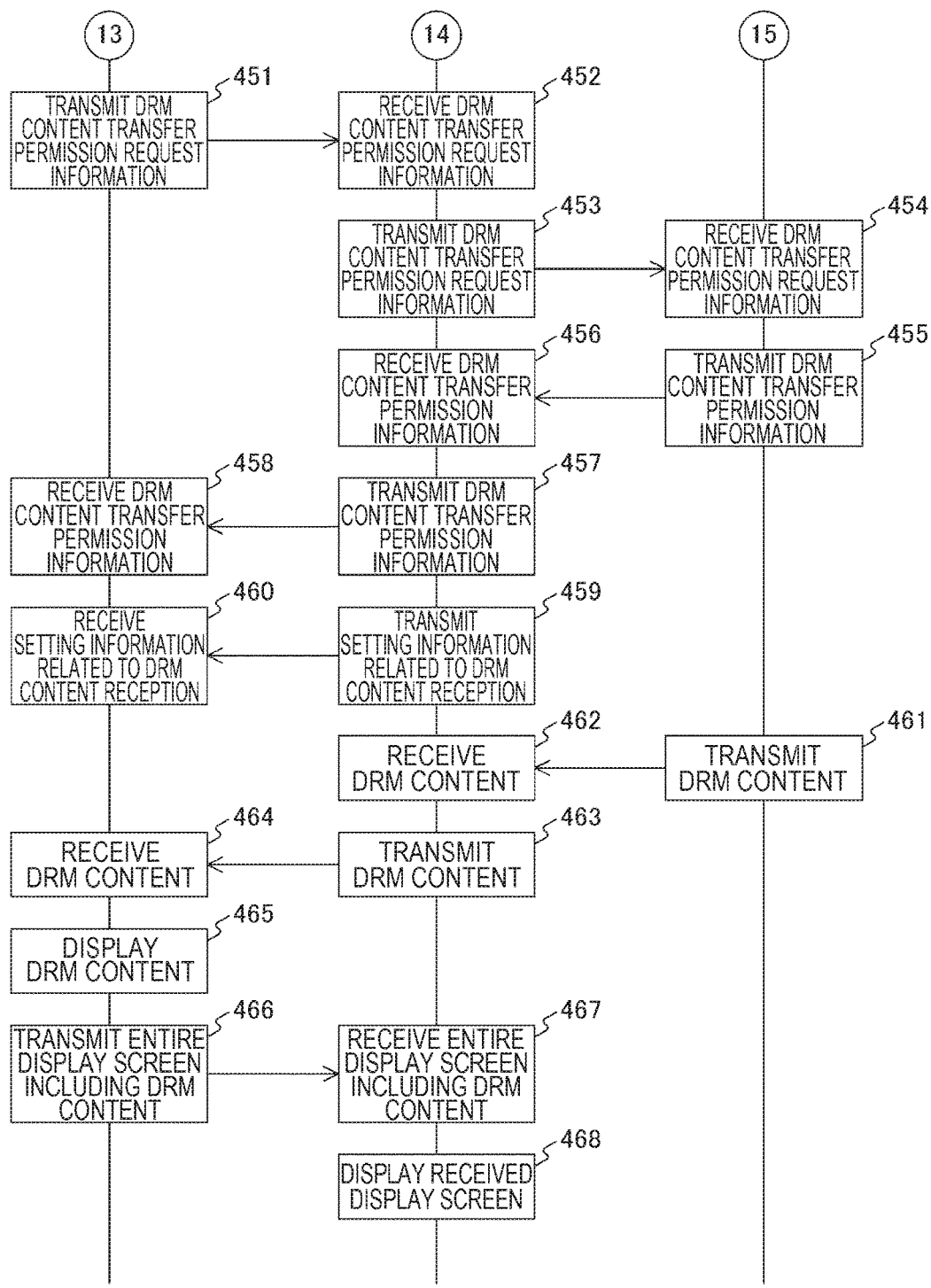
FIG. 36 is a sequence chart illustrating a communication process example between devices included in the communication system 700 according to the fourth embodiment of the present technology.

FIG. 36 is a sequence chart illustrating a communication process example between the respective devices included in the communication system 700 according to the fourth embodiment of the present technology. The example illustrated in FIG. 36 is a modified example of FIGS. 20 and 21, and thus parts that are common to those of FIGS. 20 and 21 are denoted by the same reference numerals, and part of description thereof is omitted.

An example in which the information processing device (the source device) 710, the information processing device (the sink device) 730, and the DRM content server 740 are present in the same enclosure will be described with reference to FIG. 36. In this case, by interchanging information indicating that the respective devices are present in the same enclosure between the respective devices, the DRM content transfer permission request is transmitted to the DRM content server 740 so that communication of the DRM content between the information processing device 710 and the information processing device 730 can be performed.

When the DRM content display instruction manipulation is performed (652 (illustrated in FIG. 20)), the control unit of the information processing device 710 transmits DRM content transfer permission request information to the information processing device 730 (451 and 452). Here, the DRM content transfer permission request information is information for requesting the DRM content server 740 to permit transfer of the DRM content between the source device and the sink device. The DRM content transfer permission request information includes, for example, the terminal identification information specifying the transmission source (the source device) and the transmission destination (the sink device) of the DRM content.

When the DRM content transfer permission request information has been received (452), the control unit of the information processing device 730 transmits the DRM content transfer permission request information to the DRM content server 740 (453 and 454). When the DRM content transfer permission request information has been received (454), the control unit 742 of the DRM content server 740 checks DRM content transfer policy information. In this case, various kinds of authentication methods can be used.

For example, the transfer may be permitted only when it is confirmed that it is a private LAN environment. Further, for example, the transfer may be permitted only when a setting under which the display screen is transmitted according to Wi-Fi Certified Miracast without change is set. Furthermore, for example, the transfer may be permitted only when the sink device can reproduce the DRM content.

When the transfer of the DRM content between the source device and the sink device is determined to be permitted as a result of confirmation, the control unit 742 of the DRM content server 740 transmits DRM content transfer permission information to the information processing device 730 (455 and 456). Here, the DRM content transfer permission information is information for giving a notification indicating that the transfer of the DRM content between the source device and the sink device is permitted.

When the DRM content transfer permission information has been received (456), the control unit of the information processing device 730 transmits the DRM content transfer permission information to the information processing device 710 (457 and 458). When the DRM content transfer permission information has been received (458), the transfer of the DRM content between the source device and the sink device can be performed. Thus, the control unit of the information processing device 730 can cause the display screen including the DRM content to be transmitted to the information processing device 730 according to Wi-Fi Certified Miracast and displayed on the information processing device 730.

A process (459 to 465) corresponds to the process (661 to 667) illustrated in FIG. 21.

The control unit of the information processing device 710 decodes the received DRM content, and causes the image based on the decoded DRM content to be displayed on the display unit 711 (465). Then, the control unit of the information processing device 710 compresses the entire display screen displayed on the display unit 711, and transmits the compressed display screen to the information processing device 730 according to Wi-Fi Certified Miracast (466, 467). In this case, the control unit of the information processing device 710 compresses the display screen including the DRM content displayed on the display unit 711, and transmits the compressed display screen (466 and 467).

Operation Example of Information Processing Device (Source Device)

Figure 37:
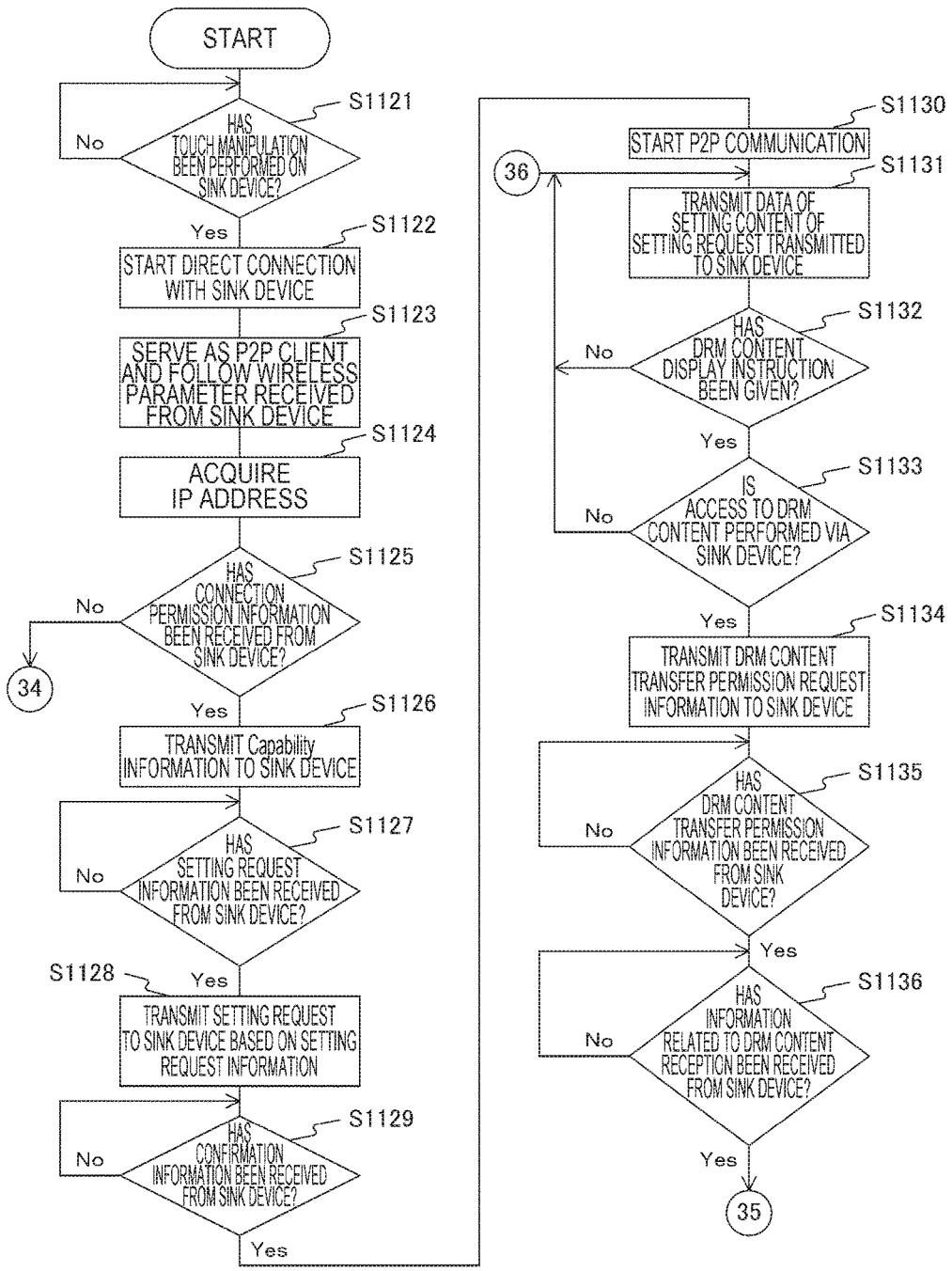
FIG. 37 is a flowchart illustrating an example of a processing procedure of a data transmission process performed by the information processing device 710 according to the fourth embodiment of the present technology.
Figure 38:
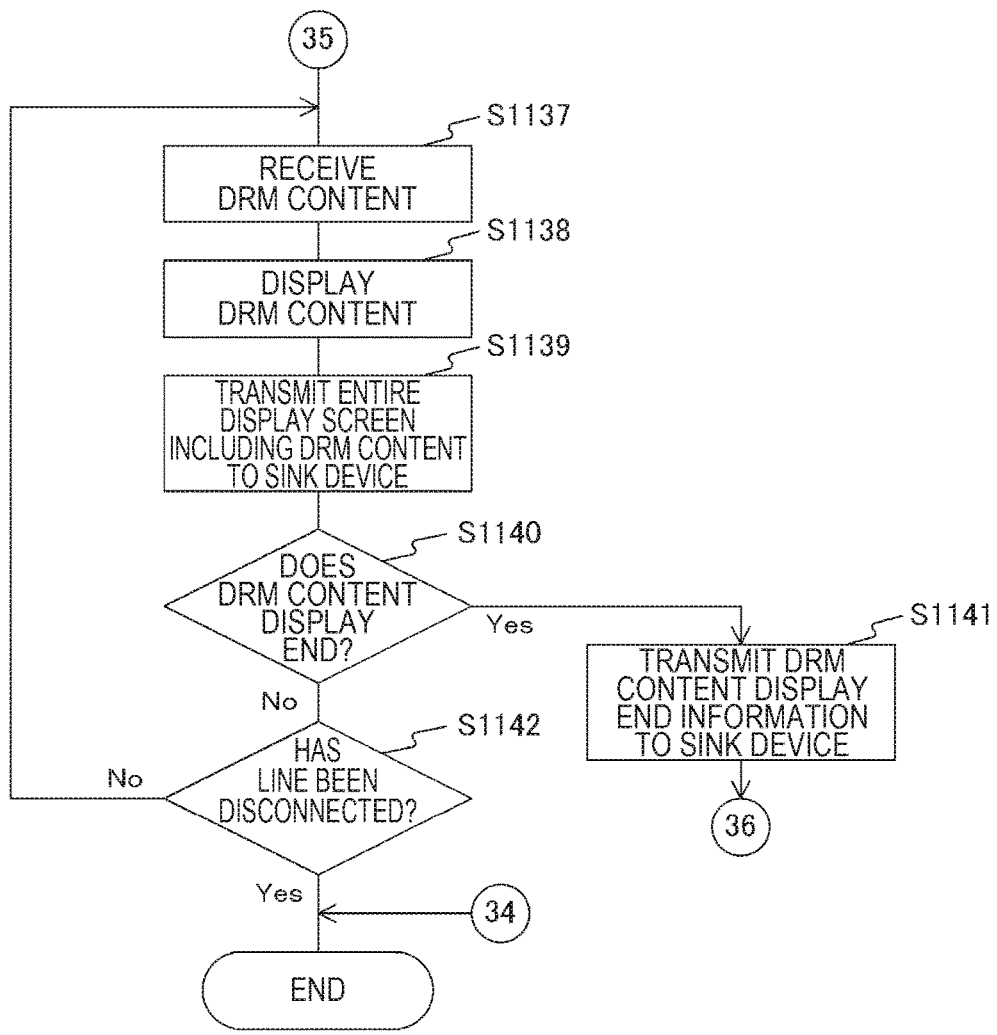
FIG. 38 is a flowchart illustrating an example of a processing procedure of a data transmission process performed by the information processing device 710 according to the fourth embodiment of the present technology.

FIGS. 37 and 38 are flowcharts illustrating an example of a processing procedure of the data transmission process performed by the information processing device 710 according to the fourth embodiment of the present technology. The example illustrated in FIGS. 37 and 38 is a modified example of FIGS. 22 and 23, and thus parts that are common to those of FIGS. 22 and 23 are denoted by the same reference numerals, and part of description thereof is omitted.

A processing procedure (steps S1121 to 1133) illustrated in FIG. 37 corresponds to the processing procedure (steps S1031 to 1043) illustrated in FIG. 22.

When the DRM content is determined to be accessed via the information processing device 730 (step S1133), the control unit of the information processing device 710 transmits the DRM content transfer permission request information to the information processing device 730 (step S1134).

Then, the control unit of the information processing device 710 determines whether or not the DRM content transfer permission information has been received (step S1135). Then, when the DRM content transfer permission information has not been received, it is continuously monitored.

When the DRM content transfer permission information has been received (step S1135), the control unit of the information processing device 710 determines whether or not the setting information related to the DRM content reception has been received (step S1136). Then, when the setting information related to the DRM content reception has not been received, it is continuously monitored.

When the setting information related to the DRM content reception has been received (step S1136), the control unit of the information processing device 710 receives the DRM content from the DRM content server 740 via the information processing device 730 (step S1137).

Then, the control unit of the information processing device 710 decodes the received DRM content, and causes the image based on the decoded DRM content to be displayed on the display unit 711 (step S1138).

Then, the control unit of the information processing device 710 compresses the entire display screen displayed on the display unit 711, and transmits the compressed display screen to the information processing device 730 according to Wi-Fi Certified Miracast (step S1139).

Then, the control unit of the information processing device 710 determines whether or not the DRM content display end manipulation (the DRM content display end manipulation) has been performed (step S1140). When the DRM content display end manipulation has been performed (step S1140), the control unit of the information processing device 710 transmits the DRM content display end information to the information processing device 730 (step S1141), and the process returns to step S1131.

When the DRM content display end manipulation has not been performed (step S1140), the control unit of the information processing device 710 determines whether or not the line has been disconnected (step S1142). Then, when the line has been disconnected (step S1142), the operation of the data transmission process ends. When the line has not been disconnected (step S1142), the process returns to step S1137.

Operation Example of Information Processing Device (Sink Device)

Figure 39:
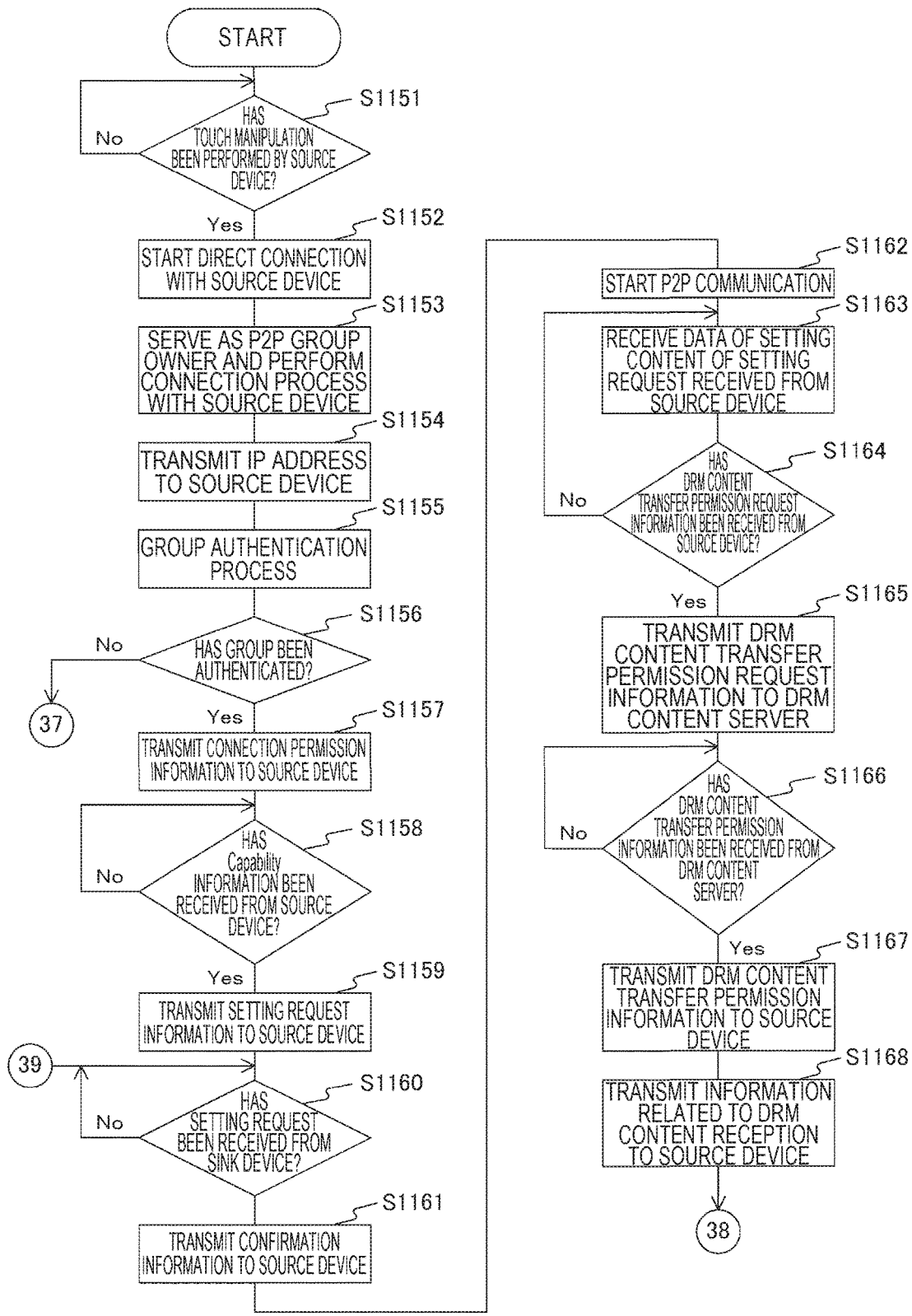
FIG. 39 is a flowchart illustrating an example of a processing procedure of a data reception process performed by the information processing device 730 according to the fourth embodiment of the present technology.
Figure 40:
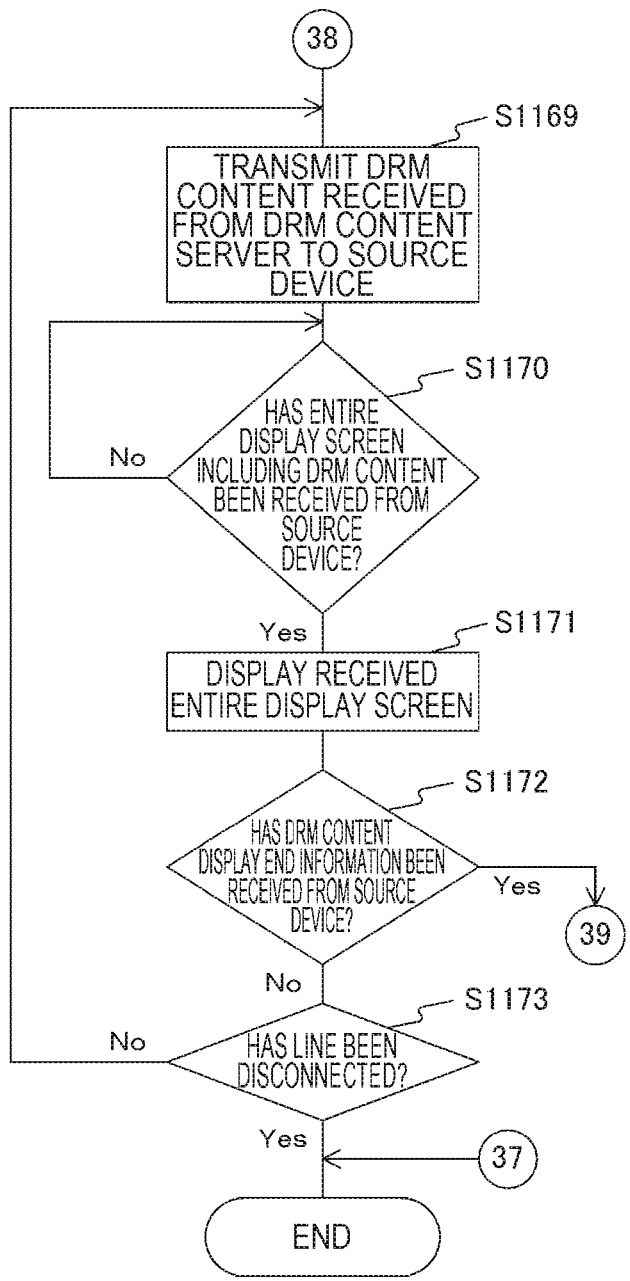
FIG. 40 is a flowchart illustrating an example of a processing procedure of a data reception process performed by the information processing device 730 according to the fourth embodiment of the present technology.

FIGS. 39 and 40 are flowcharts illustrating an example of a processing procedure of the data reception process performed by the information processing device 730 according to the fourth embodiment of the present technology. The example illustrated in FIGS. 39 and 40 is a modified example of FIGS. 24 and 25, and thus parts that are common to those of FIGS. 24 and 25 are denoted by the same reference numerals, and part of description thereof is omitted.

A processing procedure (steps S1151 to 1163) illustrated in FIG. 39 corresponds to the processing procedure (steps S1061 to 1073) illustrated in FIG. 24.

The control unit of the information processing device 730 determines whether or not the DRM content transfer permission request information has been received from the information processing device 710 (step S1164). Then, when the DRM content transfer permission request information has not been received (step S1164), the process returns to step S1163.

When the DRM content transfer permission request information has been received (step S1164), the control unit of the information processing device 730 transmits the DRM content transfer permission request information to the DRM content server 740 (step S1165).

Then, the control unit of the information processing device 730 determines whether or not the DRM content transfer permission information has been received from the DRM content server 740 (step S1166). When the DRM content transfer permission information has not been received (step S1166), it is continuously monitored.

When the DRM content transfer permission information has been received (step S1166), the control unit of the information processing device 730 transmits the DRM content transfer permission information to the information processing device 710 (step S1167).

Then, the control unit of the information processing device 730 transmits the setting information related to the DRM content reception to the information processing device 710 (step S1168). Then, the control unit of the information processing device 730 transmits the DRM content received from the DRM content server 740 to the information processing device 710 (step S1169).

Then, the control unit of the information processing device 730 determines whether or not the entire display screen displayed on the display unit 711 of the information processing device 710 has been received from the information processing device 710 (step S1170). When the entire display screen has not been received (step S1170), it is continuously monitored.

When the entire display screen has been received (step S1170), the control unit of the information processing device 730 decodes the received entire display screen, transmits the decoded display screen to the display device 731, and displays the display screen through the display unit 732 (step S1171).

Then, the control unit of the information processing device 730 determines whether or not the DRM content display end information has been received from the information processing device 710 (step S1172). When the DRM content display end information has been received (step S1172), the process returns to step S1160.

When the DRM content display end information has not been received (step S1172), the control unit of the information processing device 730, determines whether or not the line has been disconnected (step S1173). Then, when the line has been disconnected (step S1173), the operation of the data transmission process ends. When the line has not been disconnected (step S1173), the process returns to step S1169.

As described above, in the fourth embodiment of the present technology, the P2P direct communication can be performed between the devices that are permitted to access the DRM content in advance. Further, it is possible to implement a protocol of permitting the DRM content server 740 to perform transcoding according to Wi-Fi Certified Miracast.

Further, because it is unnecessary to perform the combination process in the sink device, a load of the communication process in the sink device can be reduced. Even when the sink device does not have a function of displaying the DRM content, the DRM content can be appropriately displayed at the sink device side.

In the fourth embodiment of the present technology, the example in which the information processing device 710 transmits the content transfer request to the DRM content server 740 via the information processing device 730, and the DRM content server 740 permits the request has been described. However, the fourth embodiment of the present technology can also be applied when any other topology is constructed. For example, the fourth embodiment of the present technology can also be applied when the information processing device 710 receives the DRM content via the access point 702 without intervention of the information processing device 730 as illustrated in FIGS. 27 and 29. For example, the fourth embodiment of the present technology can also be applied when the information processing device 710 is connected to a public line according to specifications such as IEEE 802.16 or 3GPP (for example, W-CDMA, GSM, WiMAX, WiMAX2, LTE, or LTE-A) and connected to the DRM content server 740 via the public line.

Operation Example of Information Processing Device (Source Device)

Figure 41:
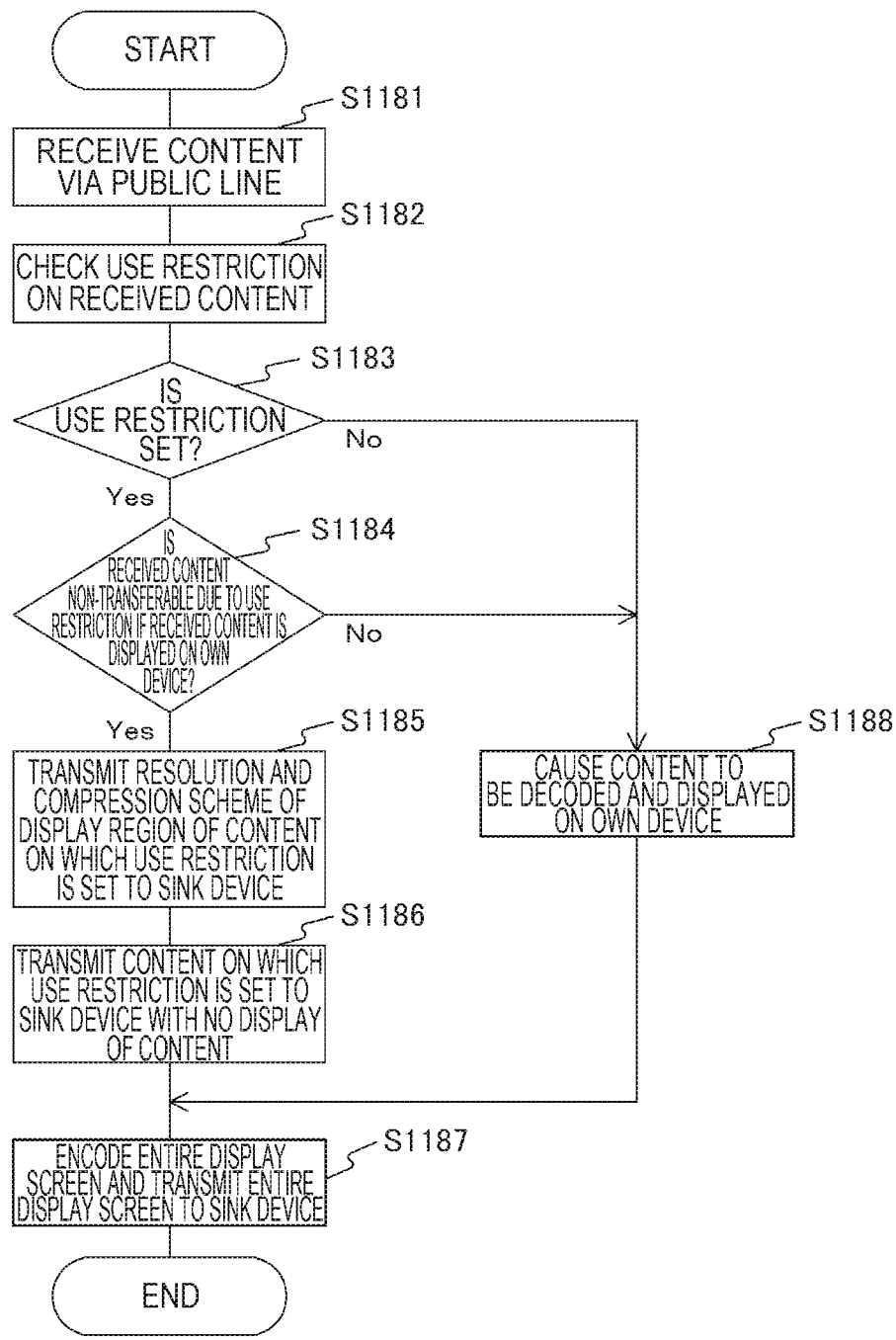
FIG. 41 is a flowchart illustrating an example of a processing procedure of a data transmission process performed by the information processing device 710 according to the fourth embodiment of the present technology.

FIG. 41 is a flowchart illustrating an example of a processing procedure of the data transmission process performed by the information processing device 710 according to the fourth embodiment of the present technology. FIG. 41 illustrates an example in which a process of transferring content to the sink device is changed according to whether or not a use restriction is set on content received via a public line.

First, the control unit of the information processing device 710 performs a reception process of receiving content via a public line (step S1181). Then, the control unit of the information processing device 710 checks a use restriction on the received content (step S1182). Then, the control unit of the information processing device 710 determines whether or not a use restriction is set on the received content (step S1183). For example, when the received content is the DRM content, the control unit of the information processing device 710 determines the use restriction to be set on the received content (step S1182).

Then, when the use restriction is set on the received content (step S1183), the control unit thereof determines whether or not the received content is non-transferable due to the use restriction if the received content is displayed on the information processing device 710 (step S1184). When the received content is non-transferable due to the use restriction if the received content is displayed on its own device (step S1184), the control unit of the information processing device 710 transmits information (for example, a display region and a resolution) related to the received content (content on which the use restriction is set) to the sink device (step S1185).

Then, the control unit of the information processing device 710 causes the entire display screen to be encoded and then transmitted to the sink device (step S1186).

Further, when no use restriction is set on the received content (step S1183), the control unit of the information processing device 710 causes the received content to be decoded and displayed on the display unit (step S1188). Further, when the received content can be transferred regardless of the use restriction even when the received content is displayed on its own device (step S1184), the process proceeds to step S1188.

In the second to fourth embodiments of the present technology, the example in which the DRM content received from the DRM content server 740 and the image stored in the source device are displayed has been described. However, the second to fourth embodiments of the present technology can also be applied when the image or the DRM content stored in the sink device is displayed.

The embodiments of the present technology have been described in connection with the example in which the DRM content is dealt with as content managed under a copyright, but the embodiments of the present technology can also be applied when content managed by any other copyright management technique is dealt with. For example, any other copyright management technique that is operated to encrypt a link of a wired line or a wireless line may be simultaneously operated. As a scheme of encrypting a link of a wired line or a wireless line, for example, the embodiments of the present technology may be applied to a copyright protection technique such as a high-bandwidth digital content protection system (HDCP), or a DRM may be simultaneously operated. For example, the embodiments of the present technology may be applied to a technology standard such as digital transmission content protection (DTCP).

Here, for example, in education sites or medical sites, presentations are often performed using content managed under copyright (for example, educational content) that can be used only in an enclosure. In such cases, according to the embodiments of the present technology, appropriate screen display can be performed in the source device and the sink device. In this case, the DRM content can be displayed at the sink device side based on information transmitted from the source device with no uncomfortable feeling. Further, switching can be performed without causing the user to feel a switching period of time that physically occurs. In other words, image information can be appropriately displayed among a plurality of information processing devices.

Any one of the source device and the sink device may not have a function of displaying the DRM content. In this case, by adding protocols of the source device and the DRM content server of Wi-Fi Certified Miracast, DRM content selection can be performed between the source device and the sink device.

5. Application Examples

The technology of the present disclosure can be applied to various products. For example, the information processing device 200, 300, 400, 703, 704, 710, 720, and 730 may be realized as a mobile terminal such as a smartphone, a tablet-type personal computer (PC), a notebook PC, a portable game terminal, or a digital camera, a fixed-type terminal such as a television receiver set, a printer, a digital scanner, or a network storage, or an in-vehicle terminal such as a car navigation device. In addition, the information processing device 200, 300, 400, 703, 704, 710, 720, and 730 may be realized as a terminal which performs machine-to-machine (M2M) communication (which is also referred to as a machine-type communication (MTC) terminal) such as a smart meter, a vending machine, a remote monitoring device, or a point-of-sale (POS) terminal. Furthermore, the information processing device 200, 300, 400, 703, 704, 710, 720, and 730 may be a wireless communication module (for example, an integrated circuit module configured in one die) mounted in these terminals.

5-1. First Application Example

Figure 42:
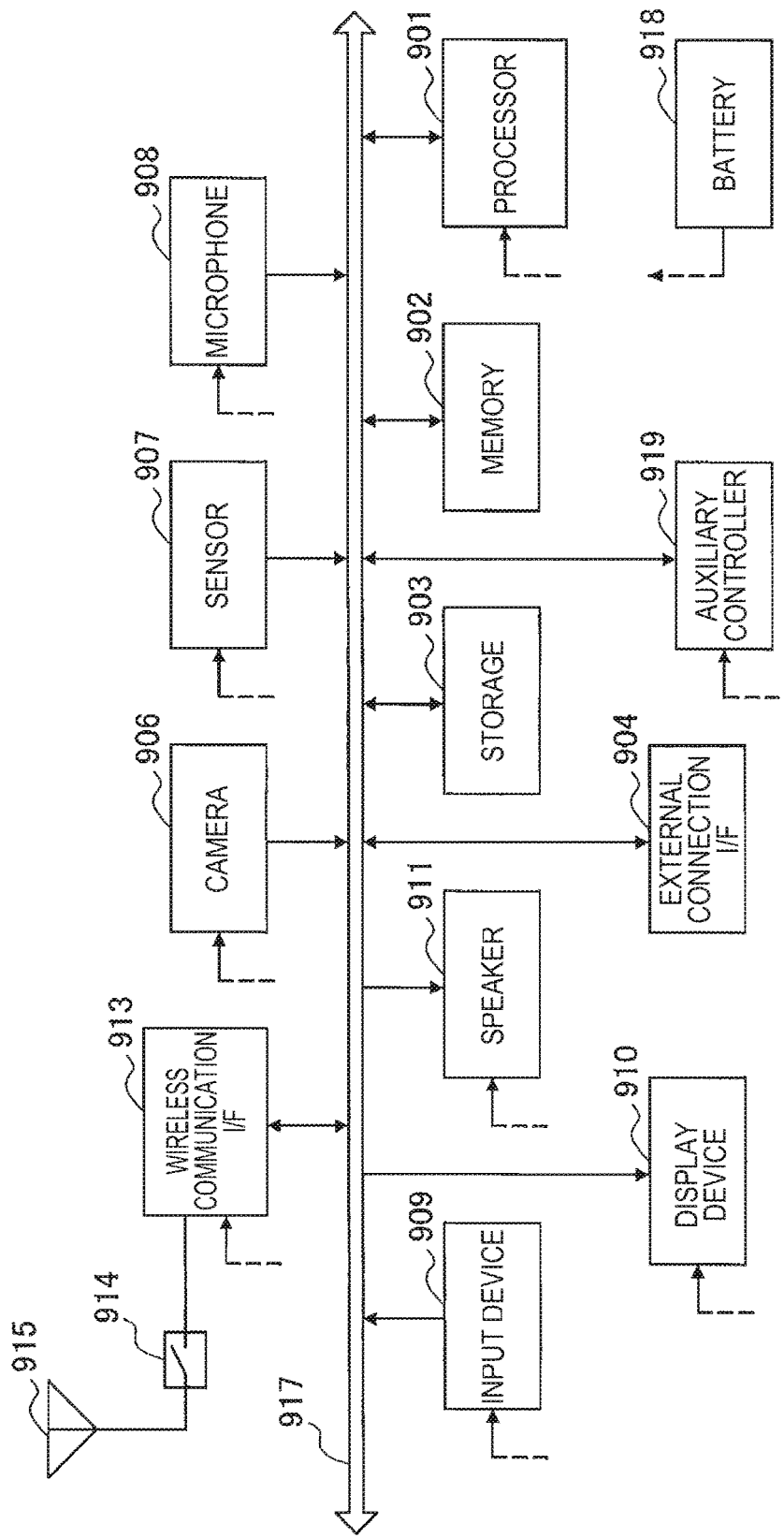
FIG. 42 is a block diagram illustrating an example of a schematic configuration of a smartphone.

FIG. 42 is a block diagram showing an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on a chip (SoC), and controls functions of an application layer and another layer of the smartphone 900. The memory 902 includes a random access memory (RAM) and a read only memory (ROM), and stores a program that is executed by the processor 901, and data. The storage 903 may include a storage medium such as a semiconductor memory or a hard disk. The external connection interface 904 is an interface for connecting an external device such as a memory card or a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 913 supports one or more of wireless LAN standards such as IEEE 802.11a, 11b, 11g, 11n, 11ac, and 11ad to execute wireless communication. The wireless communication interface 913 can communicate with another device via a wireless LAN access point in an infrastructure mode. In addition, the wireless communication interface 913 can directly communicate with another device in an ad hoc mode or a direct communication mode such as Wi-Fi direct, or the like. In the Wi-Fi Direct, unlike the ad-hoc mode, one of two terminals operates as an access point, but communication is performed directly between the terminals. The wireless communication interface 913 can typically include a baseband processor, a radio frequency (RF) circuit, and a power amplifier. The wireless communication interface 913 may be a one-chip module in which a memory which stores a communication control program, a processor which executes the program and a relevant circuit are integrated. The wireless communication interface 913 may support other kinds of wireless communication schemes such as a near field wireless communication scheme, a proximity wireless communication scheme or a cellular communication scheme in addition to the wireless LAN scheme. The antenna switch 914 switches connection destinations of the antenna 915 between a plurality of circuits (for example, circuits for different wireless communication schemes) included in the wireless communication interface 913. The antenna 915 has a single or a plurality of antenna elements (for example, a plurality of antenna elements which constitute a MIMO antenna), which are used by the wireless communication interface 913 for transmission and reception of radio signals. Further, a function of a wireless communication interface for establishing a connection with a public line according to specifications such as IEEE 802.16 or 3GPP (for example, W-CDMA, GSM, WiMAX, WiMAX2, LTE, or LTE-A) to perform communication with the public line may be provided.

It should be noted that the smartphone 900 is not limited to the example of FIG. 42 and may include a plurality of antennas (for example, an antenna for a wireless LAN, an antenna for the proximity wireless communication scheme, or an antenna for a public line communication, etc.). In that case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to each other. The battery 918 supplies power to blocks of the smartphone 900 illustrated in FIG. 42 via feeder lines, which are partially shown as dashed lines in the figure. The auxiliary controller 919 operates a minimum necessary function of the smartphone 900, for example, in a sleep mode.

In the smartphone 900 shown in FIG. 42, the control unit 240 described using FIG. 2, and the control unit 370 described using FIG. 3 may be implemented by the wireless communication interface 913. In addition, at least some of these functions may be implemented by the processor 901 or the auxiliary controller 919.

The smartphone 900 may operate as a wireless access point (software AP) by executing an access point function at an application level through the processor 901. Further, the wireless communication interface 913 may have a wireless access point function.

5-2. Second Application Example

Figure 43:
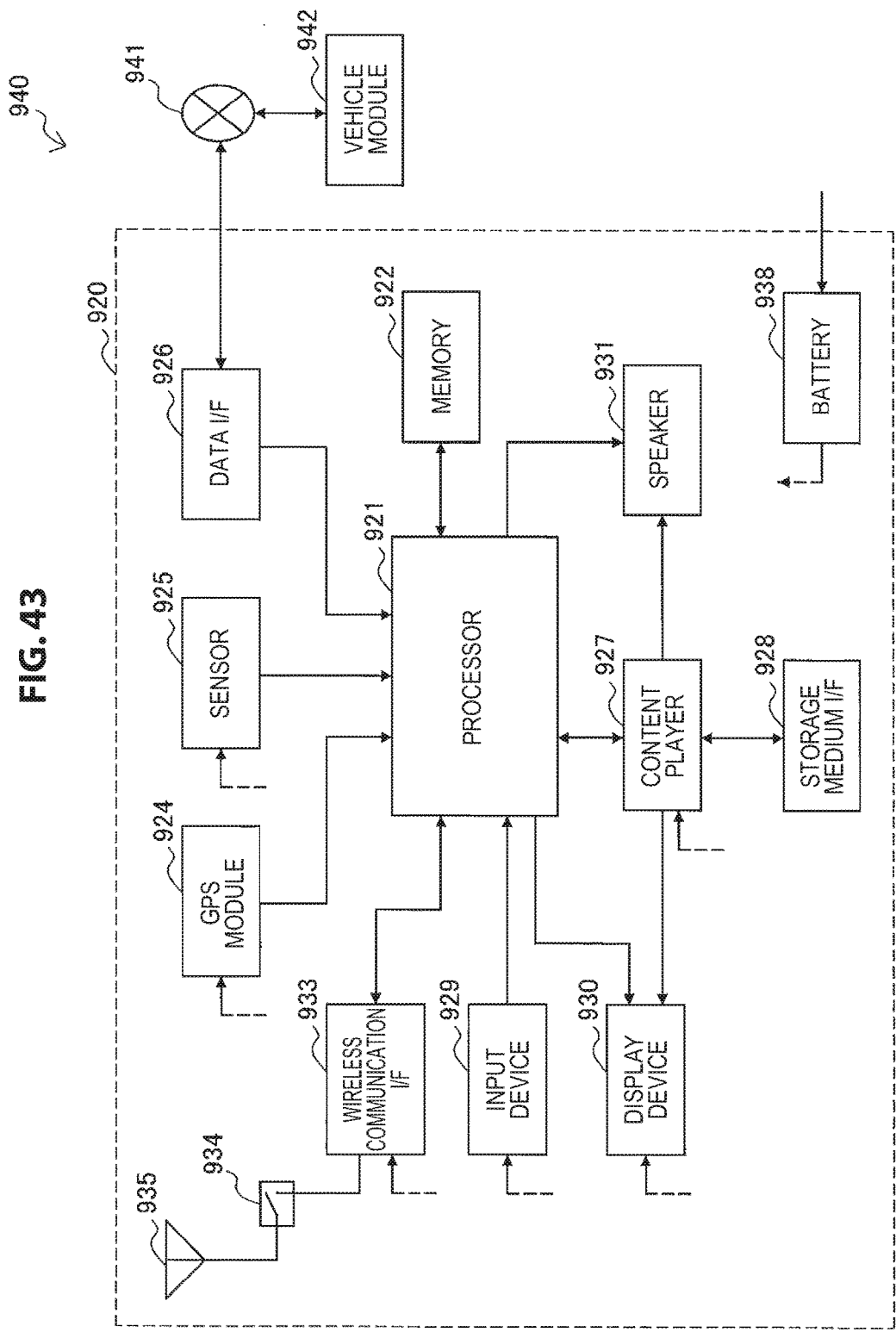
FIG. 43 is a block diagram illustrating an example of a schematic configuration of a car navigation device.

FIG. 43 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports one or more of wireless LAN standards such as IEEE 802.11a, 11b, 11g, 11n, 11ac, and 11ad to execute wireless communication. The wireless communication interface 933 can communicate with another device via a wireless LAN access point in an infrastructure mode. In addition, the wireless communication interface 933 can directly communicate with another device in an ad hoc mode or a direct communication mode such as Wi-Fi Direct. The wireless communication interface 933 can typically include a baseband processor, an RF circuit, and a power amplifier. The wireless communication interface 933 may be a one-chip module in which a memory which stores a communication control program, a processor which executes the program and a relevant circuit are integrated. The wireless communication interface 933 may support other kinds of wireless communication schemes such as a near field wireless communication scheme, a proximity wireless communication scheme or a cellular communication scheme in addition to the wireless LAN scheme. The antenna switch 934 switches connection destinations of the antenna 935 between a plurality of circuits included in the wireless communication interface 933. The antenna 935 has a single or a plurality of antenna elements, which are used by the wireless communication interface 933 for transmission and reception of radio signals.

In addition, the car navigation device 920 may include a plurality of antennas, not limited to the example of FIG. 43. In that case, the antenna switches 934 may be omitted from the configuration of the car navigation device 920.

The battery 938 supplies power to blocks of the car navigation device 920 illustrated in FIG. 43 via feeder lines that are partially shown as dashed lines in the figure. The battery 938 accumulates power supplied form the vehicle.

In the car navigation device 920 illustrated in FIG. 43, the control unit 240 described using FIG. 2 and the control unit 370 described using FIG. 3 may be implemented by the wireless communication interface 933. At least a part of the functions may also be implemented by the processor 921.

The technology of the present disclosure may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a hard disk, a CD (Compact Disc), an MD (Mini-Disc), and a DVD (Digital Versatile Disc), a memory card, and a Blu-ray disc (registered trademark) can be used.

Effects described in the present description are just examples, the effects are not limited, and there may be other effects.

Additionally, the present technology may also be configured as below.

(1)

An information processing device, including:

a wireless communication unit configured to perform real-time image transmission with another information processing device according to a wireless fidelity (Wi-Fi) Certified Miracast specification; and a control unit configured to perform control in a manner that second image information to be displayed on a non-display region included in first image information transmitted from the other information processing device is acquired, and a combined image in which the first image information is combined with the second image information is displayed on a display unit.

(2)

The information processing device according to (1), wherein the control unit specifies the non-display region in the first image information and the second image information based on command information related to the non-display region which is transmitted from the other information processing device.

(3)

The information processing device according to (2), wherein the control unit specifies the non-display region in the first image information based on a position and a size of the non-display region in the first image information which is included in the command information.

(4)

The information processing device according to (2) or (3), wherein the control unit acquires the second image information from an external device based on address information related to the second image information which is included in the command information.

(5)

The information processing device according to (4), wherein, when the command information has been received, the control unit transmits confirmation information for accessing the second image information to the external device, receives permission information of permitting access to the second image information from the external device, and then acquires the second image information from the external device.

(6)

The information processing device according to (4), wherein, when the command information has been received, the control unit transmits confirmation information for the other information processing device to access the second image information to the external device, receives permission information of permitting access of the other information processing device to the second image information from the external device, and then transmits setting information for the other information processing device to acquire the second image information from the external device to the other information processing device.

(7)

The information processing device according to (6), wherein, after transmitting the setting information to the other information processing device, the control unit acquires the second image information from the external device, and transfers the second image information to the other information processing device.

(8)

The information processing device according to any of (2) to (7), wherein the control unit performs display control of the combined image based on control information related to an image displayed on the non-display region which is included in the command information.

(9)

The information processing device according to any of (2) to (8), wherein, based on manipulation image information related to a manipulation image displayed on the non-display region which is included in the command information, the control unit causes the manipulation image to be displayed to be superimposed on the combined image.

(10)

The information processing device according to any of (1) to (9), wherein the non-display region is a display region of an image managed under a copyright in the first image information displayed by the other information processing device.

(11)

The information processing device according to any of (1) to (10), wherein the wireless communication unit performs real-time image transmission with a plurality of the other information processing devices, and the control unit causes a plurality of the combined images related to a plurality of pieces of first image information transmitted from the plurality of other information processing devices to be simultaneously displayed on the display unit.

(12)

An information processing device, including:

a wireless communication unit configured to perform real-time image transmission with another information processing device according to a wireless fidelity (Wi-Fi) Certified Miracast specification; and a control unit configured to perform control in a manner that command information related to a non-display region included in image information that is displayed on a display unit and transmitted to and displayed on the other information processing device is transmitted to the other information processing device, and image information other than the non-display region in the image information is transmitted to the other information processing device.

(13)

An information processing system, including:

a source device configured to perform real-time image transmission with a sink device according to a wireless fidelity (Wi-Fi) Certified Miracast specification, transmit command information related to a non-display region included in first image information that is image information displayed on a display unit and transmitted to and displayed on the sink device to the sink device, and transmit image information other than the non-display region in the first image information to the sink device; and the sink device configured to perform real-time image transmission with the source device according to the Wi-Fi Certified Miracast specification, acquire the second image information to be displayed on the non-display region included in the first image information transmitted from the source device based on the command information, and cause a combined image in which the first image information is combined with the second image information to be displayed on a display unit.

(14)

An information processing method, including:

a first process of performing real-time image transmission with another information processing device according to a wireless fidelity (Wi-Fi) Certified Miracast specification; and a second process of performing control in a manner that second image information to be displayed on a non-display region included in first image information transmitted from the other information processing device is acquired, and a combined image in which the first image information is combined with the second image information is displayed on a display unit.

REFERENCE SIGNS LIST 100 communication system
200 information processing device
210 antenna
220 wireless communication unit
230 control signal reception unit
240 control unit
250 image and audio signal generation unit
260 image and audio compression unit
270 stream transmission unit
300 information processing device
310 antenna
320 wireless communication unit
330 stream reception unit
340 image and audio decompression unit
350 image and audio output unit
351 display unit
352 audio output unit
360 user information acquisition unit
370 control unit
380 control signal transmission unit
390 management information retention unit
400 information processing device
700 communication system
701 network
702 access point
703 information processing device
705 communication system
710 information processing device
711 display unit
730 information processing device
731 display device
732 display unit
740 DRM content server
741 communication unit
742 control unit
743 DRM content storage unit
900 smartphone
901 processor
902 memory
903 storage
904 external connection interface
906 camera
907 sensor
908 microphone
909 input device
910 display device
911 speaker
913 wireless communication interface
914 antenna switch
915 antenna
917 bus
918 battery
919 auxiliary controller
920 car navigation device
921 processor
922 memory
924 GPS module
925 sensor
926 data interface
927 content player
928 storage medium interface 929 input device
930 display device
931 speaker
933 wireless communication interface
934 antenna switch
935 antenna
938 battery
941 in-vehicle network
942 vehicle module

The invention claimed is:

1. An information processing device, comprising:
circuitry configured to:
perform real-time image transmission with another information processing device according to a Wi-Fi Certified Miracast specification;
exchange, with the another information processing device, setting information and content protection information;
receive a first content information protected by a content protection system from the another information processing device, wherein the first content information includes a non-display region and a manipulation region, the first content information is generated by the another information processing device based on the setting information and the content protection information, the non-display region is a content managed under a copyright and is an image of a specific color, and the manipulation region is an image used for a user manipulation;
transmit confirmation information to a digital rights management (DRM) content server for accessing second content information to be displayed on the non-display region, the second content information being an image managed under a copyright;
receive permission information of permitting access to the second content information from the DRM content server, the permission information indicating that the information processing device is permitted access to the second contact content information under the copyright applying to the second content information, receive the second content information from the DRM content server;
combine the first content information and the second content information, wherein the manipulation region is displayed on top of the second content information; and control a display to display the combined image in the non-display region.

2. The information processing device according to claim 1, wherein the circuitry specifies the non-display region in the first content information based on command information related to the non-display region which is transmitted from the another information processing device.

3. The information processing device according to claim 2, wherein the circuitry specifies the non-display region in the first content information based on a position and a size of the non-display region in the first content information which is included in the command information.

4. The information processing device according to claim 2, wherein the circuitry acquires the second content information from the DRM content server based on address information included in the command information.

5. The information processing device according to claim 4, wherein when the command information has been received, the circuitry transmits the confirmation information for accessing the second content information to the DRM content server, receives the permission information of permitting access to the second content information from the DRM content server, and then acquires the second content information from the DRM content server.

6. The information processing device according to claim 4, wherein when the command information has been received, the circuitry transmits the confirmation information for the another information processing device to access the second content information to the DRM content server, receives the permission information of permitting access of the another information processing device to the second content information from the DRM content server, and then transmits the setting information for the another information processing device to acquire the second content information from the DRM content server to the another information processing device.

7. The information processing device according to claim 6, wherein after transmitting the setting information to the another information processing device, the circuitry acquires the second content information from the DRM content server, and transfers the second content information to the another information processing device.

8. The information processing device according to claim 2, wherein the circuitry performs display control of the combined image based on control information related to an image displayed on the non-display region which is included in the command information.

9. The information processing device according to claim 2, wherein based on manipulation image information related to a manipulation image displayed on the non-display region which is included in the command information, the circuitry controls the manipulation image to be superimposed on the combined image.

10. The information processing device according to claim wherein the circuitry performs real-time image transmission with a plurality of other information processing devices, and the circuitry controls a simultaneous display of a plurality of the combined images related to a plurality of pieces of first content information transmitted from the plurality of other information processing devices on the display.

11. The information processing device according to claim 1, wherein the content protection system is high-bandwidth digital content protection system (HDCP).

12. The information processing device according to claim 1, wherein the setting information includes the content protection information.

13. The information processing device according to claim 1, wherein the image of the specific color is a black image.

14. An information processing device, comprising:
circuitry configured to:
perform real-time image transmission with another information processing device according to a Wi-Fi Certified Miracast specification; exchange, with the another information processing device, setting information and content protection information;
generate a first content information based on the setting information and the content protection information, wherein the first content information includes a non-display region and a manipulation region, the non-display region is a content managed under a copyright and is an image of a specific color, and the manipulation region is an image used for a user manipulation;
transmit the first content information protected by a content protection system to the another information processing device; and
transmit information such that the another information processing device receives permission information of permitting access to second content information to be displayed on the non-display region from a digital rights management (DRM) content server, the second content information being an image managed under a copyright, the permission information indicating that the another information processing device is permitted access to the second content information under the copyright applying to the second content information, receives the second content information from the DRM content server, combines the first content information and the second content information such that the manipulation region is displayed on top of the second content information, and controls a display to display the combined image in the non-display region.

15. An information processing system, comprising:
a first information processing device; and
a second information processing device, wherein the first information processing device comprises first circuitry configured to perform real-time image transmission with the second information processing device according to a Wi-Fi Certified Miracast specification;
exchange, with the second information processing device, setting information and content protection information;
generate a first content information based on the setting information and the content protection information, wherein the first content information includes a non-display region and a manipulation region, the non-display region is a content managed under a copyright and is an image of a specific color, and the manipulation region is an image used for a user manipulation; and
transmit the first content information protected by a content protection system to the second information processing device, and the second information processing device comprises second circuitry configured to perform real-time image transmission with first information processing device according to the Wi-Fi Certified Miracast specification;
exchange, with the first information processing device, the setting information and the content protection information;
receive the first content information protected by the content protection system from the first information processing device;
transmit confirmation information to a digital rights management (DRM) content server for accessing second content information to be displayed on the non-display region, the second content information being an image managed under a copyright, the permission information indicating that the second information processing device is permitted access to the second content information under the copyright applying to the second content information;
receive the second content information from the DRM content server, combine the first content information and the second content information, wherein the manipulation region is displayed on top of the second content information; and
control a display to display the combined image in the non-display region.

16. An information processing method, comprising:
performing, using circuitry of an information processing device, real-time image transmission with another information processing device according to a Wi-Fi Certified Miracast specification;
exchanging, with the another information processing device, setting information and content protection information;
receiving a first content information protected by a content protection system from the another information processing device, wherein the first content information includes a non-display region and a manipulation region, the first content information is generated by the another information processing device based on the setting information and the content protection information, the non-display region is a content managed under a copyright and is an image of a specific color, and the manipulation region is an image used for a user manipulation;
transmitting confirmation information to a digital rights management (DRM) content server for accessing second content information to be displayed on the non-display region, the second content information being an image managed under a copyright;
receiving permission information of permitting access to the second content information from the DRM content server, the permission information indicating that the information processing device is permitted access to the second contact content information under the copyright applying to the second content information;
receiving the second content information from the DRM content server combining the first content information and the second content information, wherein the manipulation region is displayed on top of the second content information; and
controlling a display to display the combined image in the non-display region.

* * * * *